(12) United States Patent
Kaji et al.

(10) Patent No.: US 8,020,869 B2
(45) Date of Patent: *Sep. 20, 2011

(54) CARD GAME DEVICE, CARD DATA READER, CARD GAME CONTROL METHOD, RECORDING MEDIUM, PROGRAM, AND CARD

(75) Inventors: Toshiyuki Kaji, Tokyo (JP); Toshikazu Yoshida, Kanagawa (JP); Hidenori Shiba, Kanagawa (JP); Takao Yamauchi, Tokyo (JP); Fumihiro Kato, Kanagawa (JP); Junichi Tsuchiya, Tokyo (JP); Yoshitaka Maeyama, Tokyo (JP); Jinichiro Okuda, Tokyo (JP); Mitsuhiko Kakita, Tokyo (JP)

(73) Assignee: Sega Corporation, Tokyo (JP)

( * ) Notice: Subject to any disclaimer, the term of this patent is extended or adjusted under 35 U.S.C. 154(b) by 1086 days.

This patent is subject to a terminal disclaimer.

(21) Appl. No.: 11/767,344

(22) Filed: Jun. 22, 2007

(65) Prior Publication Data
US 2007/0275782 A1 Nov. 29, 2007

Related U.S. Application Data

(62) Division of application No. 10/239,856, filed as application No. PCT/JP02/00849 on Feb. 1, 2002, now Pat. No. 7,431,297.

(30) Foreign Application Priority Data

Feb. 2, 2001 (JP) .................................. 2001-027558
Nov. 27, 2001 (JP) .................................. 2001-361507

(51) Int. Cl.
*A63F 9/24* (2006.01)

(52) U.S. Cl. ..................... 273/244.2; 273/328; 273/242; 273/282.3

(58) Field of Classification Search .................... 463/39; 273/237, 238, 242, 243, 244, 247, 282
See application file for complete search history.

(56) References Cited

U.S. PATENT DOCUMENTS

| 4,210,335 | A | | 7/1980 | Licciardi |
| 5,067,713 | A | | 11/1991 | Soules et al. |
| 5,088,928 | A | | 2/1992 | Chan |
| 5,190,285 | A | * | 3/1993 | Levy et al. ...................... 463/36 |

(Continued)

FOREIGN PATENT DOCUMENTS

EP 1052000 11/2000

(Continued)

*Primary Examiner* — Peter DungBa Vo
*Assistant Examiner* — Sunit Pandya
(74) *Attorney, Agent, or Firm* — Oblon, Spivak, McClelland, Maier & Neustadt, L.L.P.

(57) ABSTRACT

A game apparatus includes a game execution unit, casing, card arrangement panel, luminator that illuminates the panel, sensor unit that receives light from the panel and generates image data, and recognition unit to separate data of each card, and detect positions of the cards. Each of the plurality of cards is printed with a game character on one of its surfaces and formed on the other of the surfaces with a code pattern including data relating the game character. The sensor unit generates data of the image including the code patterns of the cards on the panel. The recognition unit separates data of each card, and detects position on play field of cards arranged on the panel, from the data of the image and supplies information thus obtained to the execution unit. The execution unit executes a game in response to card manipulation by an operator.

14 Claims, 51 Drawing Sheets

U.S. PATENT DOCUMENTS

| | | |
|---|---|---|
| 5,259,907 A | 11/1993 | Soules et al. |
| 5,407,204 A | 4/1995 | Meyer |
| 5,411,259 A | 5/1995 | Pearson et al. |
| 5,853,327 A * | 12/1998 | Gilboa .................. 463/39 |
| 5,885,156 A | 3/1999 | Toyohara et al. |
| 5,959,281 A | 9/1999 | Domiteaux |
| 6,155,924 A | 12/2000 | Nakagawa et al. |
| 6,370,330 B2 * | 4/2002 | Sekine et al. .................. 396/54 |
| 6,419,230 B1 | 7/2002 | Cass |
| 6,464,503 B1 * | 10/2002 | Heit et al. .................. 434/156 |

FOREIGN PATENT DOCUMENTS

| | | |
|---|---|---|
| FR | 2 540 737 | 8/1984 |
| JP | 2-75091 | 3/1990 |
| JP | 2-166592 | 6/1990 |
| JP | 3-37083 | 2/1991 |
| JP | 4-199039 | 7/1992 |
| JP | 4-295390 | 10/1992 |
| JP | 5-341706 | 12/1993 |
| JP | 6-309518 | 11/1994 |
| JP | 7-59947 | 3/1995 |
| JP | 3013001 | 4/1995 |
| JP | 7-266763 | 10/1995 |
| JP | 7-275522 | 10/1995 |
| JP | 8-96097 | 4/1996 |
| JP | 8-182798 | 7/1996 |
| JP | 09-215812 | 8/1997 |
| JP | 10-40349 | 2/1998 |
| JP | 10-261059 | 9/1998 |
| JP | 10-320499 | 12/1998 |
| JP | 2880309 | 1/1999 |
| JP | 11-28292 | 2/1999 |
| JP | 11-99285 | 4/1999 |
| JP | 11-194785 | 7/1999 |
| JP | 11-227367 | 8/1999 |
| JP | 11-253653 | 9/1999 |
| JP | 11-300034 | 11/1999 |
| JP | 2000-30016 | 1/2000 |
| JP | 2000-48118 | 2/2000 |
| JP | 2000-82106 | 3/2000 |
| JP | 2000-84257 | 3/2000 |
| JP | 2000-126455 | 5/2000 |
| JP | 2000-157744 | 6/2000 |
| JP | 2000-176163 | 6/2000 |
| JP | 2000-202165 | 7/2000 |
| JP | 2000-300850 | 10/2000 |
| JP | 2000-334168 | 12/2000 |
| JP | 2000-334170 | 12/2000 |
| JP | 2002-301264 | 10/2002 |
| WO | WO 98/58237 | 12/1998 |
| WO | WO 02/10791 A2 | 2/2002 |

* cited by examiner

FIG.11A
| 21 | 200 | 18 |
FIG.11B
| 21 | 21 | 18 |
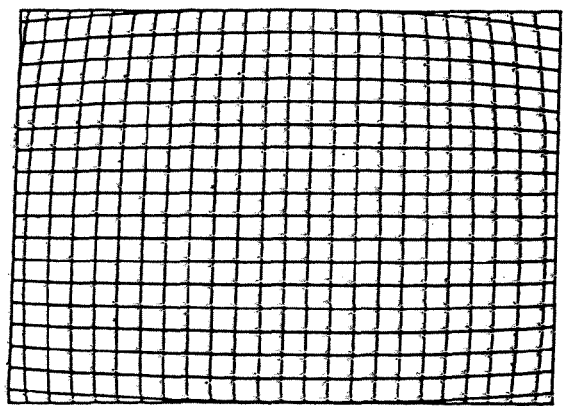
FIG.12A
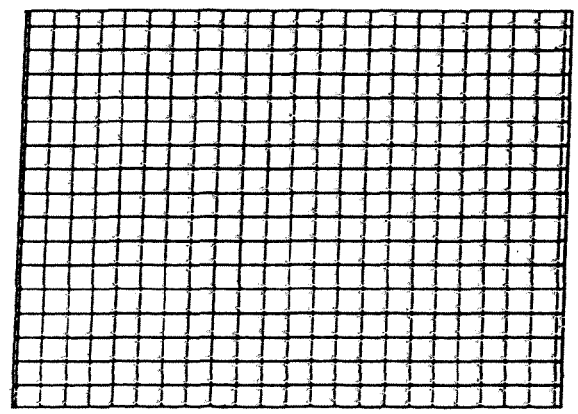
FIG.12B

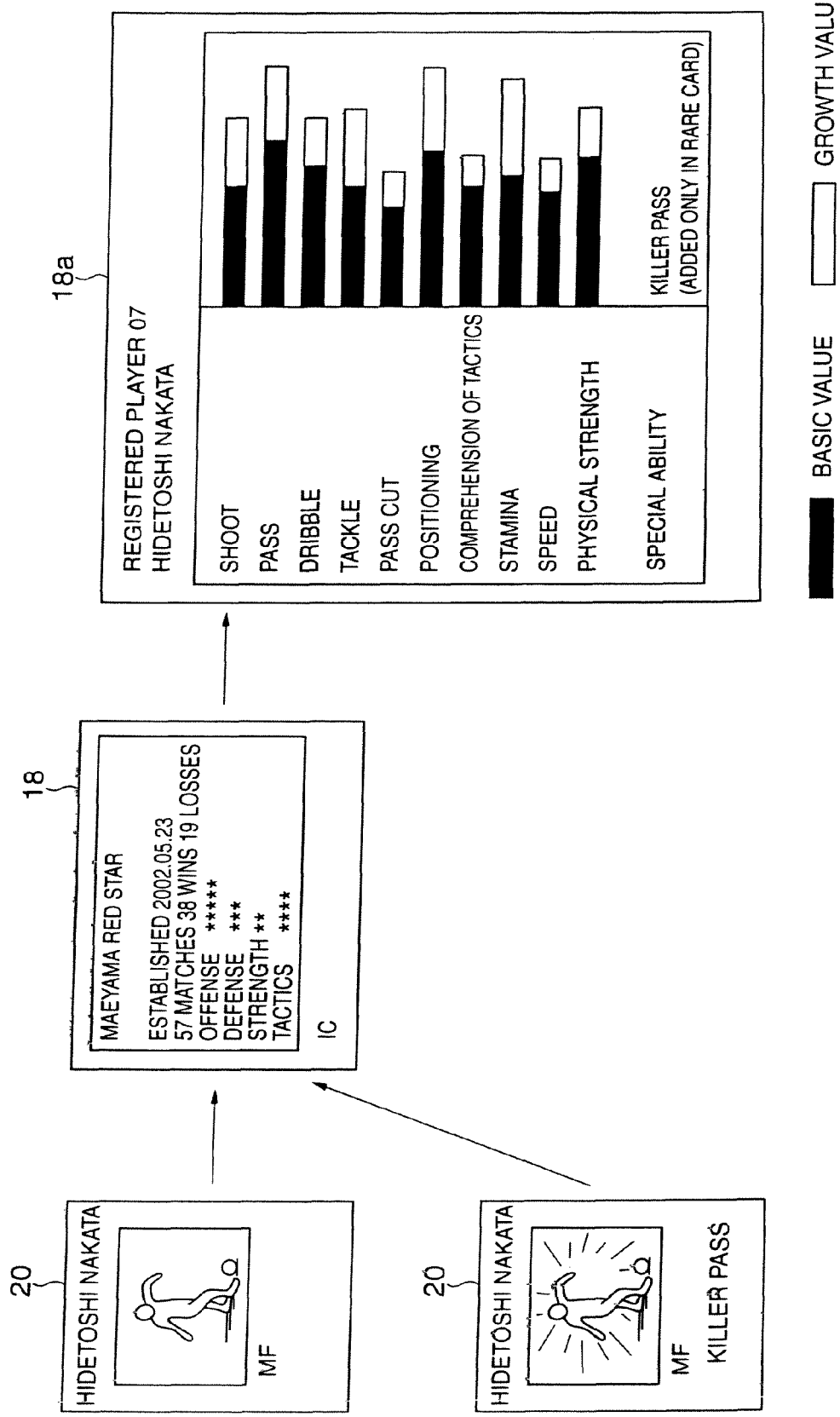

CARD GAME DEVICE, CARD DATA READER, CARD GAME CONTROL METHOD, RECORDING MEDIUM, PROGRAM, AND CARD

CROSS-REFERENCE TO RELATED APPLICATIONS

This application is a divisional of application Ser. No. 10/239,856, filed May 7, 2003, which is the national stage of International Application No. PCT/JP02/00849, filed Feb. 1, 2002 and Japanese Patent Application Nos. 2001-027558, filed Feb. 2, 2001, and 2001-361507, filed Nov. 27, 2001, the entire contents of each of which are incorporated herein by reference.

TECHNICAL FIELD

The present invention relates to a card game apparatus, a card game control method, a card data reading apparatus, a recording medium, a program, and a card, which are configured such that a predetermined video game is provided, contents of which are in accordance with a set of data of cards placed on a play field, by automatically reading card data stored on the back of the card, when the card is placed on the play field.

BACKGROUND ART

Some games that use cards determine win or lose according to a predetermined rule that defines combinations of different cards, for example, 52 cards in the card game where each player collects and arranges the cards in hand of each player.

Further, among sport fans of such as soccer and baseball, collection and exchange of cards that bear popular players' photographs, the cards being called "trading cards", are prevailing.

Various methods of enjoying a game, like card games, according to a predetermined rule using such trading cards are proposed. For example, a proposal has been made by a Japanese provisional-patent-publication No. 2000-288155. In this kind of card game, each of players submits a card of a character printed on the back of the card, and compares magnitude of various capacities of the character (a level value assigned to every character) such that an owner of the card that bears the largest level value wins.

However, in such a card game, for example, there is a problem that rules require complicated combinations of the cards, causing it difficult to learn the game easily.

As a game apparatus that alleviates such a dissatisfaction of a player, a proposal has been made, for example, by a Japanese provisional-patent-publication No. 2000-157744. There, the proposed game apparatus accepts a cassette to which game data is recorded, portable game machines owned by game players are connected by a cable, a card game is provided more easily, by viewing card images displayed on a screen. In this case, win or lose is decided also by character information stored in the cassette that is installed in the portable game machine. In this manner, a game player can enjoy a game by beating a character of the cassette of the counter-player, collecting cassettes of a stronger character.

However, when a game is performed by looking at virtual card screen displayed on the game machine as mentioned above, pleasure of collecting real trading cards cannot be experienced.

Further, with the card game apparatus that generates a game image by reading card data printed on the card, there is a case that card data may be unable to be read due to aging of the card and the like, and a game cannot be started, staying in a standby state and causing delays of the game start.

Further, in such a card game apparatus, it is necessary to entertain a gallery, including an audience and people waiting for game playing, who desire to know how the game is progressing.

Further, in a card game apparatus that allows participation through using the card bearing the card data printed, only the cards that are legitimately purchased can be used. It is necessary to check if a would-be-player owns a legitimate card. Since a coin is not returned even when the would-be-player cannot participate in a game because the card is not presented or the card is not legitimate (an imitation card) after the coin is inserted. In this manner, there is a possibility of a trouble occurring.

Further, it is necessary that the card game apparatus detects not only an ID code for recognizing a card but also a position and direction (angle) of the card. For this reason, if the ID code, the position and the direction (angle) are to be simultaneously analyzed from an image data obtained by an image sensor, for example, a large number of parameters have to be processed in computation, requiring a considerable period of time.

Further, in order to process the computation at a high speed, an effective method is to screen necessary data and to eliminate unnecessary data through processing the data one by one. However, when a conventional 2-dimensional bar code is used as data pattern for recognizing the card, the bar code has to be read in a direction orthogonal to the bars, requiring a detection of the card angle, which increases the number of the parameters to be simultaneously processed, causing a delay in starting a game.

DISCLOSURE OF INVENTION

The present invention aims at offering a card game apparatus, a card data reading apparatus, a card game control method, a recording medium, a program, and a card, which solve the above-mentioned problems.

More specifically, the objective of the present invention is offering the card game apparatus, the card data reading apparatus, the card game control method, the recording medium, the program, which are capable of reading the information stored in two or more cards placed on the play field, deciding win or lose of a game by a simulation of a match according to the combination the cards, and providing a smooth progress of the game according to the combination of the two or more cards, and the card adequate for collection.

In order to attain the above-mentioned objective of the present invention, the data of the card placed on the play field is read by a card data reading means, a game image according to the card data is displayed, and a simulated team-play game is provided by displaying the game image according to the combination of the card data of the cards placed on the play field by a game player.

Since the present invention provides a card direction detection means for detecting direction of the card placed on the play field, the card data can be read according to the direction of the card.

Further, the play field according to the present invention is structured by a transparent board on which a sheet material is laminated, the sheet material being semi-transparent to or permeating invisible light, and indicates card placement areas according to contents of the game such that a virtual ground according to events, such as soccer and baseball, is formed on the play field.

Further, since the trading card on which an individual character according to the contents of the game is printed on a surface of the card is used according to the present invention, cards of various characters (for example, sport players) corresponding to the game can be collected, and cards of favorite players and popular players can be collected and enjoyed. Further, an internal structure can be made invisible to the game player.

Further, according to the present invention, a data pattern that corresponds to unique data of a character printed on the front surface of the card is printed on the front or the back surface of the card. By reading the data pattern, properties of the character (for example, a sport player's ability) of the card can be reflected in the game.

Further, the card data reading means of the present invention includes a luminous source that irradiates invisible light to the back of the card, an image sensor that receives the invisible light reflected from the back of the card and generates image data, a data recognition means that discriminates the card data from the image data obtained by the image sensor. In this manner, the characteristics (for example, a sport player's ability) recorded in the cards placed on the play field are obtained as image data, without awareness of the game player, shortening time required by reading of the data pattern.

Further, according to the present invention, a marker is prepared in the four corners of the play field for detecting distortion of an image. An amount of displacement of the marker prepared in the four corners of the play field is obtained from the image data obtained by the image sensor. Based on the displacement amount, reading errors of the card data is compensated. In this manner, the data pattern that represents the characteristics (for example, a sport player's ability) recorded on the cards placed on the play field is accurately detected.

Further, since according to the present invention, a reflective board is provided in a predetermined angle to the back surface of the card such that the light reflected from the back of the card is directed to the image sensor, the card data reading means is realized compactly.

Further, since according to the present invention, a cabinet includes the play field on the upper surface, the card data reading means, and an inclination part that supports the reflective board such that the reflective board is installed in the predetermined angle to the play field. This configuration provides a room for the legs of the game player at the bottom of the inclination part, facilitating operations when the game player arranges cards on the play field.

Further, in order to attain the above-mentioned objective of the present invention, a game image chosen from image data stored in a storage means is displayed according to the combination of the card data read when the data recorded on the back of the card placed on the play field is read, making it possible to carry out the simulation of a match of the team formed by the combination of the card data read from the cards.

Further, according to the present invention, since a sport player is printed on the card surface, and digital data containing evaluated ability of the sport player is stored on the card back, the card can be a collection item as a trading card while being able to be presented as the card data required to start a card game by placing the card in a predetermined position of the play field.

Further, in order that the present invention attains the above-mentioned objective, an individual data of a soccer player, which is stored on the back of the card placed on the play field, is read, a play level of a team is set up according to a combination of each player's individual data stored in two or more cards, an arbitrary image data stored in the storage means is selected according to the team parameter that is set up, and the selected game image is displayed. In this manner, a soccer game is simulated by displaying a soccer game image according to the combination of the individual data of the soccer player, which is stored in the cards placed on the play field by the game player.

Further, according to the present invention, since the individual parameter of the player is updated according to each player's amount of exercises, the game player can raise each player's game level.

Further, according to the present invention, the team parameter set up by a team parameter setting means, and each player's individual parameter set up by an individual parameter setting means are stored. In this manner, exercise in a previous game, and results of the previous game are reflected in a next game.

Further, in order that the above-mentioned objective is attained, the present invention provides a control means that is configured to display a simulation image on the monitor, the simulation image showing a game between teams trained by game players, each game player forming a team by presenting a plurality of cards. Each game player participates in the game as a coach of the team.

Further, in order that the above-mentioned objective, the present invention provides two or more terminal apparatuses that read the card data, a main control unit to which individual game data is transmitted from the terminal apparatuses, and a large-size display that is connected to the main control unit and displays the game image according to progress of each game of the terminal apparatuses such that a large number of game players can operate the terminal apparatuses simultaneously, and enjoy a game.

Further, according to the present invention, the main control unit selects two terminal apparatuses, each being operated by a player, from the plurality of the terminal apparatuses such that game data of the selected two apparatuses is matched. In this manner, a game player can enjoy a game with an unknown game player through a computer, and they can match their respective capabilities.

Further, according to the present invention, when a terminal apparatus cannot find another terminal apparatus to match among the plurality of the terminal apparatuses, a computer of a terminal apparatus selected from remaining terminal apparatuses serves as an opponent team. In this manner, even when the number of game players is insufficient, a game can be provided.

Further, according to the present invention since a digest scene of an individual game among a plurality of ongoing games that are played by inputs from the plurality of the terminal apparatuses is displayed on the large-size display, customers waiting for turns can be entertained without being bored of waiting, and beginners can learn from watching the game, enhancing customer attentions.

Further, according to the present invention, if no digest scenes of individual games among the plurality of games played by input from the plurality of terminal apparatuses are available, selected game scenes from past games are provided on the large-size display such that customers waiting for turns can be entertained without being bored of waiting, and beginners can learn from watching the game, enhancing customer attentions.

Further, according to the present invention, if no digest scenes of individual games among the plurality of games played by input from the plurality of terminal apparatuses are available, progress information on current games is displayed such that customers waiting for turns can be entertained without being bored of waiting, and beginners can learn from watching the game, enhancing customer attentions.

Further, in order that the objective of the present invention is attained, alternative data is generated when the data cannot be read from the card placed on the play field by the card data reading means, due to aging of the card and the like. A card game can be started using the alternative data, avoiding delays in games due to inability to read the card.

Further, the present invention attains the objective by using arbitrary card data of past games extracted from the storage means when the data of the card cannot be read by the card data reading means after a game start. This is offered as alternative card data that is used in place of the card data. Even when the data of the card cannot be read due to, for example, aging of the card etc., a game can be started, using the alternative card data instead, and the game delay due to inability to read the card is avoided.

Further, according to the present invention, only position information of the card placed on the play field is read when the data of the card cannot be read. In this manner, the position of the card, to which the alternative card data is to be used, can be recognized.

Further, according to the present invention, the position information of the card that cannot be read among the cards placed on the play field is provided to the game player, prompting for an exchange of the card, when the data of the card cannot be read by the card data reading means. By the game player exchanging the card with another card, a game can be started, and the game delay can be avoided.

Further, the present invention provides the storage means configured to store the card data used in a previous game, and a corrected card data generation means that generates corrected card data from the card data stored in the storage means when the data of the card cannot be read by the card data reading means in this game. In this manner, the card data used in the previous game and stored in the storage means can be used as the corrected card data, thereby a game delay is avoided.

Further, according to the present invention, a coin insertion is accepted after the reading means has read the card information stored in the memory card, and then, a card game is started. In this manner the game can be started based on the data of the card read from the memory card owned by the game player, and a would-be-player without a memory card is prevented from participating in the game.

Further, according to the present invention, since the memory card owned by the game player stores at least the kinds of the cards, and the skill and the past game result of a player corresponding to the card, data required for a game is obtained by reading the information stored in the memory card, including a qualification for the game player participating in a game.

Further, according to the present invention, a coded pattern recorded on the card is read by an optical reading means using infrared rays. By applying ink that transmits the infrared rays to the surface of the coded pattern, the coded pattern can be protected from being viewed, forged and modified.

Further, according to the present invention, a position detection means is provided, which detects the position of a position detection circle by detecting inner circumference outline data formed by the inner circumference of the position detection circle and the inside of the position detection circle, and outer circumference outline data formed by the outer circumference of the position detection circle and the outside of the position detection circle, such that an accurate card position (coordinates) is obtained regardless of a direction (angle) of the card.

Further, according to the present invention, since the position detection means generates the inner circumference outline data and the outer circumference outline data from a density difference between the outline and the circumference of the position detection circle, an accurate card position (coordinates) is detected.

Further, the present invention attains the objective by providing the play field on which a selection of cards that store unique data are placed, and the card data reading means configured to read the data of the cards placed on the play field, such that a plurality of the cards can be read simultaneously, shortening the reading time.

Further, the present invention provides a player selection mode wherein players that form a team are selected from the plurality of player cards, a player exercise mode wherein selected players exercise, a game mode wherein the image of the game is generated according to parameters of each player and the team, as updated by an exercise program, and a message selection mode wherein a message is selected from a plurality of messages, the message being displayed before, during and after the game. These modes are performed such that the selected message is reflected to the game, the selected players can be trained to raise the level of the team, and results of the exercise can be determined through the game.

Further, the present invention enables a game player to carry out a simulation of the game of a team play with game images displayed, according to players' parameters and team parameters, which are stored in the plurality of the cards placed on the play field, by providing a computer with a program for executing a step 1 wherein players who form a team are selected from the plurality of the player cards, a step 2 wherein each player selected in the step 1 exercise, a step 3 wherein the image of the game is generated according to each player's parameters and team parameters that are updated by the step 2, and a step 4 wherein guidance is given to each player after the game.

Further, the present invention provides a first step wherein the inner circumference outline data formed by the inner circumference of the position detection circle and the inside of the position detection circle, which were recorded on the card, is generated, a second step wherein the outer circumference outline data formed by the outer circumference edge of the position detection circle and the outside of the position detection circle is generated, and a third step wherein the position of the position detection circle is detected by detecting the inner circumference outline data and the outer circumference outline data, and the steps are performed such that the card position (coordinates) is accurately detected.

Further, the present invention provides a first step wherein the position of the position detection circle recorded on the card is detected, a second step wherein an angle detection pattern formed in the outer circumference of the position detection circle is detected, a third step wherein a pattern recorded inside the position detection circle is detected, and a fourth step wherein a pattern recorded on the outside of the position detection circle is detected. The steps are configured such that the card position (coordinates) and card data are accurately detected at a high speed.

Further, the present invention provides a first step wherein information stored in the memory card inserted in a memory card insertion unit is read, a second step wherein a coin insertion is accepted after reading the information stored in the memory card, and a third step wherein a card game is started after receiving the coin inserted. By performing the steps, a game can be started based on the data of the card read in the memory card that a game player owns, and a would-be game player who does not own a memory card can be prevented from participating in a game.

Further, according to the present invention, a unique character according to contents of the game is printed on a front surface of the card, and the card data for recognizing properties of the unique character is recorded on the front or back surface. In this manner, the card that bears patterns corresponding to various games and characters (e.g., sport players) serves collection purposes, while providing data such as properties of the characters (e.g., ability of the sport players) for playing the card game.

Further, since the present invention provides the coded pattern that curves in the direction of the circumference as the stored card data, the coded pattern can be read irrespective of the direction (angle) of the card.

Further, the data pattern is printed in ink that absorbs invisible light according to the present invention such that the signal according to the properties of the characters printed on the surface can be read when the invisible light is irradiated. In this manner, while the data patter of the card can be read correctly, the inside of a case can be made dark such that the card data reading means may not be visible from the upper part of the play field.

Further, according to the present invention, since two or more different patterns having different radii are formed in the shape of concentric circles, a pattern for position detection and an information pattern can be separately stored, and the time required of reading control can be shortened.

Further, according to the present invention, since the coded pattern is formed such that an optical reading means using infrared rays can read, the surface of the coded pattern can be printed with an infrared transmitting paint, such that the coded pattern is invisible, hiding the information contained in the card.

Further, according to the present invention, as for the circular pattern of the coded pattern, which has the largest radius, being greater than the dimension of the shorter edge of the card that is rectangular, only parts of the circular pattern are printed, i.e., only arcs are printed. In this manner, the whole surface area of the card is effectively utilized.

Further, since the coded pattern has the position detection circle for detecting the card position, the inside data formed inside the position detection circle, and the outside data formed in the outside of the position detection circle according to the present invention, the coded pattern for the card position and the coded pattern showing data unique to the card can be stored, increasing the amount of information, and enabling a high-speed process.

Further, according to the present invention, since the angle detection pattern for detecting the angle of the card is arranged at an uneven interval on the outer circumference of the position detection circle, the angel detection pattern is detected, and the direction (angle) of the card is correctly determined, after the card position detection.

Further, according to the present invention, since the coded pattern is formed on both sides of the card, the coded pattern can be read even if the card is placed in reverse.

Further, according to the present invention, since different coded patters can be recorded on each side of the card, different data can be provided depending on which side of the card is faced down.

Further, according to the present invention, since letters and an image according to the information contents of the coded pattern are printed over the coded pattern, hiding the coded pattern, forgery and tampering of the coded pattern are prevented.

BRIEF DESCRIPTION OF DRAWINGS

FIG. 6 is a plan view expanding and showing the player card arrangement panel 24 and an operation unit of a terminal apparatus 16a.

FIG. 11A is a figure showing an example of 3 dots chosen by noise cut filter process.

FIG. 11B is a figure showing an example of 3 dots updated by noise cut filter process.

FIG. 12A is a figure showing an example of an image display before spherical surface compensation filter process.

FIG. 12B is a figure showing an example of the image display after the spherical surface compensation filter process.

FIG. 22 is a figure for explaining the data stored in an integrated circuit card 18.

BEST MODE FOR CARRYING OUT THE INVENTION

Embodiments of the present invention are explained with reference to attached drawings.

Figure 1:
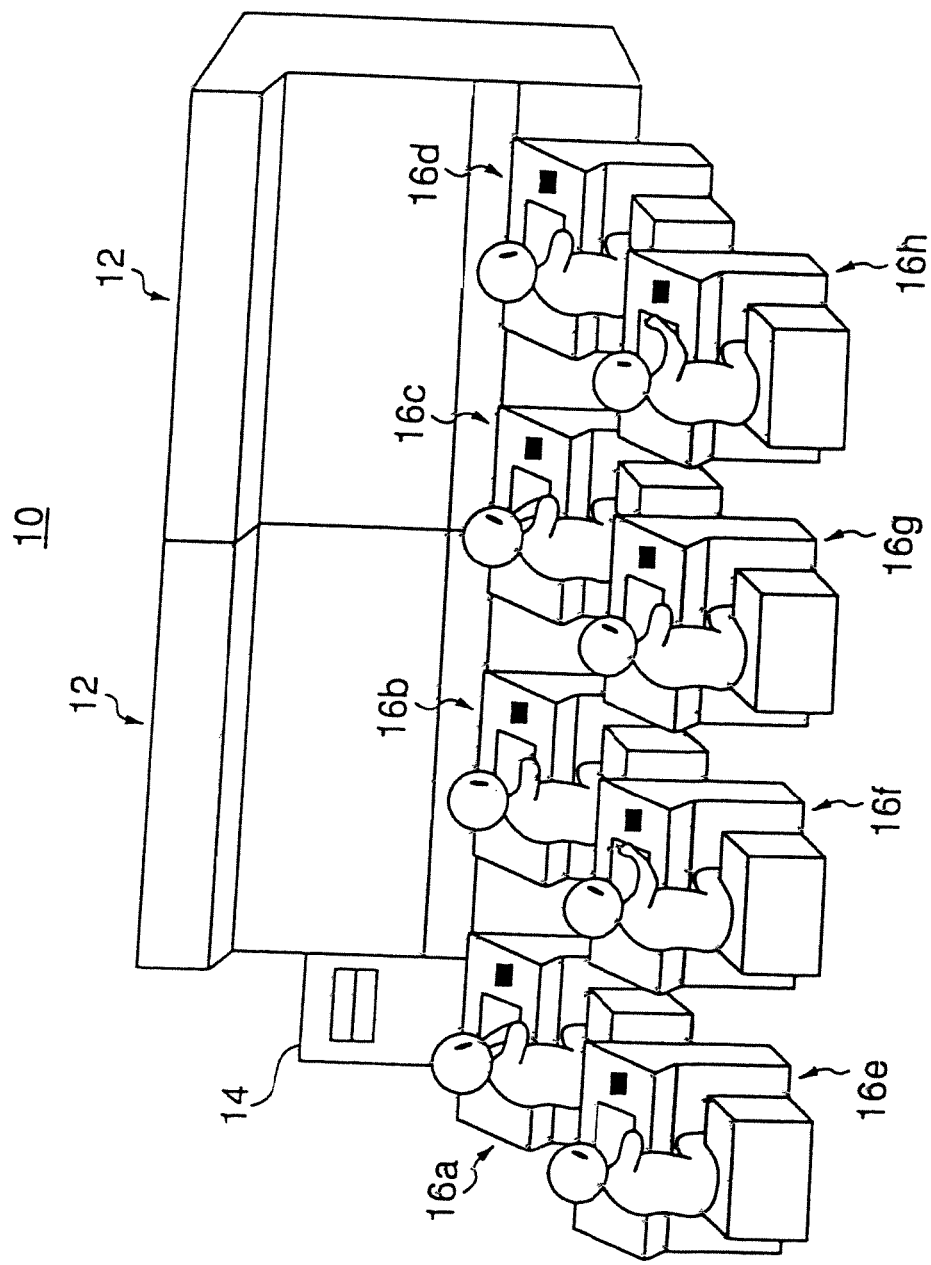
FIG. 1 is a perspective diagram showing an overall configuration of an embodiment of the card game apparatus of the present invention.
Figure 2:
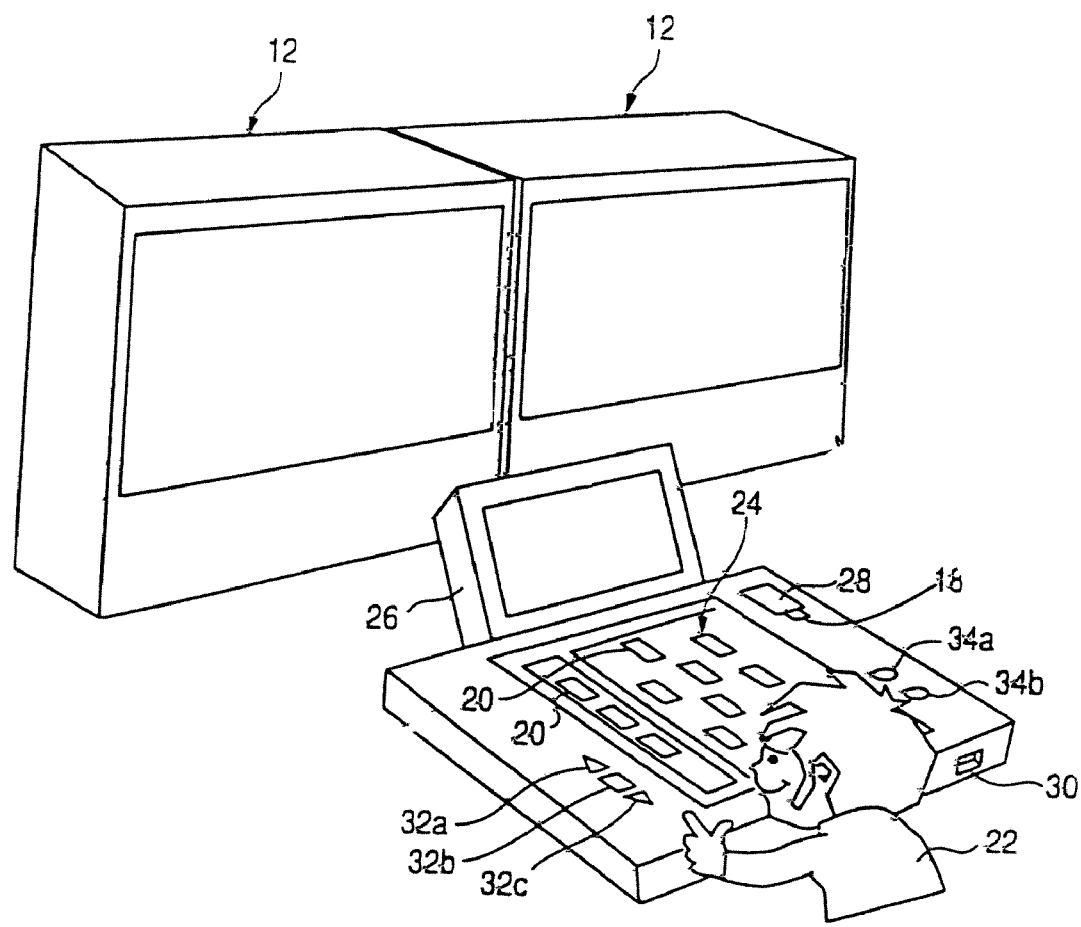
FIG. 2 is a perspective diagram showing the terminal apparatus of the card game apparatus of the present invention, which each game player operates.

FIG. 1 is a perspective diagram showing an overall configuration of an embodiment of the card game apparatus of the present invention. FIG. 2 is a perspective diagram showing the terminal apparatus of the card game apparatus of the present invention, which each game player operates.

As shown in FIG. 1 and FIG. 2, a card game apparatus 10 includes two large-size panel display 12, a main control unit 14 that controls display of the large-size panel display 12, and a plurality (8 in the present embodiment) of terminal apparatuses 16a through 16h that are connected to the main control unit 14 such that communications are possible.

The card game apparatus 10 provides a soccer game in this embodiment, however, it can also provide other team games such as baseball, rugby, American football, and hockey.

On the large-size panel display 12, images, such as the whole soccer stadium image, a game digest of all seats, and a game result of all seats, are displayed. A game player participating in a game for the first time purchases a starter set (item) required for the game, and takes one of the seats each of which is provided with each of the terminal apparatuses 16a-16h. The starter set includes an integrated circuit card (memory card) 18 used as a recording medium that records an exercise result, a game result, etc., and eleven player cards 20 on each of which soccer player's photograph is printed.

Here, on the surface of each of the player cards 20, a photograph of different players is printed as described later, and on the back side, a data pattern (identification code) is recorded, which is for identifying the individual player printed on the surface. Further, on the integrated circuit card 18, at least, the kind of the player cards 20, and skill and past game results of the player corresponding to the card data of the player cards 20 are stored. Therefore, while data required for a game is obtained by reading the information stored in the integrated circuit card 18, a qualification of the game player 22 for participating in the game is checked.

Since the terminal apparatuses 16a-16h are configured identically, explanations hereunder are based on the terminal apparatus 1ea.

Figure 3:
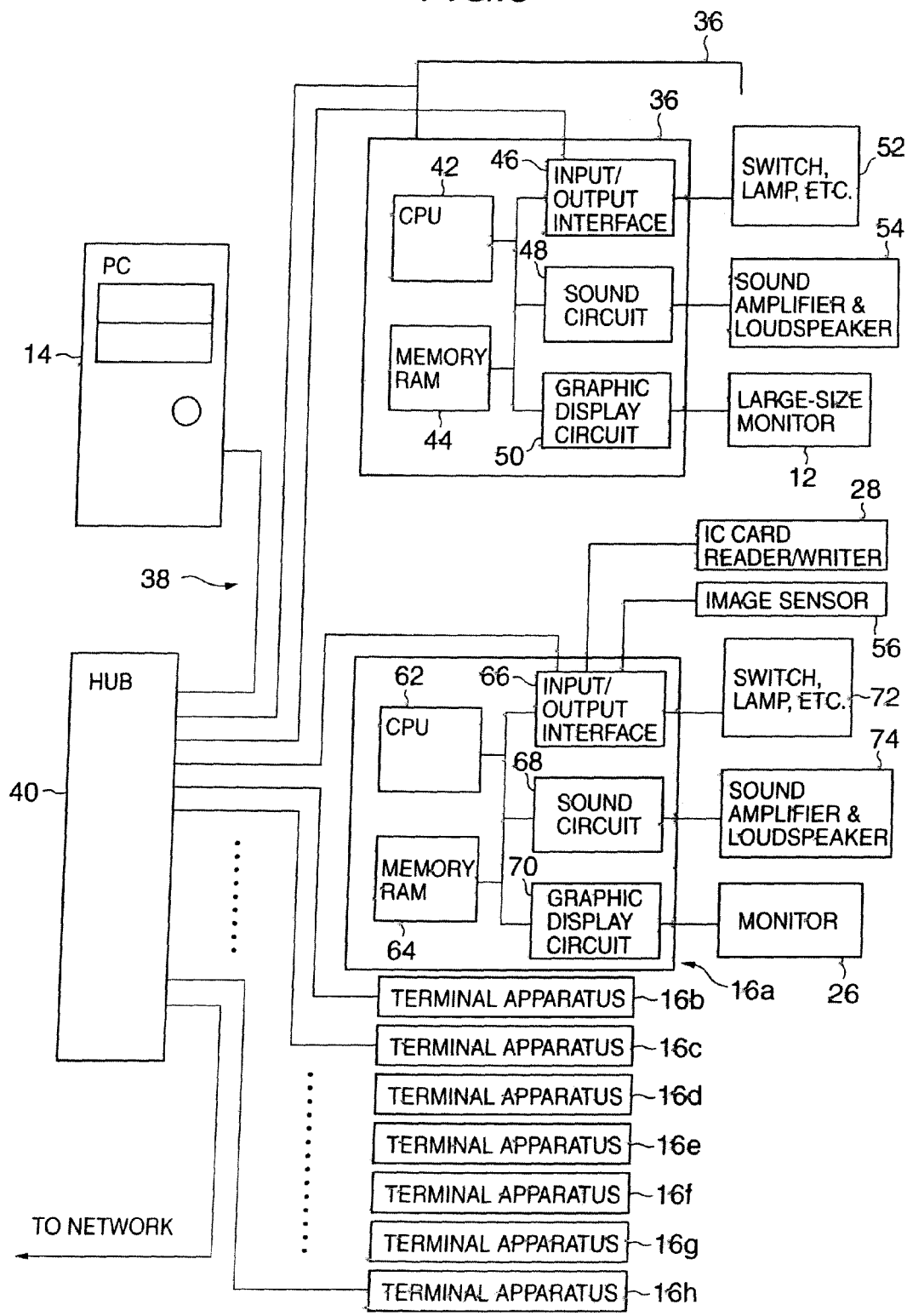
FIG. 3 is a block diagram showing the system configuration of the embodiment of the card game apparatus of the present invention.

The terminal apparatus 1a includes a player card arrangement panel 24 for laying the player cards 20 that the game player 22 owns, a monitor 26 that displays images of an exercise and a game of a soccer team organized by the game player 22, an integrated circuit card reader/writer 28 into which the integrated circuit card 18 is inserted, and a card issue unit 30 that issues a card to the game player after a game is over. Further, on the left-hand side of the player card arrangement panel 24, strategy direction buttons 32a-32c for carrying out strategy selection directions according to a strategy menu are provided. On the right-hand side of the player card arrangement panel 24, input buttons 34a and 34b that input player power etc. are provided. The game player 22 can give directions to a player during the exercise or the game by operating the strategy buttons 32a-32c. That is, the game player 22 operates the strategy buttons 32a-32c, directing, for example, tactics such as a side attack, a shoot to the goal, etc., and switching cameras for display on the monitor 26. FIG. 3 is a block diagram showing the system configuration of the card game apparatus of the embodiment of the present invention.

The main control unit 14 is connected to a large-size panel control unit 36 for controlling display of the large-size panel display 12 through a hub 40 of LAN (Local Area Network) 38, each of the terminal apparatuses 16a-16h, and an external network (not shown).

The large-size panel control unit 36 includes CPU 42, a memory unit (RAM) 44, an input-and-output interface 46, a sound circuit 48, and a graphic display circuit 50. A control program is stored in the memory unit (RAM) 44, the control program sorting out various image data (for example, the whole soccer stadium image, each player's playing image, a digest scene of an ongoing game, or a goal scene of past games, etc.) to be displayed on the large-size panel display 12, assigning a priority, and displaying images one by one. A switch 52 is connected to the input-and-output interface 46 for operating the main control unit 14 and the large-size panel display 12. The sound circuit 48 is connected to a sound amplifier 54 that outputs the sound according to the various images displayed on the large-size panel display 12. The graphic display circuit 50 displays the images (for example, the whole soccer stadium image, each player's playing image, the digest scene of the ongoing game, or the goal scene of the past game etc.) on the large-size panel display 12, the images being chosen by a control signal from CPU 42.

Further, each of the terminal apparatuses 16a-16h includes CPU 62, a memory unit (RAM) 64, an input-and-output interface 66, a sound circuit 68, and a graphic display circuit 70. The memory (RAM) 64 stores the various image data (for example, various game selection images, each player's playing image, etc.) to be displayed on the monitor 26, and the control program. The input-and-output interface 66 is connected to an integrated circuit card reader/writer 28, an image sensor 56 for reading the card data stored on the back of the player card 20, and a switch 72 for operating the monitor 26 in addition to the main control unit 14 is connected. The sound circuit 68 is connected to a sound amplifier 74 that outputs the sound according to the various images displayed on the monitor 26. The graphic display circuit 70 displays the images on the monitor 26, which are selected by the control signal from CPU 62.

Figure 4:
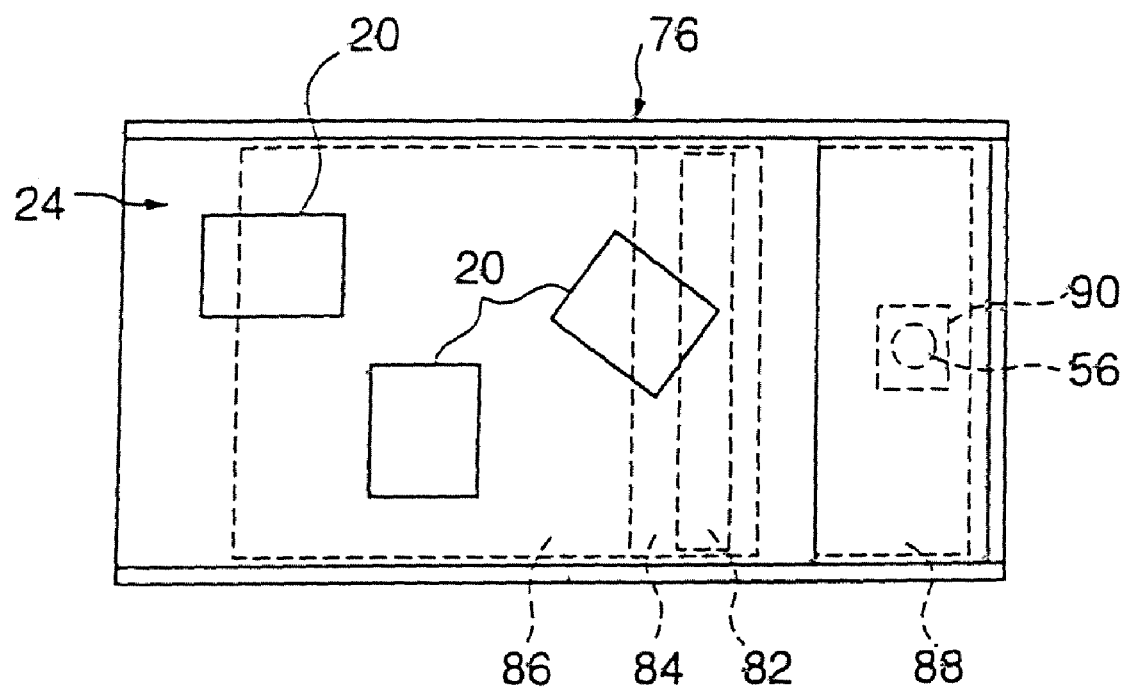
FIG. 4 is a plan view of a player card arrangement panel 24 as viewed from the top.
Figure 5:
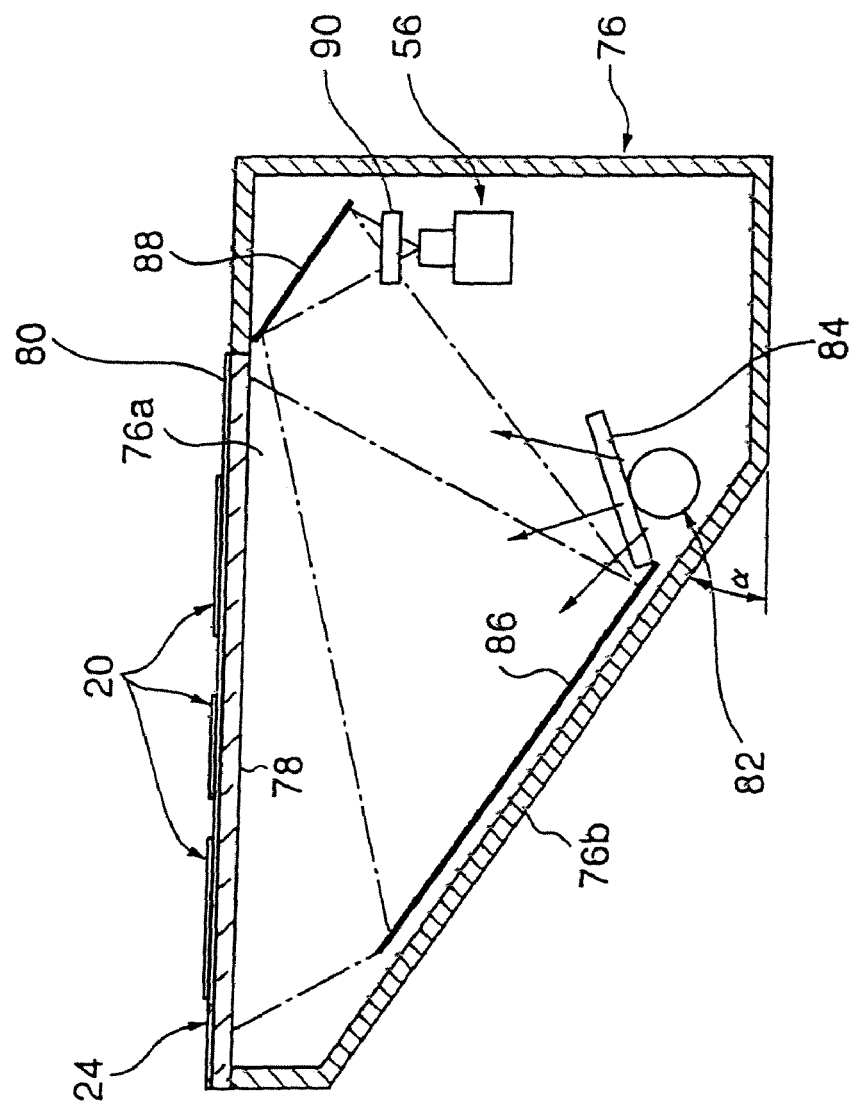
FIG. 5 is a longitudinal section drawing of a case 76 in which the player card arrangement panel 24 is installed.

FIG. 4 is a plan view of the player card arrangement panel 24 as viewed from the top. FIG. 5 is a longitudinal section drawing of a case 76 in which the player card arrangement panel 24 is installed.

As shown in FIG. 4 and FIG. 5, the player card arrangement panel 24 includes a transparent glass board 78 that is installed such that an upper surface opening 76a of the case 76 is covered, and a thin play field sheet 80 laminated to the upper surface of the glass board 78.

The player card 20 is placed on the upper surface of the play field sheet 80. Inside of the case 76, there are installed a luminous source 82 that irradiates infrared rays (invisible light) to the back of the player card 20 placed on the player card arrangement panel 24, a first filter 84 that removes visible light from the light emitted from the luminous source 82, an image sensor 56 that photographs a pattern of the card data stored on the back of the player card 20 placed on the player card arrangement panel 24, a first reflective board 86 that reflects upwards light reflected from the back of the player card 20, a second reflective board 88 that guides the light (invisible light) reflected by the first reflective board 86 to the image sensor 56, and a second filter 90 that removes disturbance light (visible light) contained in the light reflected by the reflective boards 86 and 88. The luminous source 82 includes a light emitting diode (LED) that emits the invisible light, which is not visible to naked eyes, such as infrared rays or ultraviolet rays. Of course, when the luminous source 82 does not emit any visible light, the first filter 84 can be dispensed with.

The first reflective board 86 is supported by a bottom inclination part 76b of the case 76 such that an inclination is provided at a predetermined angle α to the player card arrangement panel 24 that is prepared horizontally. Further, the second reflective board 88 is installed with an inclination at an angle according to the installation angle of the first reflective board 86.

Since the case 76 has the bottom inclination part 76b, when the game player 22 takes the seat, there is a room for the legs of the game player 22 under the bottom inclination part 76b. Therefore, when the game player 22 arranges the player card 20 on the player card arrangement panel 24, it is possible to extend a hand to an inner position of the player card arrangement panel 24, and allow the player card 20 to be placed at any desired position of the whole surface of the player card arrangement panel 24.

Since, inside the case 76, the infrared rays (invisible light) from which visible light is removed is irradiated by the luminous source 82 to the player card arrangement panel 24, the inside of the case 76 is not visible if viewed from the top of the player card arrangement panel 24.

Figure 6:
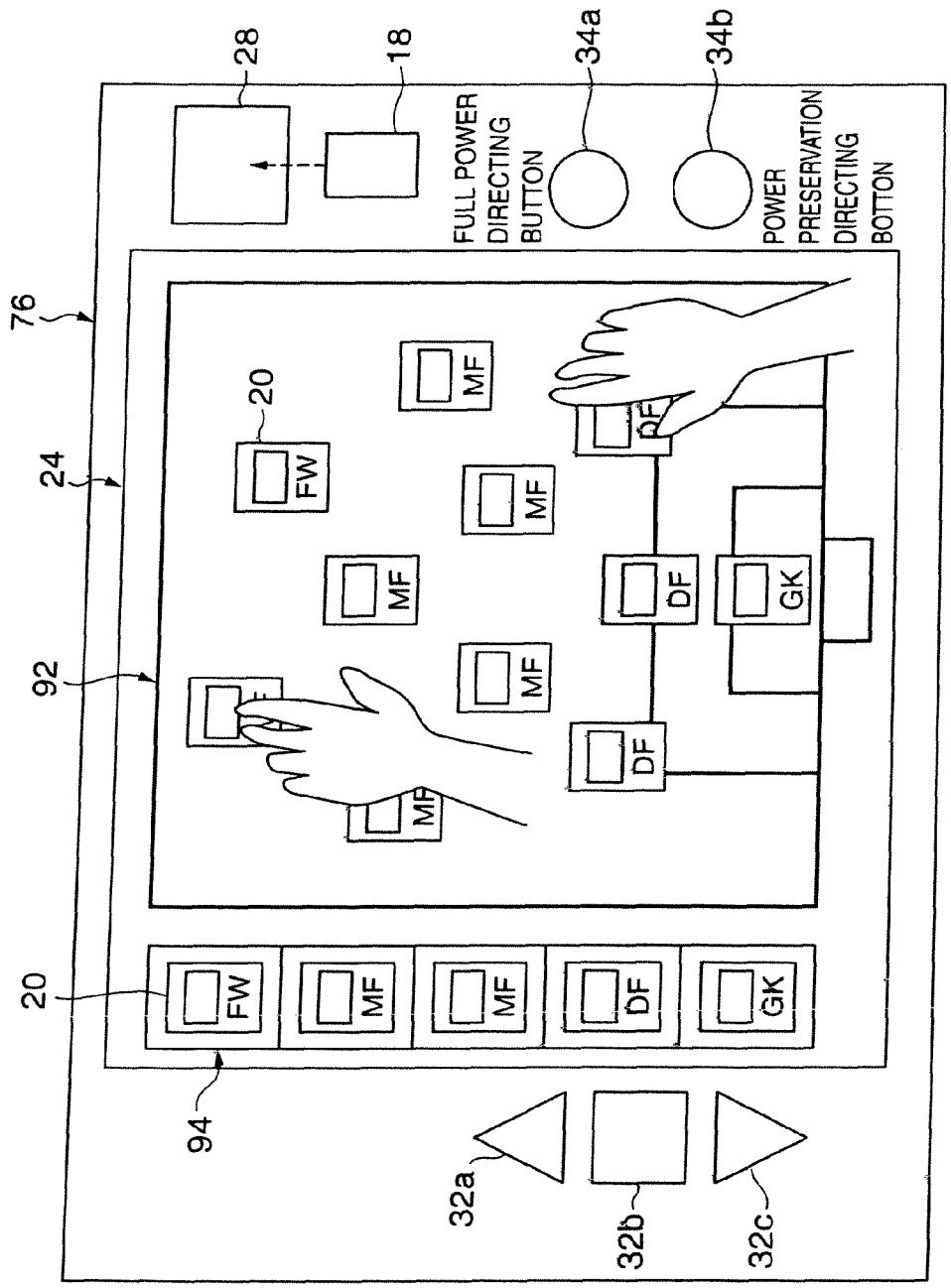

FIG. 6 is a plan view expanding and showing the player card arrangement panel 24 and operation part of the terminal apparatus 16a.

As shown in FIG. 6, the strategy direction buttons 32a-32c and the input buttons 34a and 34b that the game player operates, and the player card arrangement panel 24, are prepared on the upper surface of the case 76. The upper surface of the player card arrangement panel 24 provides a participation player card arrangement domain 92 for arranging the player card 20 that serves as a regular player, and a alternate player card arrangement domain 94 for arranging the player card 20 that serves as an alternate player.

Further, the game player 22 can place eleven player cards 20 in the participation player card arrangement domain 92 out of the player cards 20 on hand, and can arrange up to 5 player cards 20 as alternate players in the alternate player card arrangement domain 94.

The strategy direction button 32a serves as a selection button that moves a cursor on a menu screen displayed on the monitor 26 upward, and the strategy direction button 32b serves as a decision button, and the strategy direction button 32c serves as a selection button that moves the cursor on the menu screen displayed on the monitor 26 downward.

The input button 34a is an operation button for changing parameters of the player cards 20 arranged in the participation player card arrangement domain 92 to a full-power state, and the input button 34b is an operation button for changing the parameters of the player cards 20 arranged in the participation player card arrangement domain 92 to a physical power preservation level.

The integrated circuit card 18 stores various data such as team capability (growth value) according to exercise, a game result with other teams and a title gained according to the game result. The game player 22 inserts the integrated circuit card 18 to the integrated circuit card reader/writer 28, such that the terminal apparatus 16, before starting a game, reads the data stored in the integrated circuit card 18.

Figure 7:
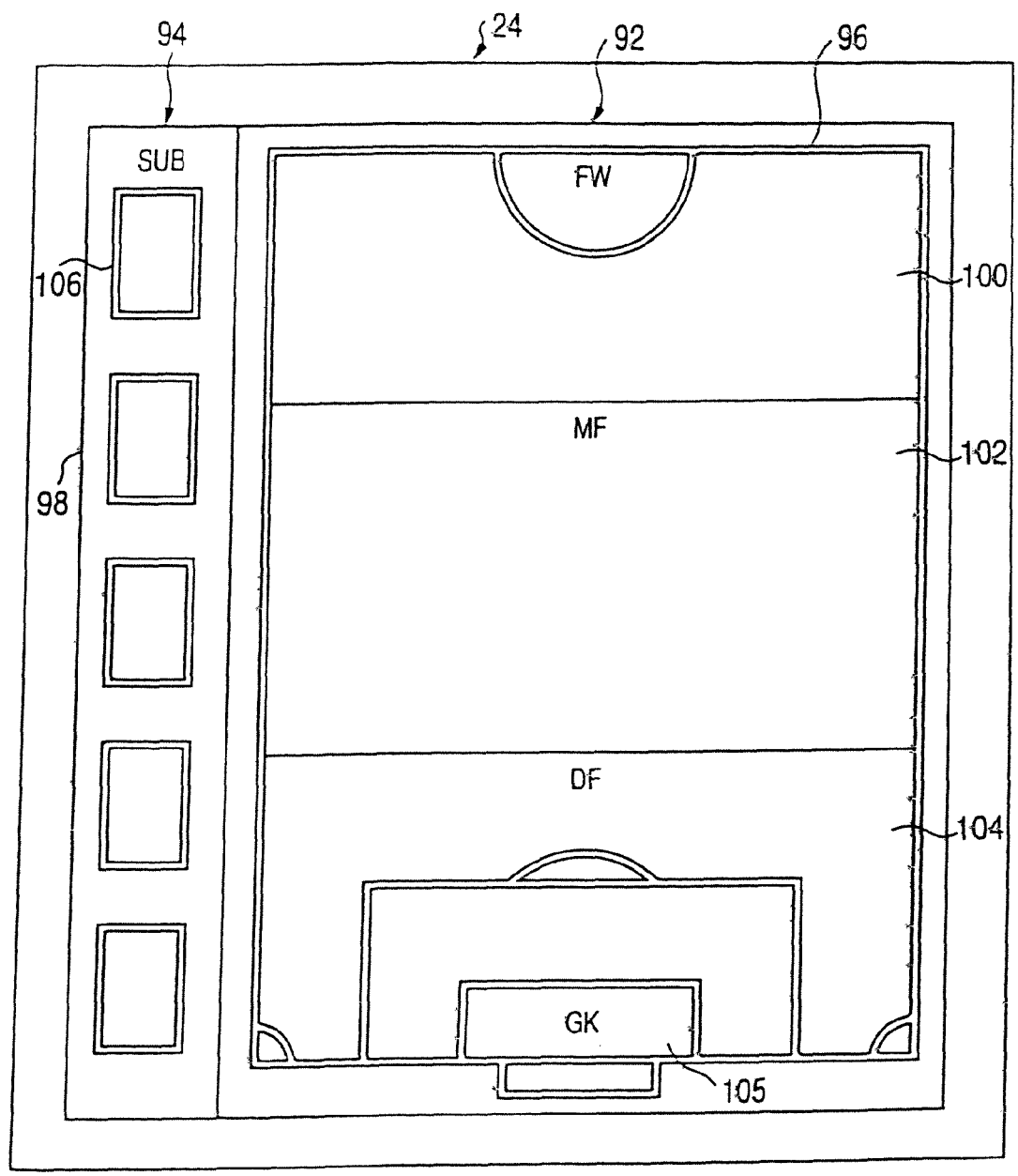
FIG. 7 is a plan view showing an example of a printed pattern of the player card arrangement panel 24.

FIG. 7 is a plan view showing an example of the printed pattern of the player card arrangement panel 24.

As shown in FIG. 7, a white line frame 96 indicating the participation player card arrangement domain 92 is shown, and a line frame 98 showing the alternate player card arrangement domain 94 are printed on the back of the play field sheet 80 of the player card arrangement panel 24. Further, on the back of the play field sheet 80, the participation player card arrangement domain 92 is divided into three blocks, namely, a forward domain 100 for arranging forward (FD) player cards 20, a midfielder domain 102 for arranging midfielder (MD) player cards 20, a defender domain 104 for arranging defender (DF) player cards 20 and a goalkeeper domain 105 for arranging a goalkeeper (GK) player card 20, and are printed in ink in which green shades differ, for example.

The domains 100, 102, 104, and 105 are printed with an infrared transmitting pigmented ink such that the card data (data including identification data and skill of the player printed on the card concerned) recorded on the back of the player card 20 can be recognized. Further, the alternate player card arrangement domain 94 is printed on the back of the play field sheet 80 in brown ink, and five yellow-colored line frames 106 are printed, where up to 5 player cards 20 of the alternate players can be placed.

Here, in the card game apparatus 10, each player printed on the player card 20 is assigned one of the positions, namely, a forward, a midfielder, a defender, and a goalkeeper. When the position assigned to the player matches with the domain in which the player card 20 is placed, a player parameter and a team parameter are set at a standard value.

However, when the position of the player assigned to by the player card 20 is different from the domain where the player card 20 is placed, the player parameter and the team parameter are set at a lower value. For example, when a forward (FD) player card 20 is placed in the defender domain 102, an offensive strength, for example, of the team will become weaker.

The game player 22 is the coach, and can decide which player card 20 is to be placed in each of the domains 100, 102, and 104. Further, the game player 22 can decide which formation to take from 3-3-4, 3-4-3, and 4-3-3 at the game start in terms of the number of the player cards 20 to be placed in each of the domains 100, 102, and 104.

Figure 8:
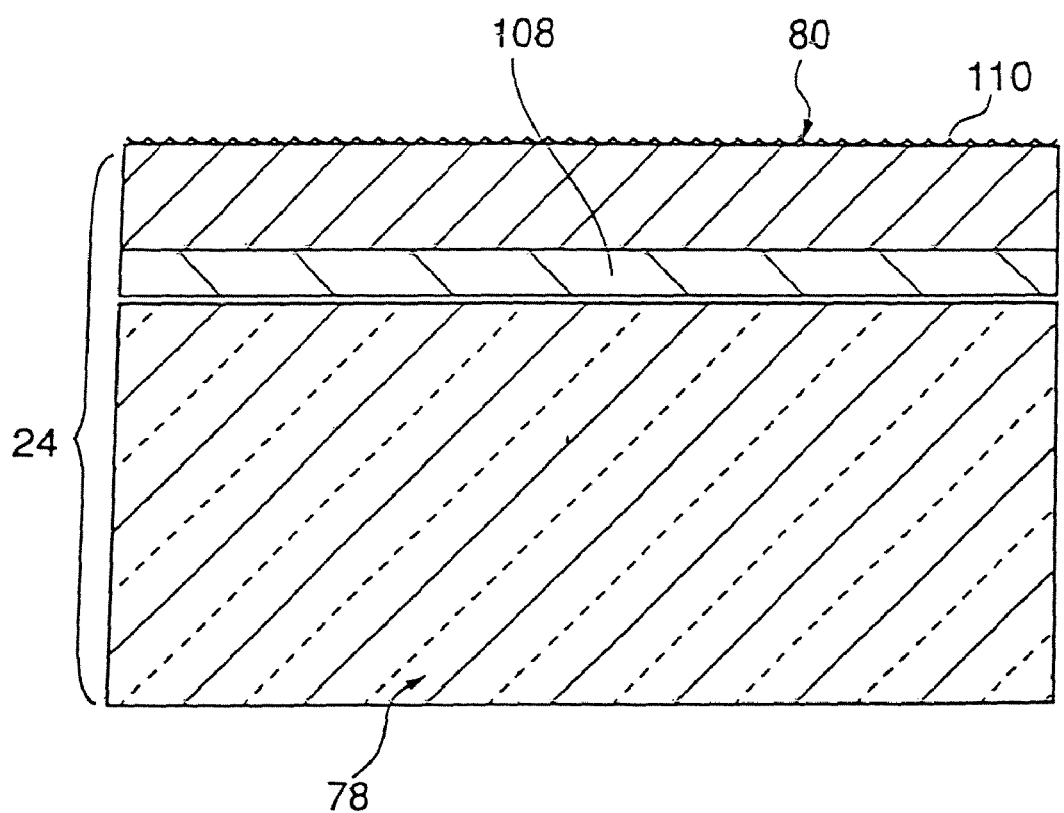
FIG. 8 is a longitudinal section drawing expanding and showing the cross-sectional structure of the player card arrangement panel 24.

FIG. 8 is a longitudinal section expanding and showing the cross-sectional structure of the player card arrangement panel 24.

As shown in FIG. 8, the player card arrangement panel 24 includes the glass board 78 serving as a reinforcement, on the upper surface of which the play field sheet 80 is laminated, the play field sheet 80 being made of transparent polycarbonate resin, and protecting the domains 100, 102, and 104, the alternate player card arrangement domain 94, the white line frame 96, and the yellow-colored line frame 106, and the like printed on the undersurface. On the upper surface of the play field sheet 80, minute unevenness 110, also called "granulation", is formed.

The minute unevenness 110 provided on the surface prevents the player card 20 from sticking, facilitating removal and replacement of the player card 20 placed. Further, since the play field sheet 80 has the minute unevenness 110 on the surface, light from the outside reflects diffusely, and it becomes semi-translucence, serving as a blinder for the inside of the case 76. Further, since the luminous source 82 emits the invisible light, the inside of the case 76 is pitch dark, and the inside of the case 76 is invisible for the game player 22 when viewed from the top of the player card arrangement panel 24.

In addition, for an ink layer 108, pigmented ink that transmits infrared rays other than black and white is used. This is because the card data is recorded by a black and white pattern, which is visible with the invisible light, on the back of the player card 20.

Figure 9:
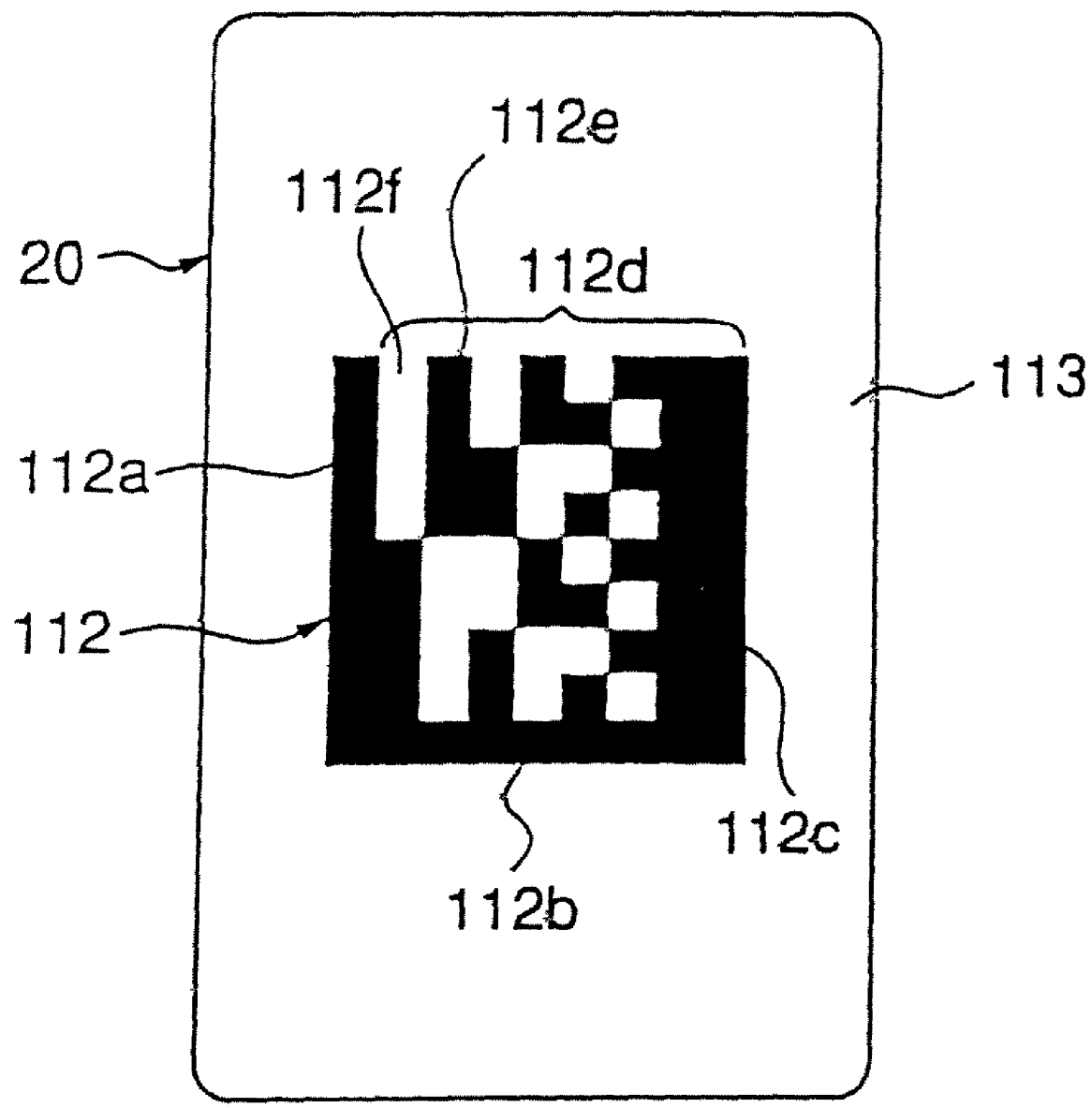
FIG. 9 is a figure showing an example of the card data stored on the back of a player card 20.

FIG. 9 is a figure showing an example of the card data stored on the back of the player card 20.

As shown in FIG. 9, a black-and-white printed pattern that is visible with invisible light is recorded on the back of the player card 20 as a record area of the card data 112. The black part of the card data 112 is invisible to naked eyes, it being printed in the special ink that absorbs invisible light, such as infrared rays. A white part 113 on the back of the player card 20 is made of paper and ink that reflect the invisible light when irradiated. Therefore, when the invisible light from the luminous source 82 is irradiated on the back of the player card 20, only the invisible light irradiated to the white part, excepting the black part, of the card data 112 is reflected, and input to the image sensor 56, and the pattern of the card data 112 is photographed.

Here, the card data 112 provides a memory domain 112*d* that is in a square shape defined by black frames 112*a*-112*c* on three sides, excepting top, namely, the left-hand side, the right-hand side, and the bottom, wherein each of a black part 112*e* and a white part 112*f* formed in the square represent one bit, and a black-and-white pattern configured by, for example, 8 bits in the vertical direction and 3 bits in the horizontal direction is printed such that it is detected.

Further, since only the top side of the card data 112 lacks of the black frame, angle of the player card 20 can be distinguished from the positions of the black frames 112*a*-112*c*. Further, since the circumference of the card data 112 is white, the outline of the card data 112 can be extracted easily.

On the player card 20, items such as a photograph of a player, the player's profile, and the like are printed with the ink that transmits the invisible light, and the card data 112 is further printed over the images (such as the photograph and profile) with the ink that absorbs the invisible light such that it is not visible with naked eyes. Further, on the back of the player card 20, the card data 112 may be printed with the ink that reflects the invisible light, and the white part 113 may be printed with the ink that absorbs the invisible light, contrary to the above.

Although the card data 112 is printed on the back of the player card 20, it can be formed by methods other than printing (for example, seal attachment, magnetic data, etc.) not limited to this.

Here, a method configured to recognize the card data stored on the back of the player card 20 is explained.

Figure 10:
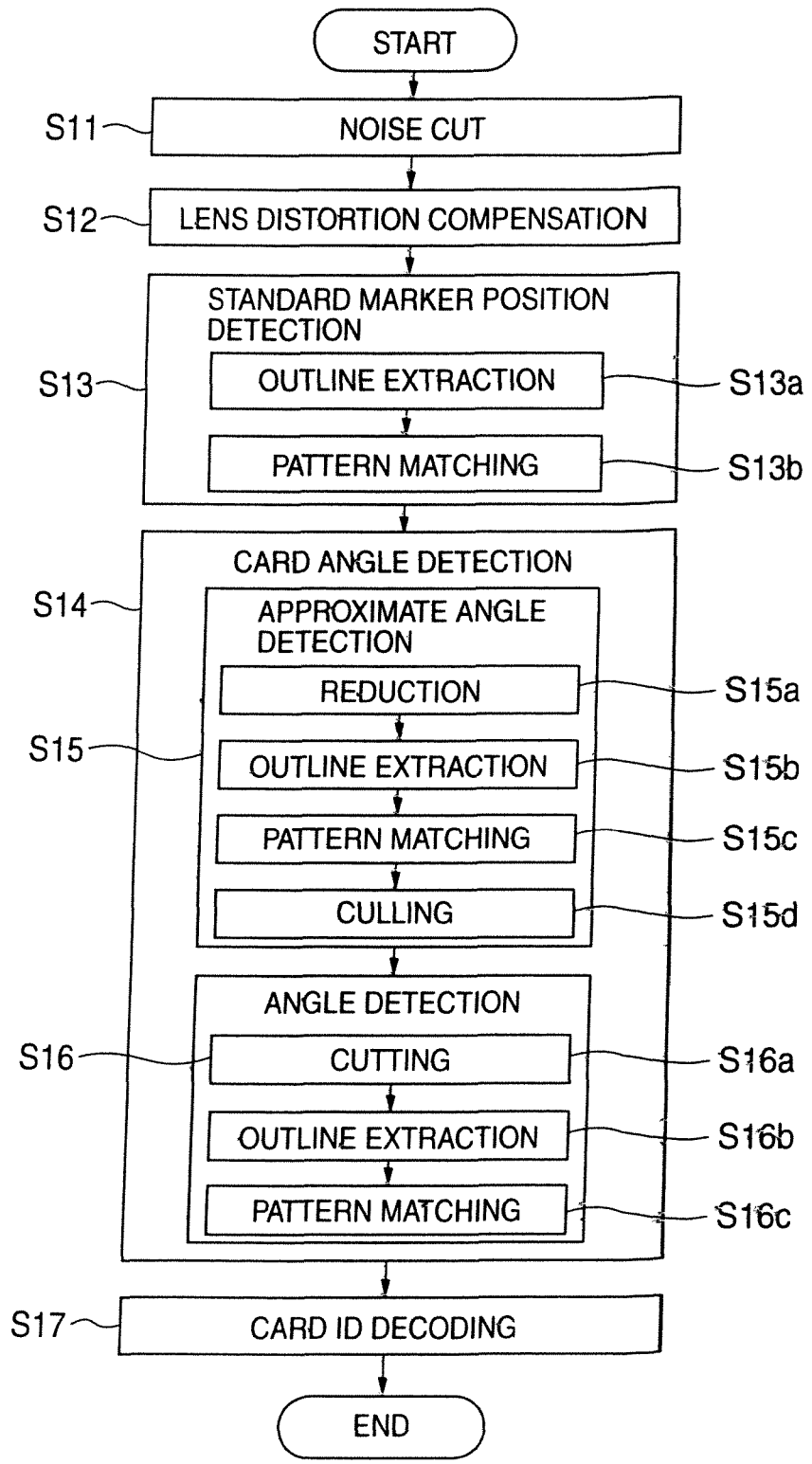
FIG. 10 is a flowchart showing control process for recognizing the card data stored on the back of the player card 20 placed on the player card arrangement panel 24.

FIG. 10 is a flowchart showing a control process for recognizing the card data stored on the back of the player card 20 placed on the player card arrangement panel 24.

As shown in FIG. 10, when a coin is inserted, CPU 62 of the terminal apparatus 16*a* performs a noise cut process using a median filter at S11. This noise cut process removes noises, such as a pixel fault of the image sensor 56.

Here, as for a target dot, an adjoining dot on the left and an adjoining dot on the right of the target dot are selected, in the horizontal direction of bits to be read. FIG. 11A shows an example of the 3 dots that are selected. Here, luminosity values of the dots are given, each value of the dots being shown in each rectangle. The luminosity values of the 3 dots are sorted in an ascending order, and a middle value is determined. In FIG. 11A, the luminosity value 21 of the left-hand dot is determined to be the middle value. The middle value is updated as shown in FIG. 11B as the luminosity value of the target dot (central dot).

Thus, the noise resulting from the faulty dot of the image sensor etc. is removable however, since resolution falls by the noise cut process, the noise cut process is not performed in the vertical direction.

At S12, spherical surface compensation filter process is performed such that distortion of the lens of the image sensor 56 is compensated. The spherical surface compensation filter process compensates the distortion of an image due to the distortion of the lens as shown in FIG. 12A, such that an image without distortion as shown in FIG. 12B is obtained. In the following, descriptions are provided based on the image having 640×480 dots.

Figure 13A:
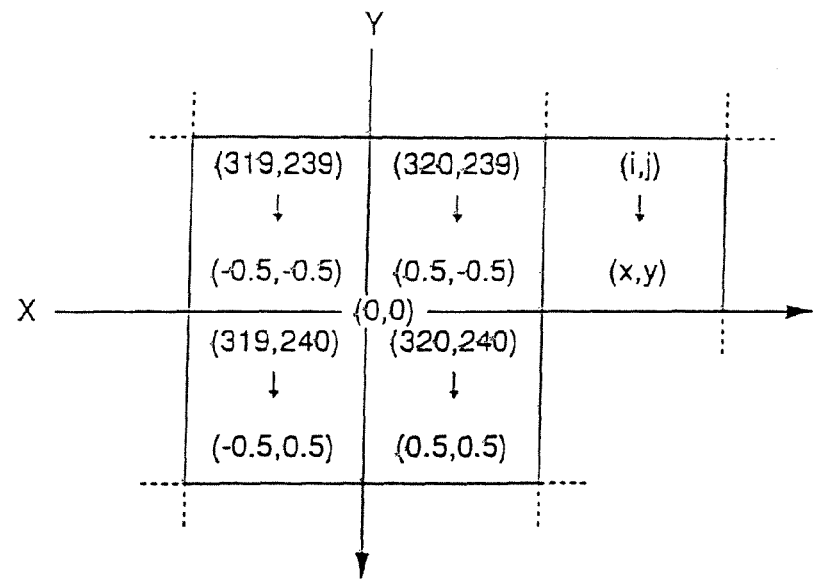
FIG. 13A is a figure for explaining coordinates conversion of the spherical surface compensation filter process.

First, an image coordinates after conversion (i, j) is converted into a coordinates (x y) wherein the center of the 640×480-dot image is defined as (0, 0), as shown in FIG. 13A, through calculations as follows.

$$x=(i-320)+0.5$$

$$y=(j-240)+0.5$$

Figure 13B:
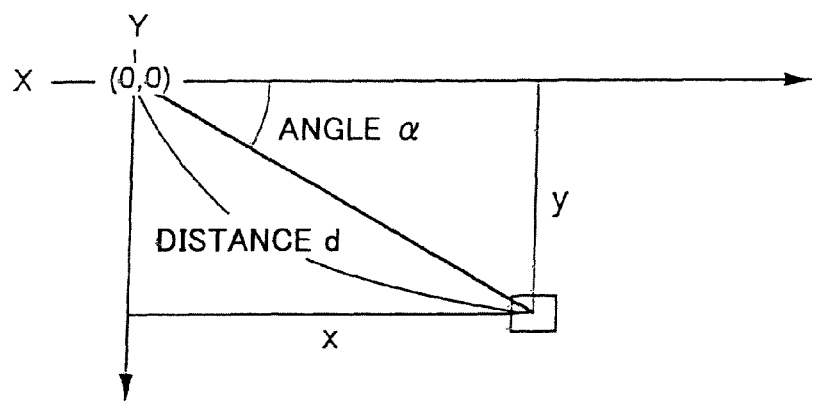
FIG. 13B is a figure for explaining an operation method for coordinates conversion.

Next, a distance d from the center of the coordinate, and an angle thereof of a dot that is being converted, as shown in FIG. 13B, are obtained through calculations as follows.

$$d=(x^2+y^2)^{1/2}$$

$$a=\arctan(y/x) \text{ when } x>=0$$

$$a=\arctan(y/x)+\pi \text{ when } x<0$$

Figure 14A:
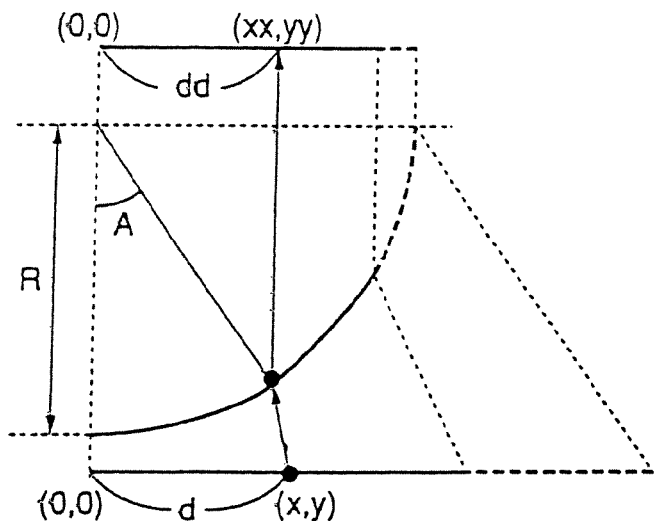
FIG. 14A is a figure for explaining an operation method to obtain a conversion source image coordinates (xx, yy) corresponding to coordinates (x, y).

Further, the following calculations are performed, in order to obtain an original image coordinates (xx, yy) corresponding to the coordinates (x y), as shown in FIG. 14A.

First, an angle A is obtained from a length of an arc d and a radius R.

$$A=(d/2\pi R)\times 2\pi=d/R$$

$$dd=R\times\cos(A)$$

$$xx=dd\times\cos(A)$$

$$yy=dd\times\sin(A)$$

Figure 14B:
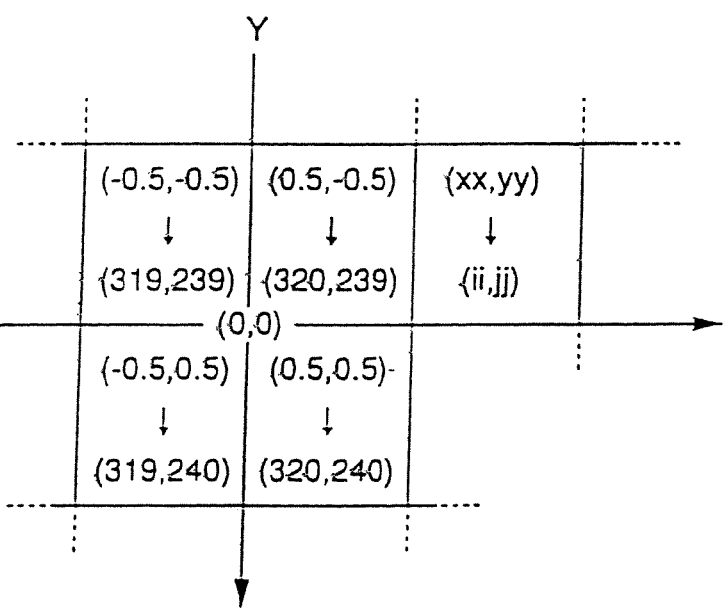
FIG. 14B is a figure for explaining an operation method to convert a conversion source image coordinates (xx, yy) into coordinates (ii, jj), the origin of which is the upper left end of the image (0, 0).

Then, the original coordinates (xx, yy) is converted to a coordinates in which the origin (0, 0) of the coordinates is the top left-hand side corner of the image, as shown in FIG. 14B, through following calculations.

$$ii=(xx+320)-0.5$$

$$jj=(yy+240)-0.5$$

Figure 14C:
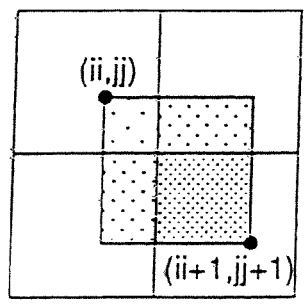
FIG. 14C is a figure for explaining the operation method to obtain coordinates V of dots after conversion (i, j).

Then, a value V of the dot at the coordinates (i, j) after conversion is obtained, as shown in FIG. 14C, applying four values of four dots to an formula given below, the four values being VV(ii_i, jj_i), VV(ii_i+1, jj_i), VV(ii_i, jj_i+1), and VV(ii_i+1, jj_i+1), where (ii_i, jj_i) represents the integer part and (ii_e, jj_e) represents the decimal part of the coordinates (ii, jj).

$$V(i, j) = VV(ii\_i, jj\_i) \times (1 - ii\_e) \times (1 - jj\_e) +$$
$$VV(ii\_i+1, jj\_i) \times ii\_e \times (1 - jj\_e) +$$

-continued $$VV(ii\_i, jj\_i+1) \times (1-ii\_e) \times jj\_e +$$
$$VV(ii\_i+1, jj\_i+1) \times ii\_e \times jj\_e$$

In this manner, an image without distortion as shown in FIG. 12B is obtained.

Figure 15:
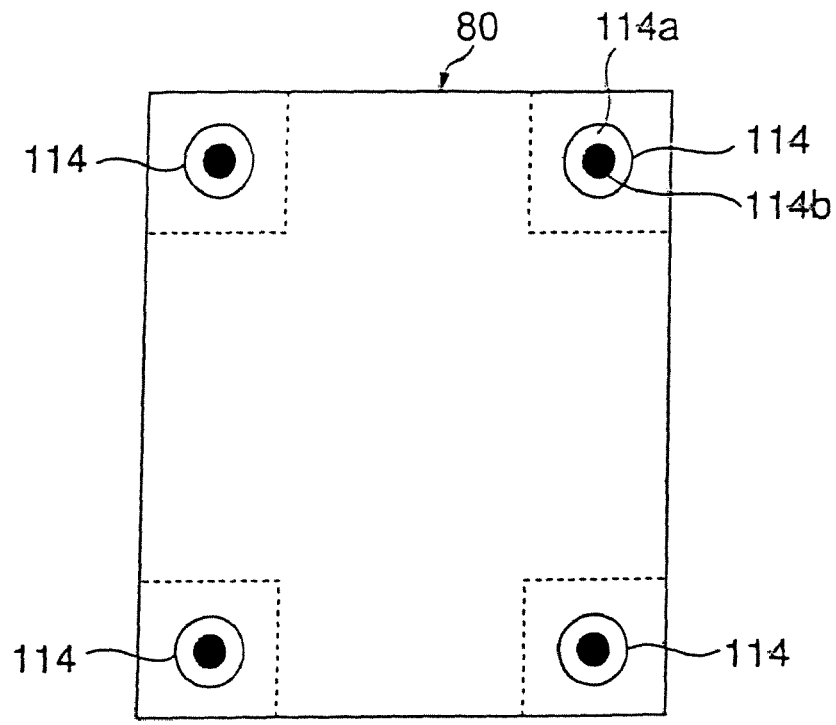
FIG. 15 is a figure showing the back of the play field sheet 80, on which a standard marker 114 is printed in its four corners.

At S13, a standard marker position detection process is performed. As the standard marker position detection process, an outline extraction process of S13a and a pattern matching process of S13b are performed. As shown in FIG. 15, a standard marker 114 is printed in the four corners of the back of the play field sheet 80. The standard marker 114 consists of a white circle 114a that contains a black circle 114b, such that the outline of the black circle 114b can be extracted. In the present embodiment, the coordinates position of the standard marker 114 is detected from the image of the standard marker 114 photographed by the image sensor 56. Then, an area of the four corners that contain the standard marker 114 is cut out, the position of the black circle 114b of the standard marker 114 is compared with standard marker pattern data prepared in a database such that a displacement amount is obtained, and the displacement amount is used in compensating the image photographed by the image sensor 56.

In addition, in the outline extraction process of the standard marker 114, the image data of the standard marker 114 is divided into nine sections, and the outline of the standard marker 114 is extracted using a Sobel filter.

At S14, the position and the angle of the player card 20 placed on the player card arrangement panel 24 are detected. The card position and angle detection process detects the number of the player cards 20 placed on the player card arrangement panel 24, a position coordinates and an angle of each of the player cards 20. In order to shorten time required of this detection, image resolution is made coarse, for example, to about ½ of the pixels of an image photographed by the image sensor 56, such that an approximate position and an approximate angle are obtained, with an accurate position and an accurate angle to be obtained in a later stage.

For this reason, the card position and angle detection process includes an approximate position and angle detection process S15 as a first phase, and an accurate position and angle detection process S16 as a second phase.

The approximate position and angle detection process 15 includes a reduction process, an outline extraction process, a pattern matching process, and a pixel skipping process.

Figure 16:
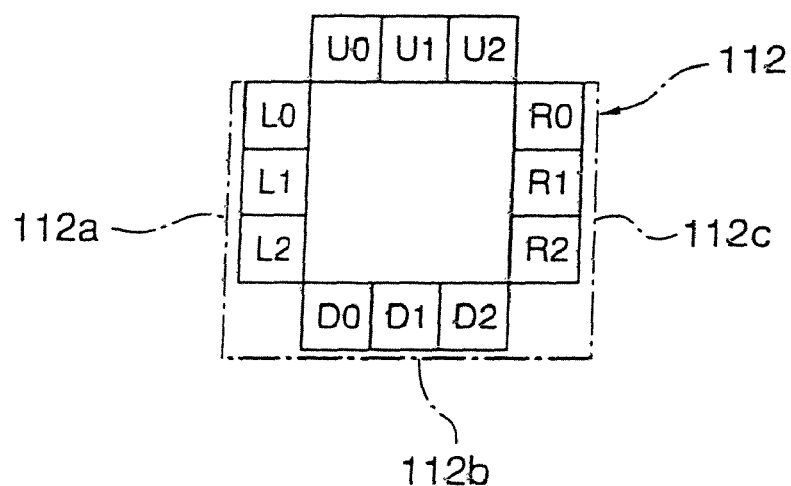
FIG. 16 is a figure for explaining a state where each of the four sides of the outline of a card data 112 is divided into 3 sections.

In the outline extraction process S15a, the reduction process reduces the resolution of the image to ½ both vertically and horizontally, and makes the resolution coarse. Then, at S15b, the outline of the card data 112 stored on the back of the player card 20 is extracted using a Sobel filter. In the outline extraction process, each of the four sides of the outline of the card data 112 is divided into 3 sections, as shown in FIG. 16, making a total of nine areas that are defined by side sections U0, U1 and U2 of the upper side, L0, L1 and L2 of the left-hand side, R0, R1 and R2 of the right-hand side, and D0, D1 and D2 of the bottom. As described above, the outline of the card data 112 contains the black frames 112a-112c (refer to FIG. 10) on the three sides, namely the right-hand side, the left-hand side and the bottom, except for the upper side, therefore, by comparing the luminosity of each of the sides, the angle of the player card 20 is detected. In other words, the angle of the player card 20 is detected by distinguishing an area of the nine areas, which does not contain any of the black frames 112a-112c by a control process mentioned later with reference to FIG. 17.

At S15c, the pattern matching process is performed. That is, it compares with pattern data of each rotation position registered beforehand, and marks are given, while all images are searched with a dot being shifted at a time. Coordinates and the angles that give a value greater than a certain level are stored. Since the values obtained in this manner, unnecessary coordinates are also included, therefore, excessive pixels are skipped by the pixel skipping process at S15d.

At the position and angle detection process S16, a profiling process, an outline extraction process, and a pattern matching process are performed. At S16a, the profiling process performs profiling of an area near the location coordinates that is coarsely obtained by the approximate position and angle detection process. At the following S16b, the outline extraction process extracts the outline of the card data 112 stored on the back of the player card 20 by applying the cut image to the Sobel filter. At the following S16c, the pattern matching process compares with the pattern data of the rotation position beforehand registered like the pattern matching process of the approximate position and angle detection, and an accurate position and an accurate angle are obtained.

Figure 18:
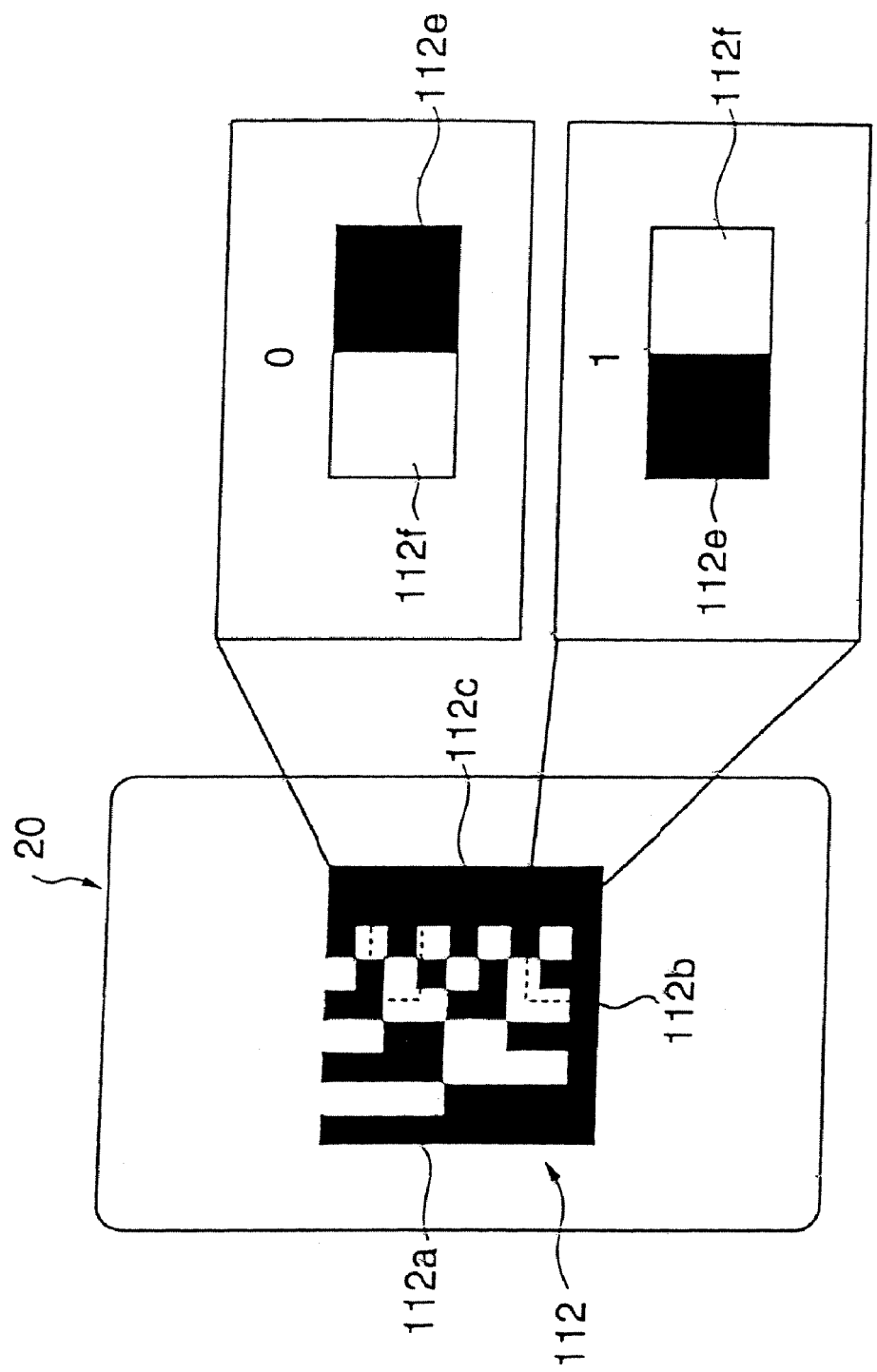
FIG. 18 is a figure showing a state of reading 1 and 0 from luminosity difference between left and right of a range taken from the card data.

At S17, the luminosity of an image is profiled from the position coordinates and the angle that are obtained as above. Then, as shown in FIG. 18, a combination of the luminosity is read, which is 0 if the combination is white and black from left to right, and 1 if the combination is black and white. A 24-bit ID code (an identification code of a player printed on the card surface) is detected from the black-and-white pattern of the card data 112 stored on the back of the player card 20.

Figure 17:
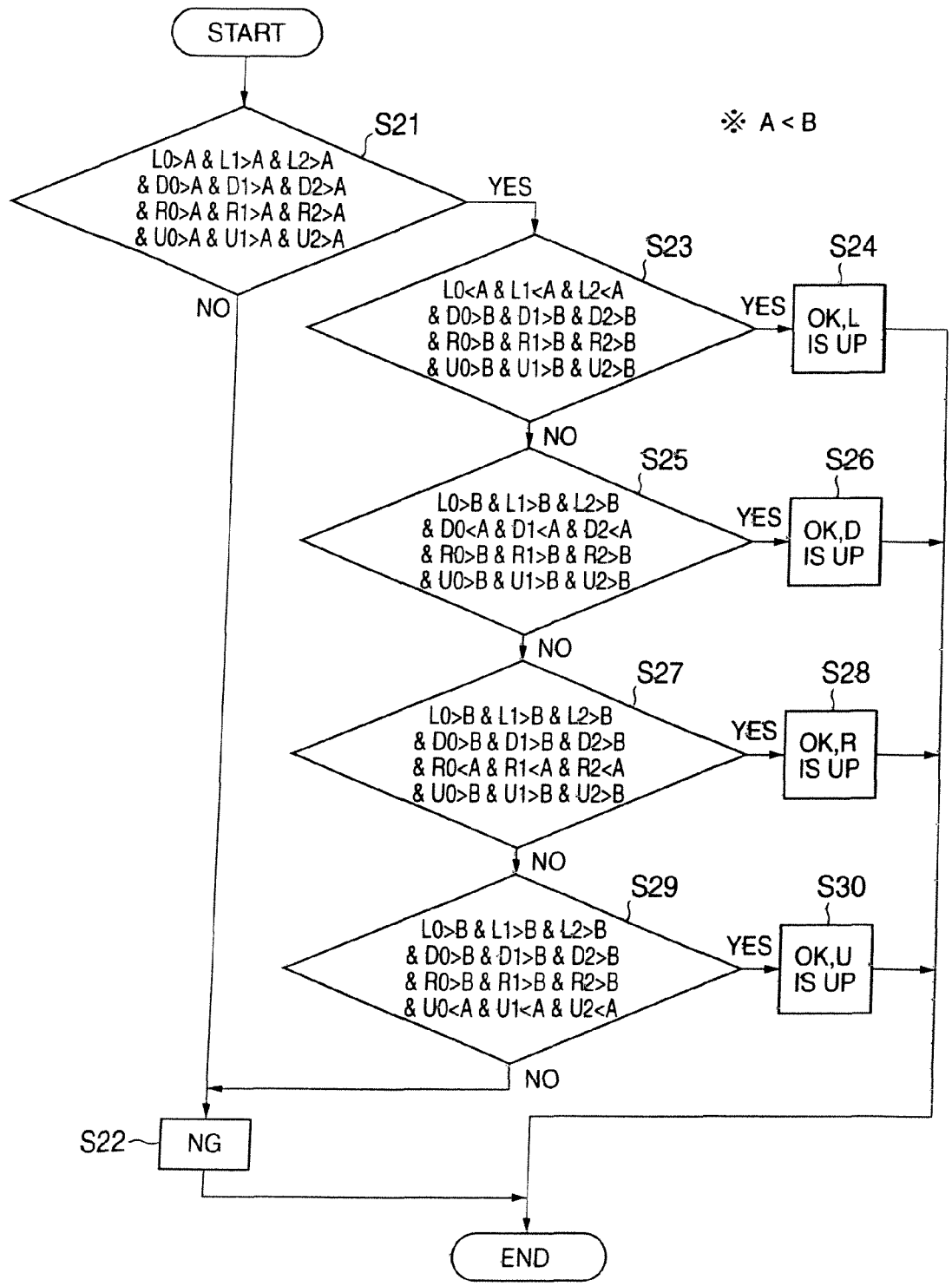
FIG. 17 is a flowchart for explaining card angle detection process.

Here, the card angle detection process shown in FIG. 17 is explained. In the flowchart of FIG. 17, A represents a luminosity threshold value of a white area 112f, and B represents a luminosity threshold value of a black area 112e (A<B).

At S21 of FIG. 17, the card data 112 is considered unreadable at S22, if luminosity of all the areas profiled, namely, U0, U1 and U2 on the upper side, L0, L1 and L2 on the left-hand side, R0, R1 and R2 on the right-hand side, and D0, D1 and D2 of the bottom is greater than the luminosity threshold value A.

Otherwise, if the luminosity of any areas profiled, namely, U0, U1 and U2 on the upper side, L0, L1 and L2 on the left-hand side, R0, R1 and R2 on the right-hand side, and D0, D1 and D2 of the bottom is not greater than the luminosity threshold value A, the process proceeds to S23. Then, it is checked whether only the areas L0, L1 and L2 on the left-hand side have a luminosity threshold value greater {smaller} than A, and the remaining areas have a luminosity threshold value greater than B. If the result of the check is affirmative, the process proceeds to S24 where it is determined that the player card 20 on the player card arrangement panel 24 is placed at such an angle that the left-hand side areas L0, L1 and L2 are located upwards.

Otherwise, if the result of the check is negative, the process proceeds to S25.

Then, it is checked whether only the areas D0, D1 and D2 of the bottom have a luminosity threshold value greater {smaller} than A, and the remaining areas have a luminosity threshold value greater than B. If the result of the check is affirmative, the process proceeds to S26 where it is determined that the player card 20 on the player card arrangement panel 24 is placed at such an angle that the bottom areas D0, D1 and D2 are located upwards.

Otherwise, if the result of the check is negative, the process proceeds to S27.

Then, it is checked whether only the areas R0, R1 and R2 on the right-hand side have a luminosity threshold value greater {smaller} than A, and the remaining areas have a luminosity threshold value greater than B. If the result of the check is affirmative, the process proceeds to S28 where it is determined that the player card 20 on the player card arrangement panel 24 is placed at such an angle that the right-hand side areas R0, R1 and R2 are located upwards.

Otherwise, if the result of the check is negative, the process proceeds to S29.

Then, it is checked whether only the areas U0, U1 and U2 on the upper side have a luminosity threshold value greater {smaller} than A, and the remaining areas have a luminosity threshold value greater than B. If the result of the check is affirmative, the process proceeds to S30 where it is determined that the player card 20 on the player card arrangement panel 24 is placed at such an angle that the upper side areas U0, U1 and U2 are located upwards.

Otherwise, if the result of the check is negative, the process proceeds to S22 where it is determined that the card data 112 is unreadable.

In this manner, the angle of the player card 20 placed on the player card arrangement panel 24 is detectable.

Figure 19:
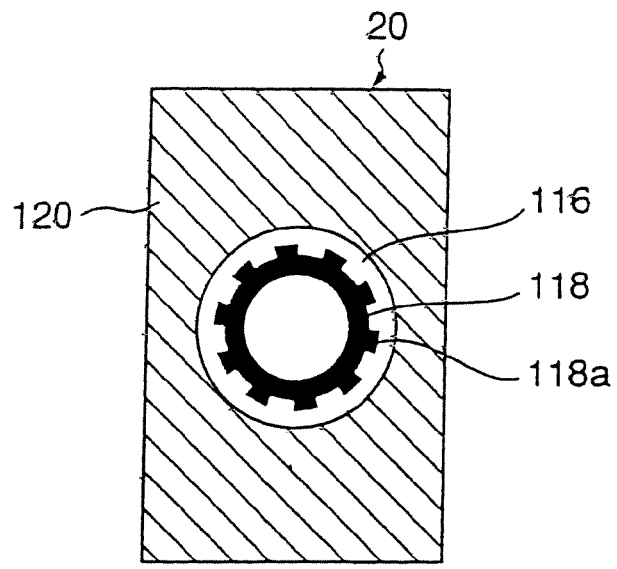
FIG. 19 is a figure showing a variation of the card data 112.

In addition, the black-and-white pattern of the card data 112 does not need to be in a rectangular form. As a variation, the card data 112 can take a ring-like form, as shown in FIG. 19, where a black area 118 is printed in a white area 116 that is circular on the back of the player card 20.

In this case, presence of a black projection area 118a that projects from the outer circumference of the black part 118 is detected, and when the black projection area 118a is detected, a bit recognition code 1 is given, and when the black projection area 118a is not detected, a bit recognition code 0 is given. In this manner, a 10-bit recognition code is obtained. Further, since the ring-like black part 118 projects in the shape of radiation from the outer circumference, the black projection area 118a is detected regardless of the angle of the player card 20. Further, a hatching area 120 that delimits the white area 116 may be printed by ink black or other in color, the ink having to be capable of reflecting invisible light so that the presence of the player card 20 can be detected.

Figure 20:
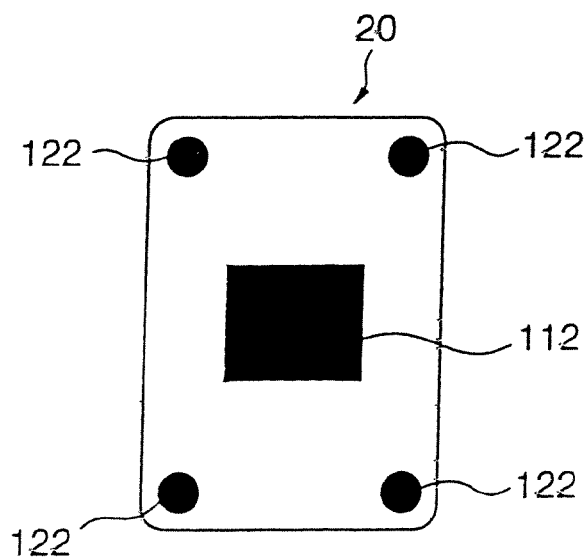
FIG. 20 is a figure showing a variation of a player card 20.

FIG. 20 is a figure showing a variation of the player card 20.

As shown in FIG. 20, a card point 122 formed by a black dot is printed in the four corners of the player card 20 on the back, in addition to the card data 112. When these four card points 122 and the card data 112 are detected, it is determined that the image sensor 56 photographs the whole of the back surface of the player card 12. In this manner, it is also possible to determine whether two player cards 20 are overlapped.

Figure 21A:
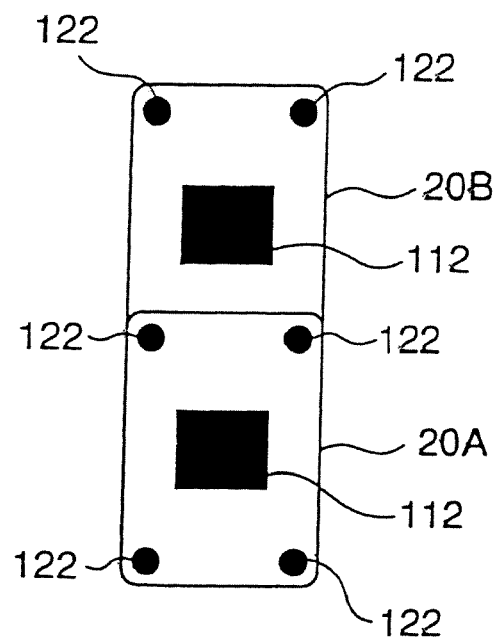
FIG. 21A is a figure for explaining an example that detects an overlap of two cards.

In an example shown in FIG. 21A, only two card points 122 of a player card 20B are detectable when a part of the player card 20B is overlapped by a player card 20A. However, since the card data 112 of the player card 20B is also detectable, two player cards 20A and 20B are considered not overlapped.

Figure 21B:
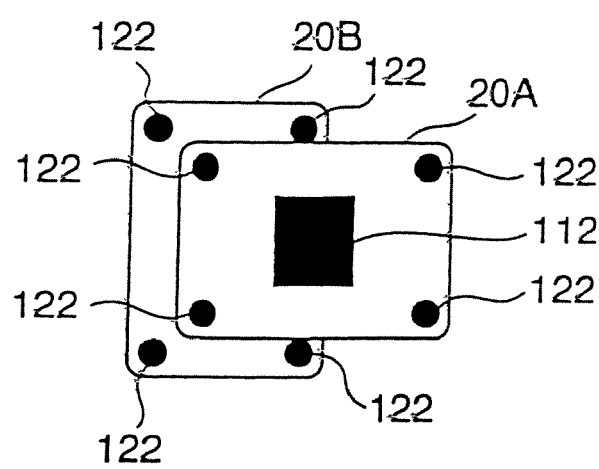
FIG. 21B is a figure for explaining another example that detects an overlap of two cards.

In the case that the player card 20B is diagonally arranged on the player card 20A, although the four card points 122 of the player card 20B are detectable as shown in FIG. 21B, since the card data 112 of the player card 20B is not detectable, it is determined that the two player cards 20A and 20B are overlapping. In this case, only the player card 20A arranged underneath is detected.

Figure 21C:
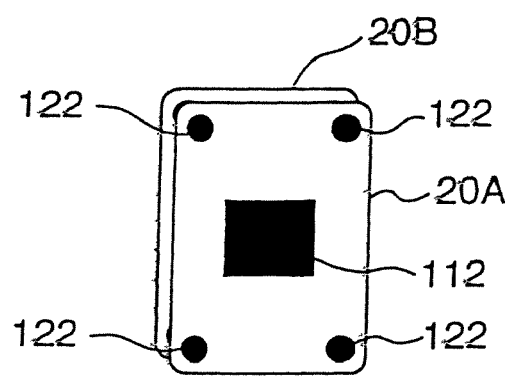
FIG. 21C is a figure for explaining another example that detects an overlap of two cards.

In the case that the player card 20B is arranged approximately or completely overlapping the player card 20A as shown in FIG. 21C, since the four card points 122 and the card data 112 of the player card 20B are not detectable, only the player card 20A arranged underneath is detected.

Here, how to play with the card game apparatus 10 constituted as mentioned above and control process thereof are explained.

The card game apparatus 10 reads team data and players' exercise data stored in the integrated circuit card 18, and the control process will start, when the game player 22 inserts a game fee (a coin) into a coin slot (not shown), the integrated circuit card 18 is inserted in the integrated circuit card reader/writer 28 and a start button (not shown) is operated to an ON position.

As shown in FIG. 22, the integrated circuit card 18 includes a player data memory unit 18a wherein player individual data such as the player's capability (skill) contained in the card data of the player card 20 is stored. The integrated circuit card 18 is capable of storing data of about 20-50 players. When, e.g., a player card 20 depicting Hidetoshi Nakata is placed on the midfielder domain 102 of the player card arrangement panel 24, the player name is stored as a registered player, and after exercise and a game, an exercise result and a game result are stored as growth data to the player data memory unit 18a.

The integrated circuit card 18 before a first use, basic values of registration players are stored as initial values. As a growth value is acquired from an exercise result and a game result, the value is added to each registration player's basic value. Evaluation items of the capability of every player include shooting, passing, dribbling, tackling, pass cutting, positioning, tactical understanding, stamina, speed, muscular strength, and special capability (a killer pass, pinpoint pass, etc.), for example. The basic value and the growth value for each of these items are stored as individual player's data.

In addition, the special capability is not set to ordinarily available player cards 20, but only a rare card issued in a small number is set up with a special capability that is reflected in a game as a player's individual data.

Further, when the integrated circuit card 18 cannot accept new registration due to memory reaching full, old individual data of the player card 20 has to be erased before the new registration is accepted. A game player 22 can select a player name to be eliminated when the memory of the integrated circuit card 18 is reaching full.

Figure 23:
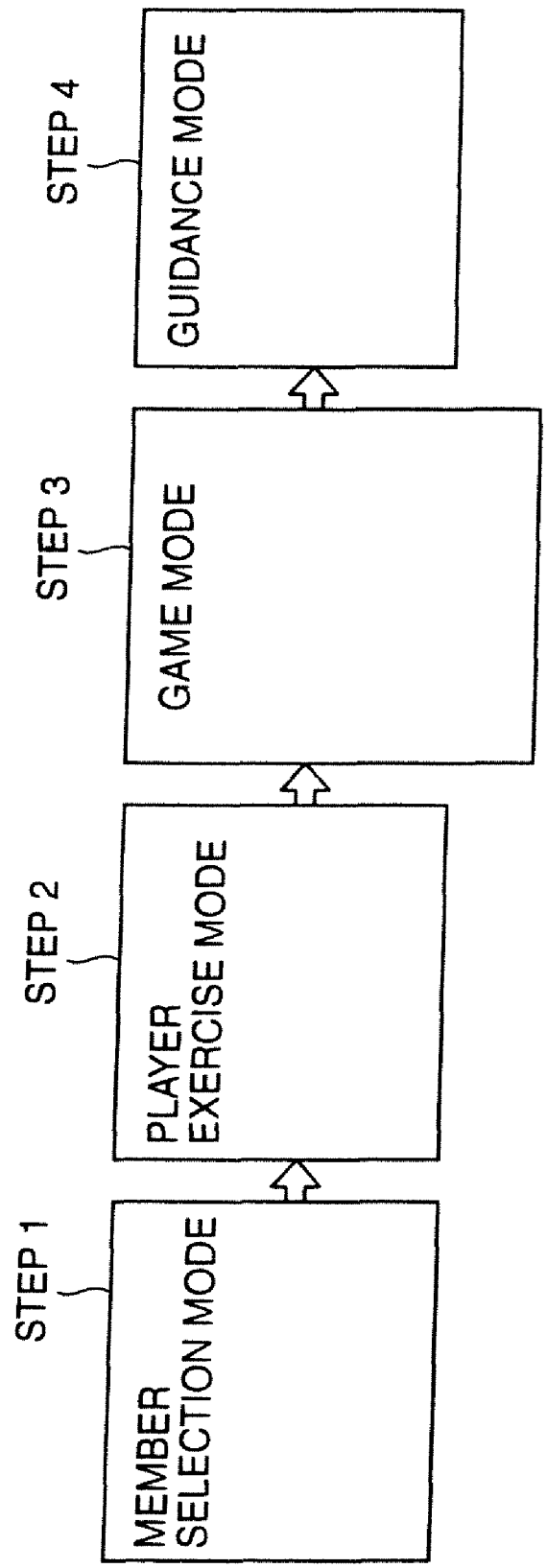
FIG. 23 is a main flowchart showing game progress step of a card game apparatus 10.

FIG. 23 is a main flowchart showing the game progress step of card game apparatus 10.

As shown in FIG. 23, contents of a game provided by the card game apparatus 10 are roughly divided into a member selection mode (step 1), a player exercise mode (step 2), a game mode (step 3), and an guidance mode (step 4), which are performed one by one.

In the member selection mode (step 1), the game player 22 chooses eleven player cards 20 as regular players, and five player cards 20 as alternate players from player cards 20 owned by the game player. Then, the game player 22 places the selected eleven player cards 20 as regular players at the forward domain 100, the midfielder domain 102, the defender domain 104, and the goalkeeper domain 105 (refer to FIG. 7) of the participation player card arrangement domain 92 formed on the player card arrangement panel 24, places the selected five player cards 20 in the alternate player card arrangement domain 94 as alternate players, and carries out a game start.

When the player cards 20 are arranged as above, the process moves to the player exercise mode S12. Here, although up to five alternate player cards 20 can be placed on the alternate player card arrangement domain 94, no alternate player cards 20 may be placed in the alternate player card arrangement domain 94, if, for example, the game player 22 has only 11 regular player cards.

In the player exercise node (step 2) arbitrary exercise can be performed and each player and a team can be grown up satisfactorily before playing a game. The exercise will be automatically ended, when a predetermined time set up beforehand elapses.

In the following game mode (step 3), if preparation is completed, a game is arranged and a match will be played against a team of another player. When no other players are available, a match will be played against a virtual team of computer control.

If the game is started, the game player 22 considers tactics as a coach, looking at the progress situation of the game displayed on the monitor 26, and moves each player card 20 placed on the player card arrangement panel 24, directs a player, and changes the players. The game will be automatically ended upon elapse of a predetermined time.

In the following instruction mode (step 4), guidance is given to each player after carrying out the game. It is configured such that a player's unexpected capability grows up, and capability (skill) of each player's is enhanced. Then, a new player card 20 is issued from the card issue unit 30 at the end. Thus, since one player card 20 increases in number at a time whenever a game is completed, it becomes easy to select and change players in subsequent games.

Figure 24:
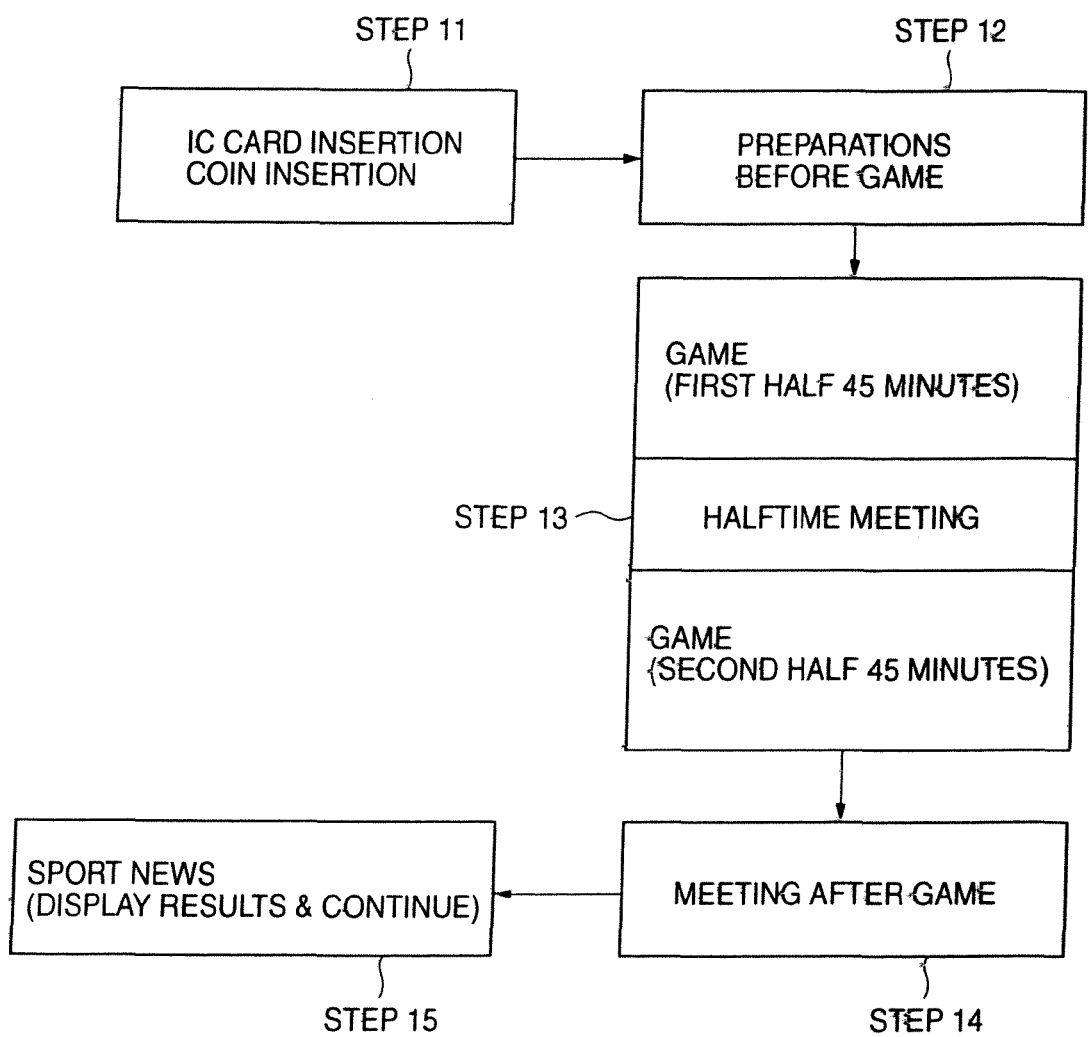
FIG. 24 is a flowchart showing a flow of a game.

FIG. 24 shows a flow of a play that the game player 22 performs.

As shown in FIG. 24, the game player 22 first inserts an integrated circuit card 18 at step 11. Then, the game player 22 inserts a coin for a game fee. This is to secure that the game player 22 has a proper integrated circuit card 18 that is necessary to play the concerned game, avoiding an occurrence of a trouble where the coin cannot be returned if the game player does not own a proper integrated circuit card 18.

At step 12, the player cards 20 on hand are arranged on the player card arrangement panel 24, players are selected, and preparations of each selected player are made before the game. A set play, a formation, a shot, etc. are exercised as the preparation before the game to each player defined by the player card 20 placed on the player card arrangement panel 24 (exercise mode).

At step 13, a game is played with a team of another player. The game includes a first half (45 minutes), a halftime meeting, and a second half (45 minutes). During the game, the game player 22 moves the player cards 20 according to a situation of the game such that a formation is changed, a player card 20 is replaced, and tactics is changed. Further, in the halftime meeting, direct directions (encouragement, determining tactics and the like) may be given, the formation may be changed, and a player may be replaced.

At step 14, a meeting after the came is held such that communications are performed with the players, such as explaining points to be reflected of the game, and the like, which raises a player's growth value (instruction mode).

At step 15, a game result is released as sport news. In this manner, the game player 22 enjoys the game as the coach of the soccer team, capable of assigning positions to the players, and raising the capability (skill) of the players.

Next, an explanation about a control process of CPU 62 of the terminal apparatus 16 follows, with reference to FIG. 25 through FIG. 29.

Figure 25:
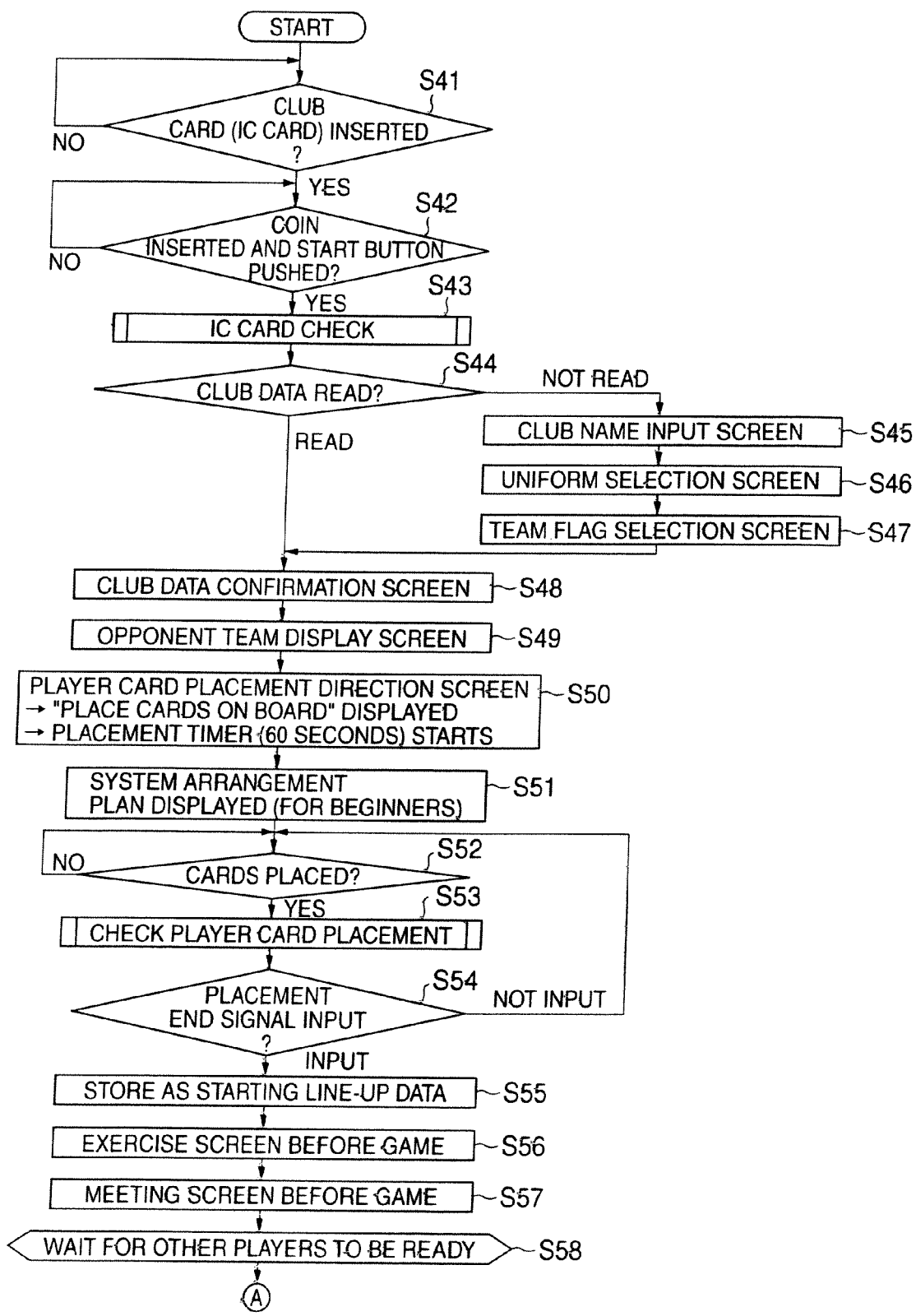
FIG. 25 is a flowchart showing control process that CPU 62 of a terminal apparatus 16 performs.

As shown in FIG. 25, CPU 62 determines whether an integrated circuit card 18 as a club card has been inserted in the integrated circuit card reader/writer 28 at S41. If it is determined that the game player 22 owns a proper integrated circuit card 18, the process moves to S42, where it is determined whether a coin is inserted and the start button is operated to the ON position. Therefore, when a would-be-player cannot present a legitimate integrated circuit card 18, a game will not start. As mentioned above, since a coin insertion takes place after determining the presence of the legitimate integrated circuit card 18, a coin insertion by a would-be-player that does not own a legitimate integrated circuit card 18 is prevented, such that a trouble associated with refunding the coin is eliminated.

At S43, data that was read by the integrated circuit card reader/writer 28 is checked. When there is no club data in the data read by the integrated circuit card 18, the process progresses to S45, a club name input screen is displayed on the monitor 26, prompting the game player to input the club name at S44. Then, a uniform selection screen is displayed on the monitor 26, prompting the game player 22 to select a uniform of his/her team at S46. Then, a team flag selection screen is displayed on the monitor 26, prompting the game player 22 to select the team flag at S47.

When the club data is detected in the data read by the integrated circuit card 18 at S44, or after processing the above S45-S47, the process progresses to S48 and a club data check screen is displayed on the monitor 26. Then, at S49, an opponent team display screen is displayed on the monitor 26.

At S50, a player card arrangement direction screen is displayed on the monitor 26. Here, the player card arrangement direction screen displays, for example, "Arrange cards on the board." Further, a timer starts counting down time allowed (e.g. 60 seconds) for arranging the player cards 20.

At S51, a system arrangement plan (for example, a configuration figure as shown in FIG. 1) is displayed on the monitor 26 for a beginner.

At S52, when the game player 22 arranges at least eleven player cards 20 serving as a starting lineup on the player card arrangement panel 24 as shown in FIG. 6, the arrangement of the player cards 20 is checked at S53. If there is an input operation indicating an end of the arrangement at S54, the process progresses to S55, the identification codes of the eleven player cards 20 placed on the player card arrangement panel 24 are read, and recorded as starting lineup data.

Figure 30A:
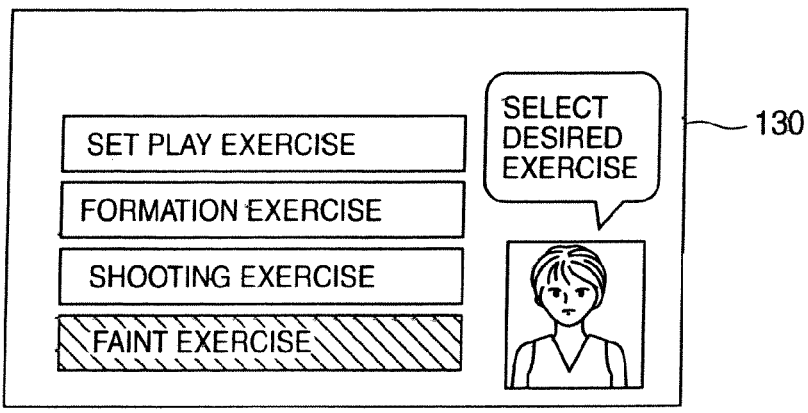
FIG. 30A is a figure showing an example of an exercise menu screen 130.
Figure 30B:
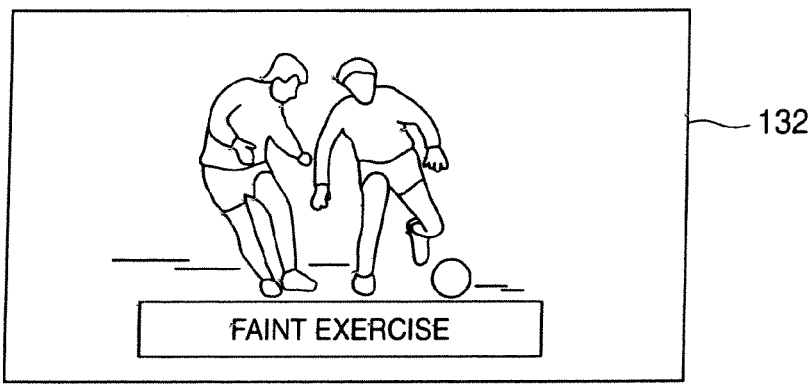
FIG. 30B is a figure showing an example of an exercise screen 132.
Figure 30C:
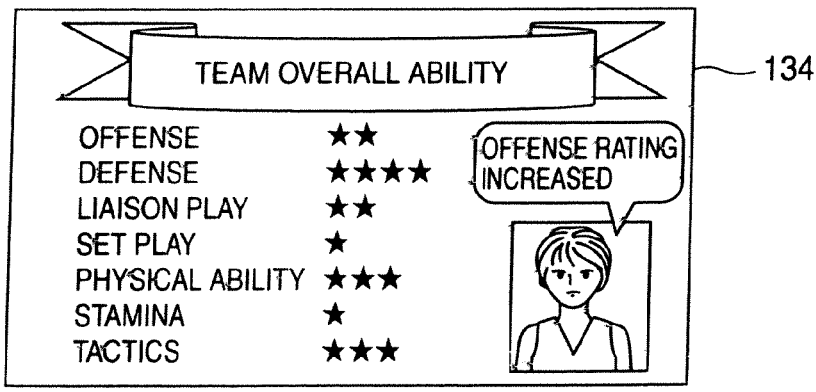
FIG. 30C is a figure showing an example of a team overall evaluation screen 134 obtained from the exercise result.

At S56, the exercise screen before the game is displayed on the monitor 26. As an exercise screen, an exercise menu screen 130 as shown in FIG. 30A, each exercise screen 132 as shown in FIG. 30B, and an overall team power evaluation screen 134 that is updated according to results of exercise items as shown in FIG. 30C, for example are displayed on the monitor 26 one by one, the screens being examples.

A meeting screen before the game is displayed on the monitor 26 at the following S57. Then, at S58, the process waits for an opponent team to be prepared.

Figure 26:
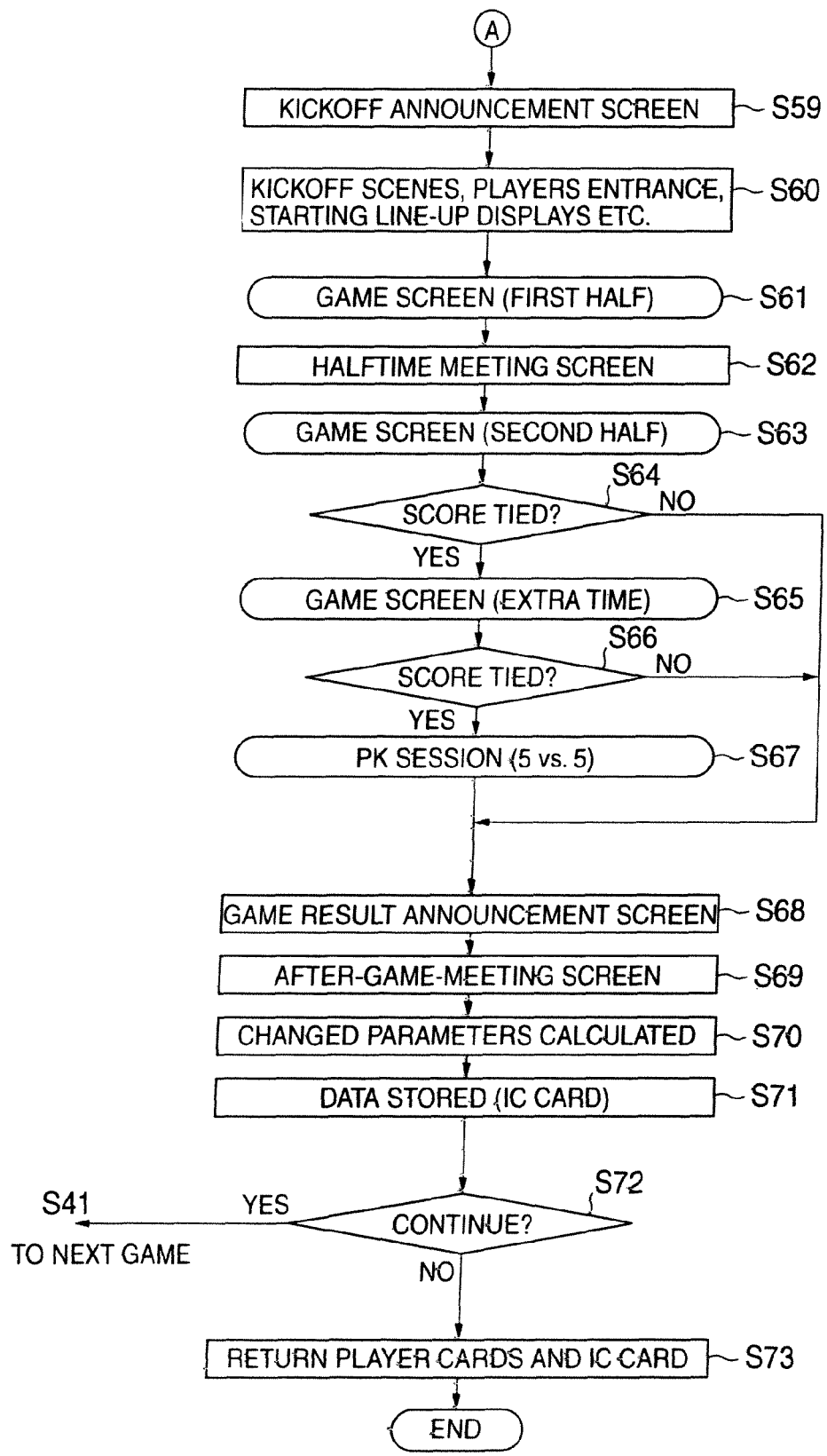
FIG. 26 is a flowchart showing the control process performed following the process of FIG. 25.

At S59 shown in FIG. 26, a kick-off announcement screen is displayed on the monitor 26. Then, the process progresses to S30 where a kickoff scene is displayed on the monitor 26, which presents player entrance and starting lineup player names and the like.

Figures 31A, 31B:
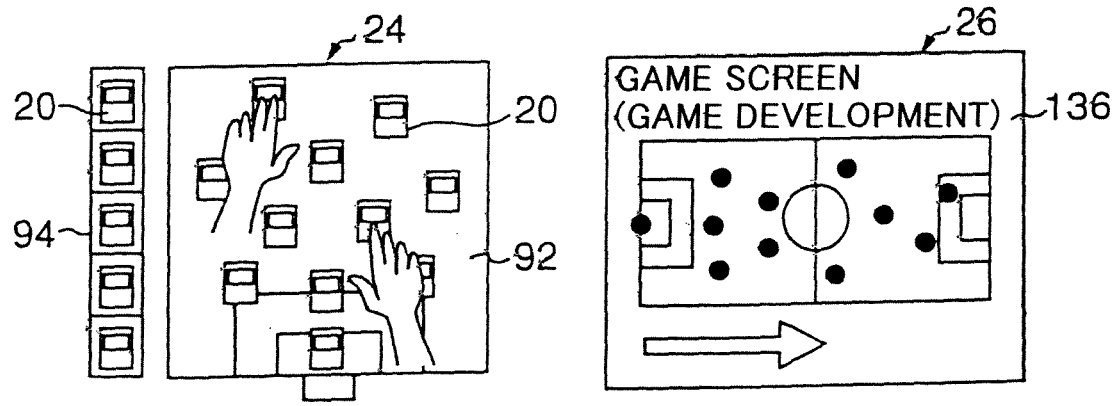
FIG. 31A is a figure for explaining operation of the player 22 immediately after a kickoff.
FIG. 31B is a figure showing the example of a display of the game screen which displays the game deployment according to operation of a game player 22 immediately after a kickoff.

At S1, a first half game screen 136 is displayed on the monitor 26 of the game between the team of the game player team and the opponent team led by another game player. Immediately after the kickoff, the game player 22 sees a motion of each player displayed on the monitor 26 with the eleven player cards 20 being in place as arranged at the beginning with a starting lineup on the player card arrangement panel 24 as shown in FIG. 31A and FIG. 31B.

Figures 32A, 32B:
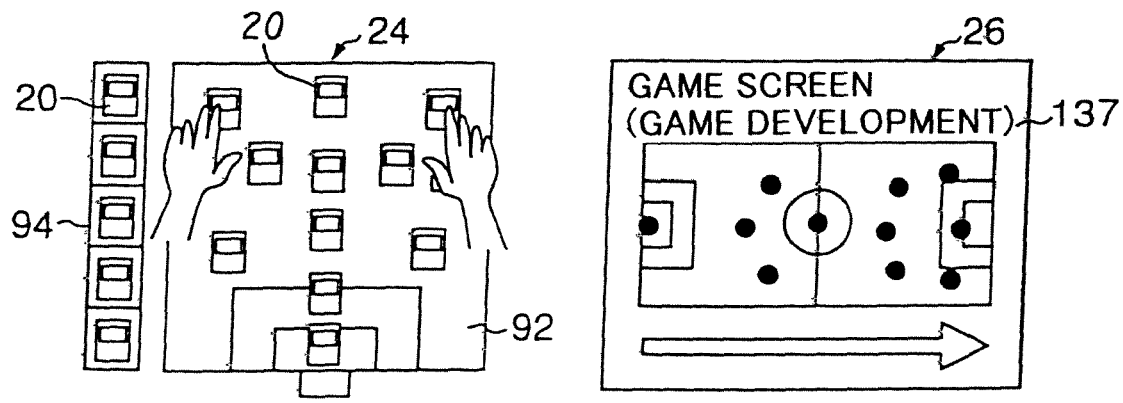
FIG. 32A is a figure for explaining operation of the game player 22 at the time of 20 minutes in the first half of a game.
FIG. 32B is a figure showing an example of a display of the game screen that displays the game according to the operation of the game player 22 at the time of 20 minutes in the first half of the game.

At 20 minutes into the first half, for example, the game player 22 moves positions of the player cards 20 on the player card arrangement panel 24 such that the formation is shifted into an offensive formation as shown in FIG. 32A and FIG. 32B in an attempt to get a scoring point. After moving, the input button 34*a* is operated to ON position, and a full-power play is directed to all the players.

That is, the game player 22 makes the offensive formation by moving a midfielder player card 20 to the forward domain 100 on the player card arrangement panel 24, so that the midfielder player can participate in an offense with the forward players. An offensive formation screen 137 is displayed on the monitor 26.

Figure 33A:
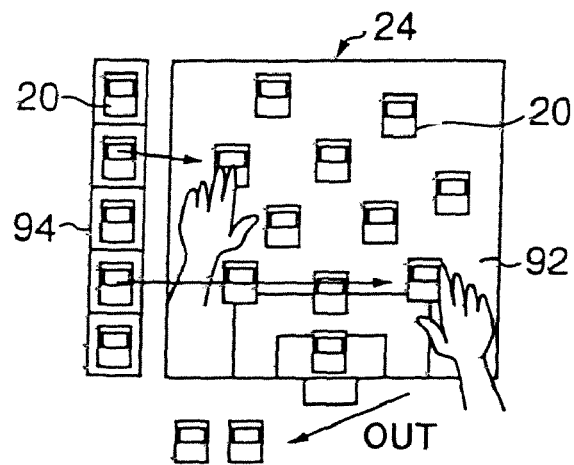
FIG. 33A is a figure for explaining operation of the game player 22 at the halftime.
Figure 33B:
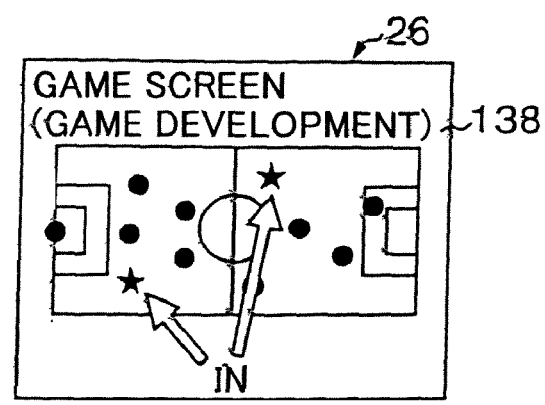
FIG. 33B is a figure showing an example of a display of the game screen which displays the game according to the operation of the game player 22 at the halftime.

After the first half of the game, the process progresses to the following S62 and a halftime meeting screen is displayed on the monitor 26. In this halftime meeting, the coach gives directions to the players, and determines whether the players understand the tactics. Further, during the halftime, as shown in FIG. 33A and FIG. 33B, the game player 22 can replace a player card 20 so that an alternate player may relieve a player whose condition is not the best or stamina is exhausted in the first half. That is, the game player 22 replaces the player card 20 in the participation player card arrangement domain 92, corresponding to a player that is tired, with the player card 20 of an alternate player in the card arrangement domain 94. A player shift screen 138 is displayed on the monitor 26.

Figure 34A:
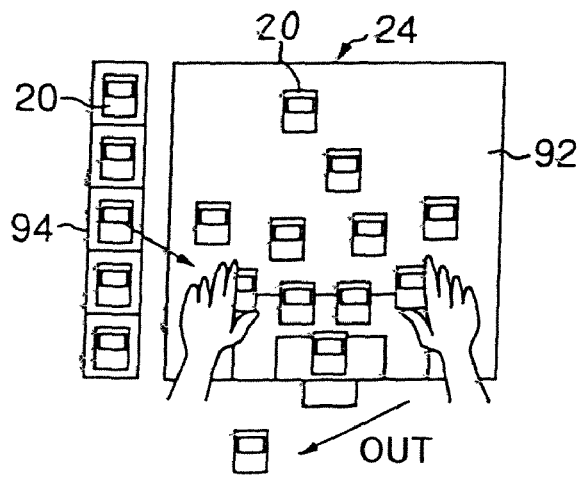
FIG. 34A is a figure for explaining operation of the game player 22 at the time of 35 minutes in the second half of the game.
Figure 34B:
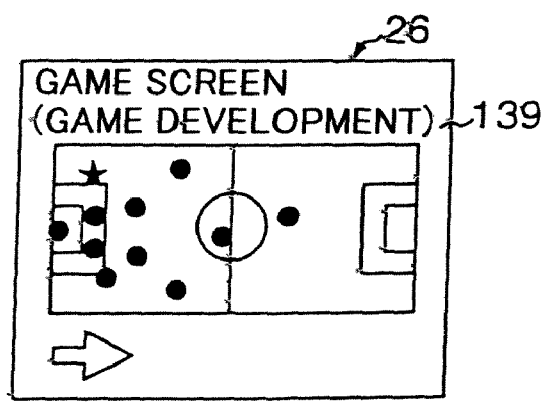
FIG. 34B is a figure showing an example of a display of the game screen which displays the game according to the operation of the game player 22 at the time of 35 minutes in the second half of the game.

At S63, the second half of a game is displayed on the monitor 26 after the halftime meeting. At 35 minutes, for example, into the second half, the game player 22 selects to change the formation into a defense formation in order to put importance to defense in the remaining time of the game, attempting to keep the scoring lead as shown in FIG. 34A and FIG. 34B. That is, the game player 22 strengthens the defense by positioning almost all the player cards 20 in the defender domain 104 such that the goal of the own team is protected. A defense intensive formation screen 139 is displayed on the monitor 26.

At the following S64, it determined whether the score is in a tie. When the score is in a tie, the process progresses to S65 and a game screen of an extra-time is displayed on the monitor 26. During the extra-time, in order to open the scoring, the offensive formation will be adopted where midfielder player cards 20 are pushed to the forward domain 100 on the player card arrangement panel 24, and the midfielder players join the forward players in the offense.

After the extra-time is finished, the process progresses to S66 and points of both teams are checked to determine whether the score is in a tie. If the score is in a tie, the process progresses to S67 where each team selects 5 preferred shooters, and a PK round starts, one by one alternately. A penalty kick screen is displayed on the monitor 26.

Figure 35A:
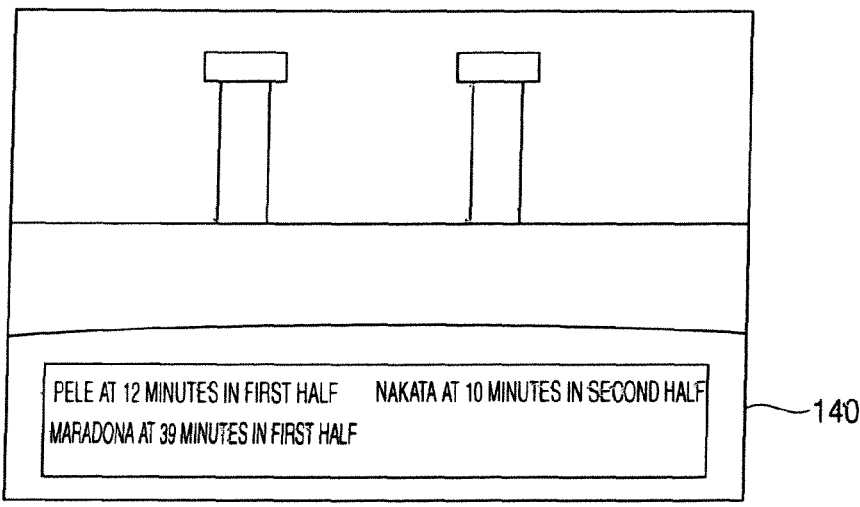
FIG. 35A is a figure showing an example of a display of a game result announcement screen 140 displayed after the game is over.
Figure 35B:
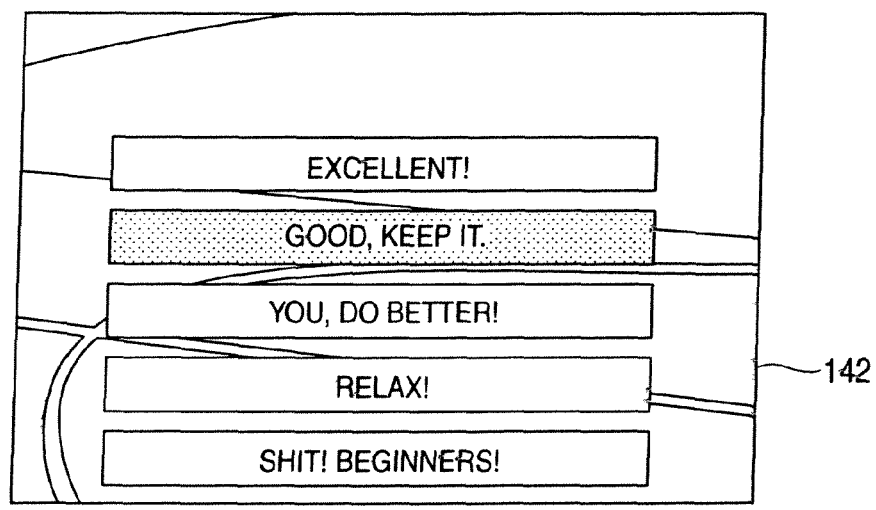
FIG. 35B is a figure showing an example of a display of the menu screen 142 of a meeting displayed after the game is over.

When the score is not in a tie at S64, or after the penalty kick round of S67 is completed, the process progresses to S68 and a game result announcement screen 140 is displayed on the monitor 26. As shown in FIG. 35A, the game result announcement screen 140 on the monitor 26 displays time and a name of shooting player, for example. Then, a meeting screen after the game is displayed on the monitor 26 at S69. In the meeting screen, a menu screen 142 such as shown in FIG. 35B is displayed on the monitor 26, which provides a host of comments from which the coach can offer to the players. The game player 22 operates the strategy direction buttons 32*a*-32*c*, and chooses a message to each player from the menu screen 142.

At S70, parameters of each player and the team are calculated from the game result. Then, the integrated circuit card 18 stores the calculated parameters at S71. At S72, it is determined whether a new game is requested. When the game player 22 opts to finish playing, the process progresses to S73, a new player card 20 is issued from the card issue unit 30, and the integrated circuit card 18 is returned from the integrated circuit card reader/writer 28. Further, at S72, when a game player 22 selects to play a new game continuation, the process returns to S41 shown in FIG. 25.

Here, the process of integrated circuit card determining at S43 above is explained with reference to FIG. 27.

Figure 27:
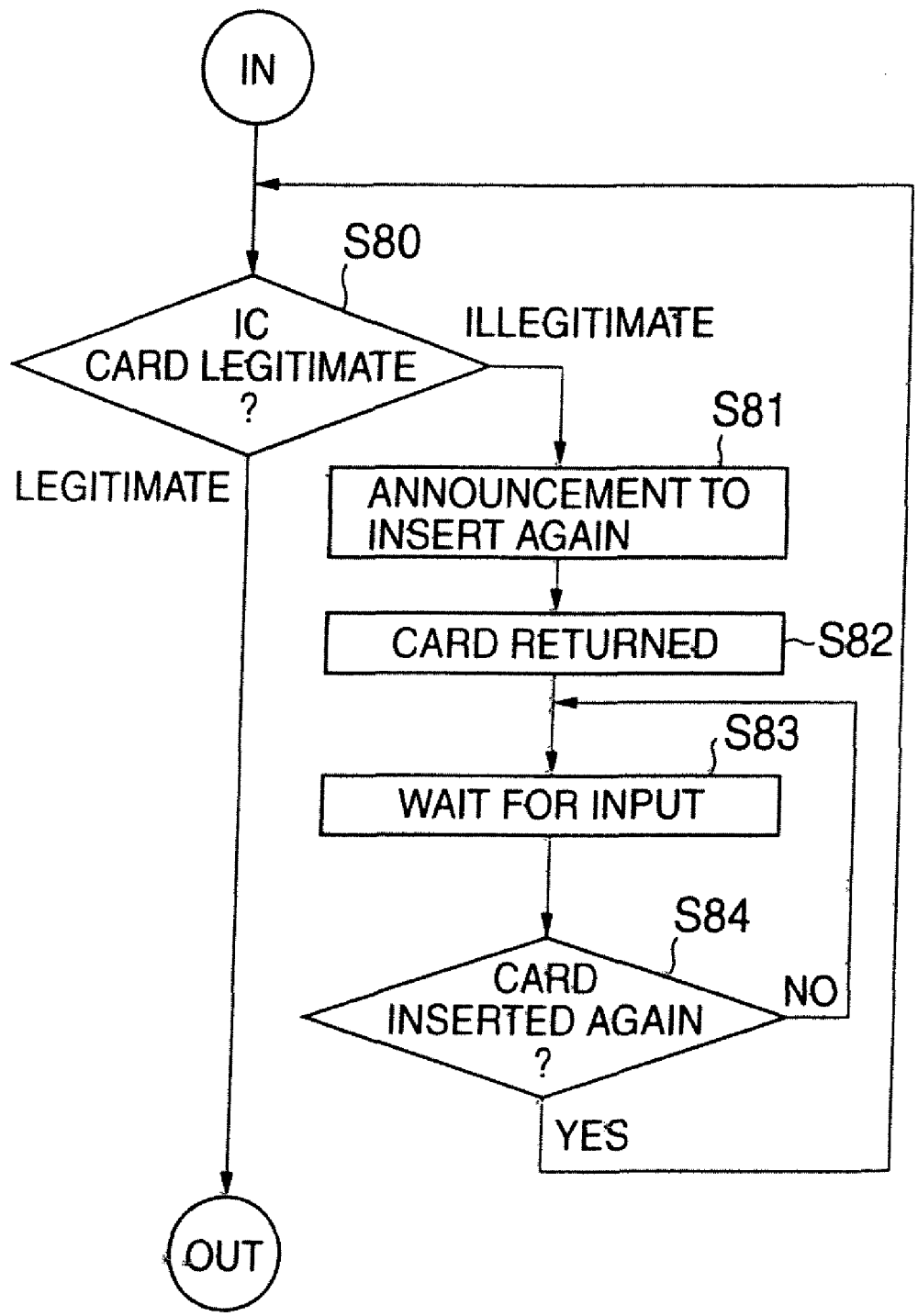
FIG. 27 is a flowchart showing integrated circuit card check process.

As shown in FIG. 27, at S80, it is determined whether a legitimate integrated circuit card 18 is inserted in the integrated circuit card reader/writer 28. At S80, if it is determined that the integrated circuit card 18 is legitimate for the card game apparatus of the present invention, the integrated circuit card check process is ended. Otherwise, if the integrated circuit card 18 inserted in the integrated circuit card reader/writer 28 at S80 is not legitimate, the process progresses to S81. An instruction of re-insertion is displayed at S81. Then, at S82, the integrated circuit card 18 judged illegitimate is returned from the integrated circuit card reader/writer 28.

At S83, a signal indicating that a new integrated circuit card 18 is inserted in the integrated circuit card reader/writer 28 is waited. Then, in S84, when insertion of an integrated circuit card 18 to the integrated circuit card reader/writer 28 is detected, the process returns to S80, and the new integrated circuit card 18 inserted in the integrated circuit card reader/writer 28 is checked for its legitimacy. If the new integrated circuit card 18 is determined to be legitimate, the integrated circuit card check process is ended.

Here, the process of player card arrangement check at S53 above is explained with reference to FIG. 28.

Figure 28:
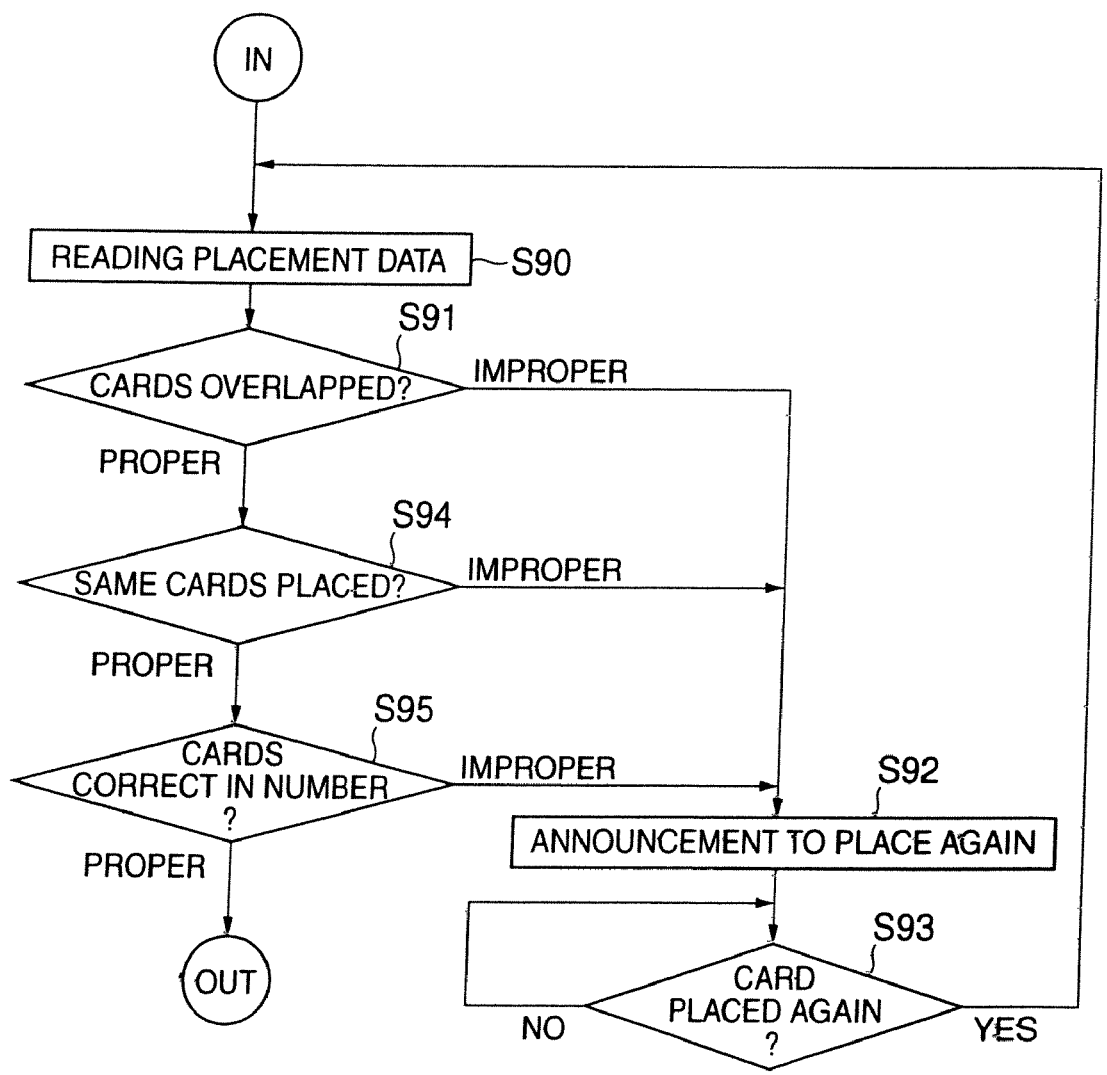
FIG. 28 is a flowchart showing player card arrangement check process.

As shown in FIG. 28, at S90, the arrangement data of the player cards 20 placed on the player card arrangement panel 24 is read. Then, at S91, it is checked whether there are no overlapping player cards 20. At S91, if there are overlapping player cards 20, the process progresses to S92, where an instruction for rearrangement of the player card 20 is displayed to the game player 22. At S93, it is checked whether the player cards 20 are rearranged.

If it is determined at S91 that there are no overlapping player cards 20, the process progresses to S94, and then it is checked whether the same player cards 20 are placed. If it is determined at S91 that the same player cards 20 are placed, an instruction for rearrangement of the player cards 20 is displayed to the game player 22 at S92. Then, at S93, it is checked whether the player cards 20 are rearranged.

If it is determined that the same player cards 20 are not placed at S94, the process progresses to S95, and it is checked whether the number of the player cards 20 placed on the player card arrangement panel 24 is proper. It is determined at S95 whether the number of the cards is proper. If eleven player cards 20 are placed in the participation player card arrangement domain 92 of the player card arrangement panel 24 and five or less player cards 20 are placed in the alternate player card arrangement domain 94 by S95, this player card arrangement is determined proper, and the check process is ended. Otherwise, if the number of cards is determined to be improper at S95, an instruction for rearrangement of the player cards 20 is displayed to the game player 22 at S92. At S93, it is checked whether the player cards 20 are rearranged.

Here, the process of player card check during a game is explained with reference to FIG. 29. The player card check process during the game is carried out as an interruption process in every predetermined time.

Figure 29:
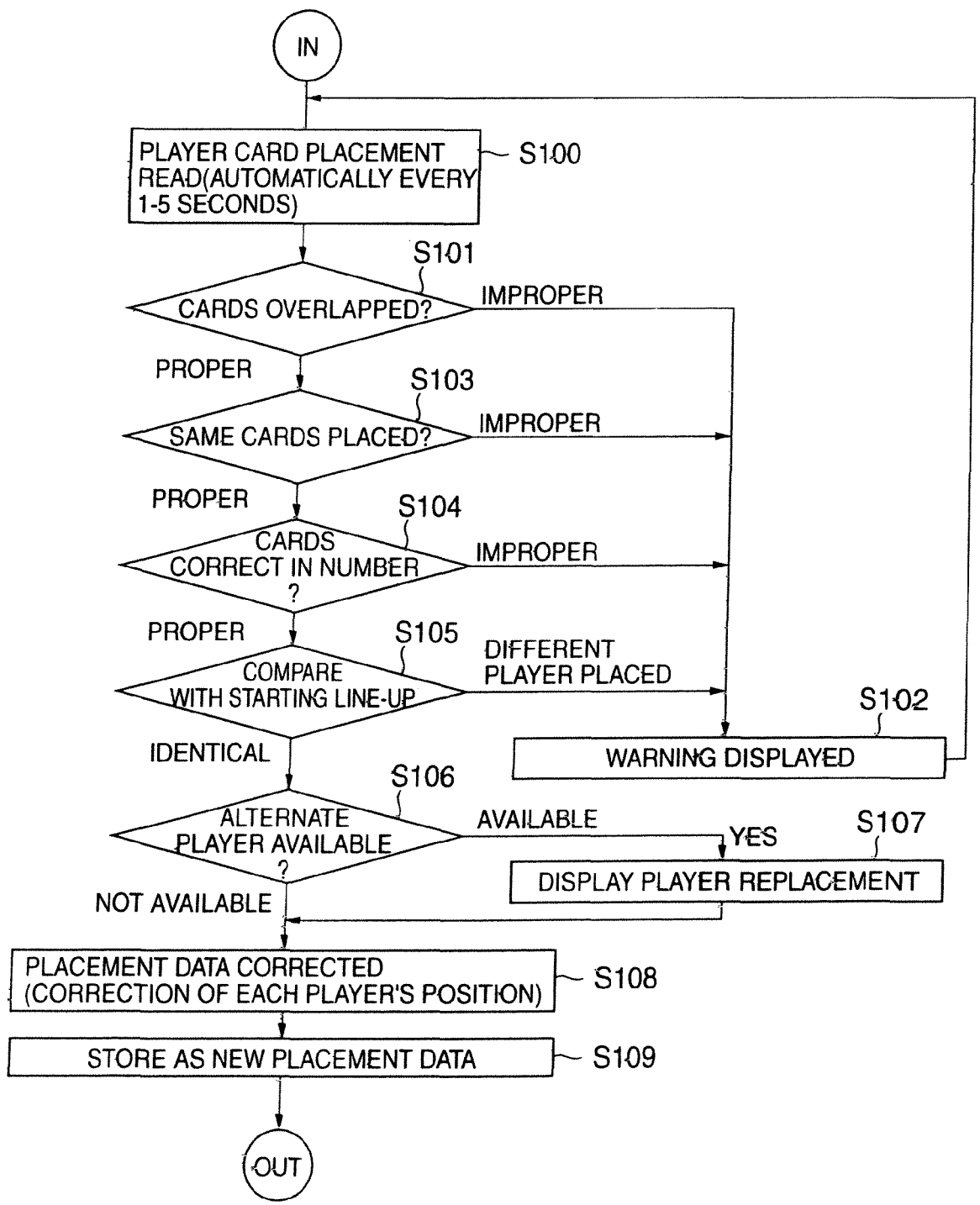
FIG. 29 is a flowchart showing the player card check process performed during a game.

As shown in FIG. 29, at S100, the arrangement data of the player cards 20 placed on the player card arrangement panel 24 is read. It is determined whether there are no overlapping player cards 20 at S101. At S101, if it is determined that there are overlapping player cards 20, the process progresses to S102, indicating to the game player 22 that the arrangement of the player card 20 is inadequate.

Otherwise, if it is determined at S101 that there are no overlapping player cards 20, the process progresses to S103, and it is determined whether the same player cards 20 are placed. If it is determined at S103 that the same player cards 20 are placed, it indicates to the game player 22 that the arrangement of the player cards 20 is inadequate unsuitable at S102.

If it is determined at S103 that the same player cards 20 are not placed, the process progresses to S104 and it is determined whether the number of the player cards 20 placed on the player card arrangement panel 24 is proper. Since the number of cards is proper when eleven player cards 20 are placed on the participation player card arrangement domain 92 of the player card arrangement panel 24 and five or less player cards 20 are placed on the alternate player card arrangement domain 94 as checked at S104, the process progresses to S105 where it is determined whether the arrangement data of the player cards 20 read this time is in agreement with the starting lineup data at the start of the game. If a player card 20 different from the starting lineup is placed when the arrangement data of the player cards 20 read by S105 this time, the process progresses to S102 where the game player 22 is alerted that the arrangement of the player cards 20 is in adequate.

When the arrangement data of the player cards 20 read by S105 this time is in agreement with the starting lineup data, the process progresses to S106 and it is determined whether the player cards 20 of alternate players are placed on the alternate player card arrangement domain 94. When it is determined at S106 that there is a player card 20 of an alternate player, the process progresses to S107 and displays that a player replacement is possible on the monitor 26.

At S108, player position data is corrected from the arrangement of the player cards 20 so that the present arrangement data can be adapted to the game. At S109, the arrangement data of the player cards 20 read this time is recorded as new arrangement data.

Thus, if the game player 22 moves a player card 20 and the formation is changed, the contents of the game according to the changed formation is immediately displayed on the monitor 26. When a player card 20 of an alternate player is placed in the alternate player card arrangement domain 94, the player card 20 can replace a present player. When the individual data of the changed player card 20 is recorded as new arrangement data, the image of the player who took the place is displayed on the monitor 26.

Figure 36A:
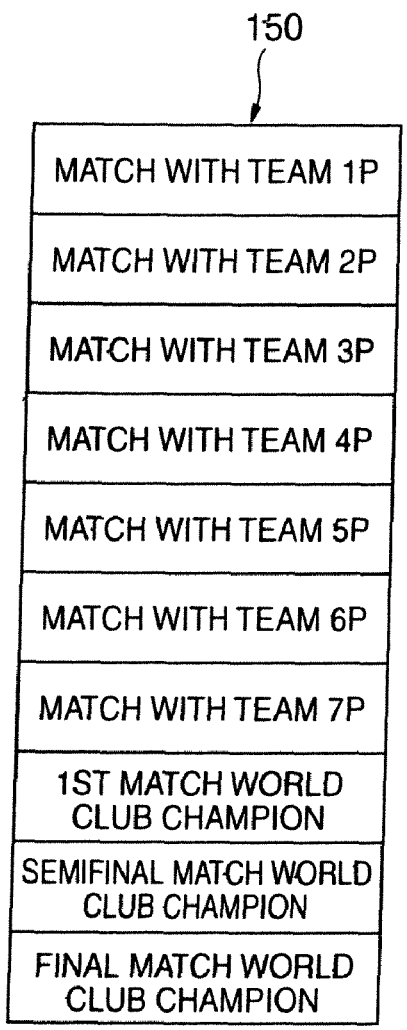
FIG. 36A is a figure showing an example of a game schedule of a first cycle of a world club championship.

FIG. 36A is a figure showing an example of a game schedule of a first cycle of a world club championship.

As shown in FIG. 36A, the game schedule is beforehand registered to the memory 44 of the main control unit 14. For example, ten kinds of cycles are registered, a cycle consisting of ten games. The main control unit 14 repeats the ten kinds of cycles. In the first cycle (the world club championship) 150, for example, a team is to match with seven other teams set up by other terminal apparatuses 16 in a round-robin system. When a team wins a game, a ranking (an evaluation point) of the team is raised. When there is a seat with no game player, a computer team registered in CPJ 62 of the terminal apparatus 16 plays a game.

When a team has finished a game with the 7 teams, three games are played, namely, the first round game of the world club championship, the semifinal game of the world club championship, and the final match of the world club championship. The world club championship is an international competition in which only teams ranked higher than the 50th place of an international ranking can participate. Teams that cannot participate in the world club championship (for example, a team having lost four or more games with the 7 teams) can participate in a local convention.

Figure 36B:
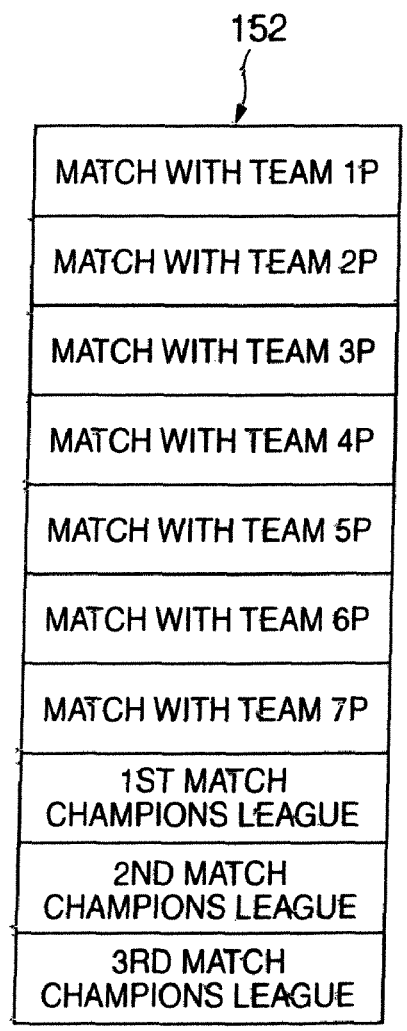
FIG. 36B is a figure showing an example of a game schedule of a second cycle of a champion's league.

FIG. 36B is a figure showing an example of a game schedule of a second cycle of a champion's league.

As shown in FIG. 36B, in order to raise international ranking, in the second cycle (the champion league) 152, a team matches with seven other teams set up by other terminal apparatuses 16 in an tournament system. In the second cycle (the champion league) 152, games are played in a round-robin system with the seven teams (a cycle containing 7 games). Ranking of a winning team rises and ranking of a losing team is lowered. The ranking goes up extensively if a team wins over a strong team.

The second cycle (the champion league) 152 is a league match by 4 teams of higher ranks according to the game result of the tournament system of 8 teams. A first game of the champion league, a second game of the champion league, and a third game of the champion league are held by the 4 teams of higher ranks. {Is above logically OK? round-robin/league}

Ten kinds of such game cycles are prepared, that is, eight other cycles are prepared in addition to the first cycle (the world club championship) 150, and the second cycle (the champion league) 152, the cycles being performed repeatedly.

Figure 37:
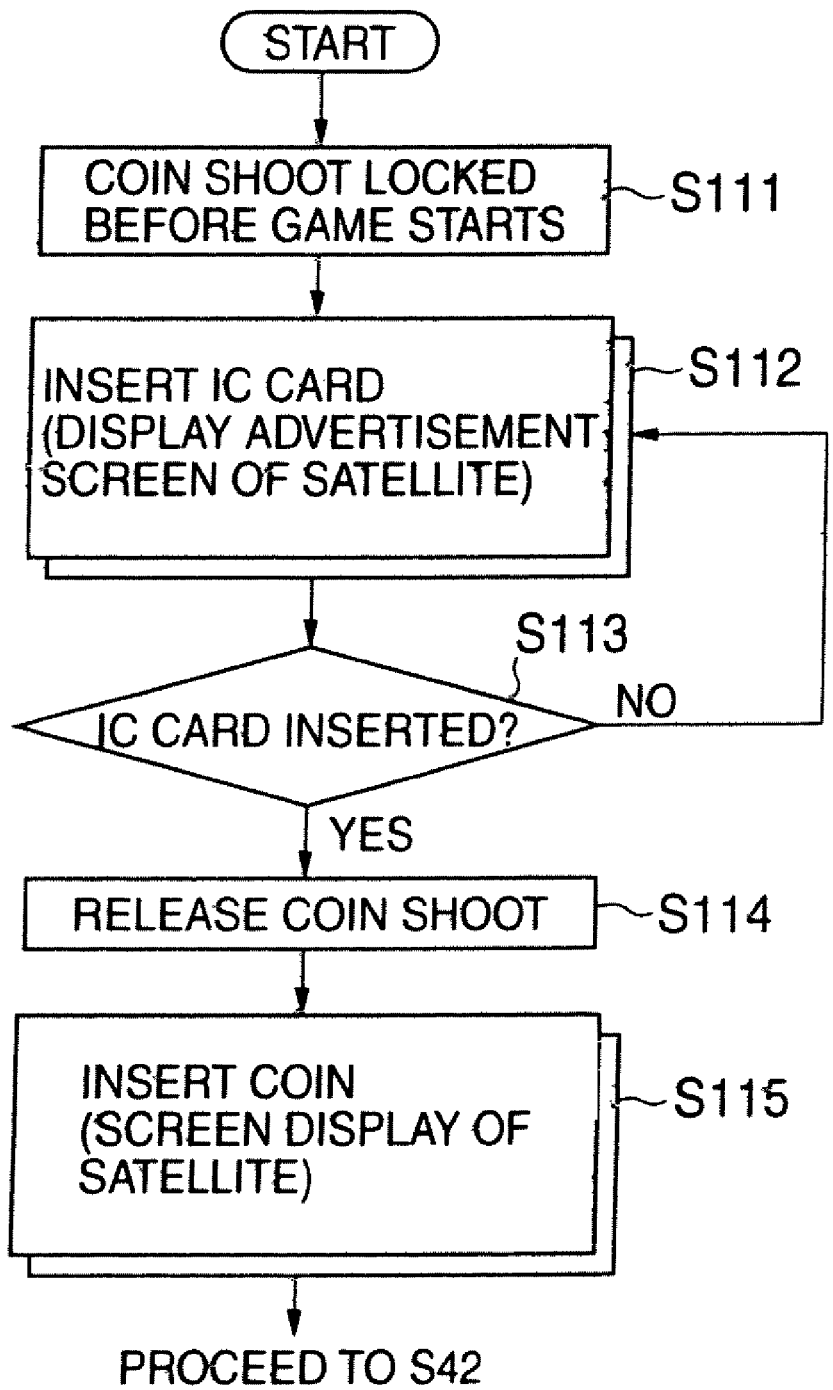
FIG. 37 is a flowchart for explaining subroutine process of S41.

FIG. 37 is a flowchart for explaining a subroutine to the process of S41.

As shown in FIG. 37, at S11, a coin shoot prepared in a coin slot (not shown) is locked before the game start. Then, at S112, a message such as "Insert an integrated circuit card" is displayed on the monitor 26, while displaying an advertisement screen on the monitor 26 of the terminal apparatus 16 provided in each of satellites.

At S113, it is determined whether an integrated circuit card (memory card) 18 is inserted in the integrated circuit card reader/writer 28. If it is determined that the integrated circuit card 18 is not inserted in the integrated circuit card reader/writer 28 at S113, the process returns to S112 where the advertisement screen is displayed on the monitor 26 of the terminal apparatus 16, and the message such as "Insert an integrated circuit card" is displayed on the monitor 26.

If it is determined at S113 that an integrated circuit card 18 is inserted in the integrated circuit card reader/writer 28, the process progresses to S114 where the coin shot prepared in the coin slot (not shown) is unlocked, being prepared for accepting a coin (coin accepting means). Then, at S115, a message such as "Insert a coin" is displayed on the monitor 26. After this, the process progresses to S42 mentioned above.

Thus, in the process prior to a game start, it is determined that a would-be game player 22 owns an item necessary for the card game, that is, a club card in which card data of the player cards 20 is stored. If the would-be game player 22 inserts an integrated circuit card 18 in the integrated circuit card reader/writer 28, and the inserted integrated circuit card 18 is determined to be a legitimate card, coin insertion is permitted. In this manner, coin insertion is prevented unless the would-be game player 22 owns a legitimate integrated circuit card 18, avoiding a trouble about returning the coin.

Here, an example of variation the present invention is explained.

FIG. 38 through FIG. 41 are flowcharts for explaining the variation of the control process that CPU 62 of the terminal apparatus 16 performs.

Figure 38:
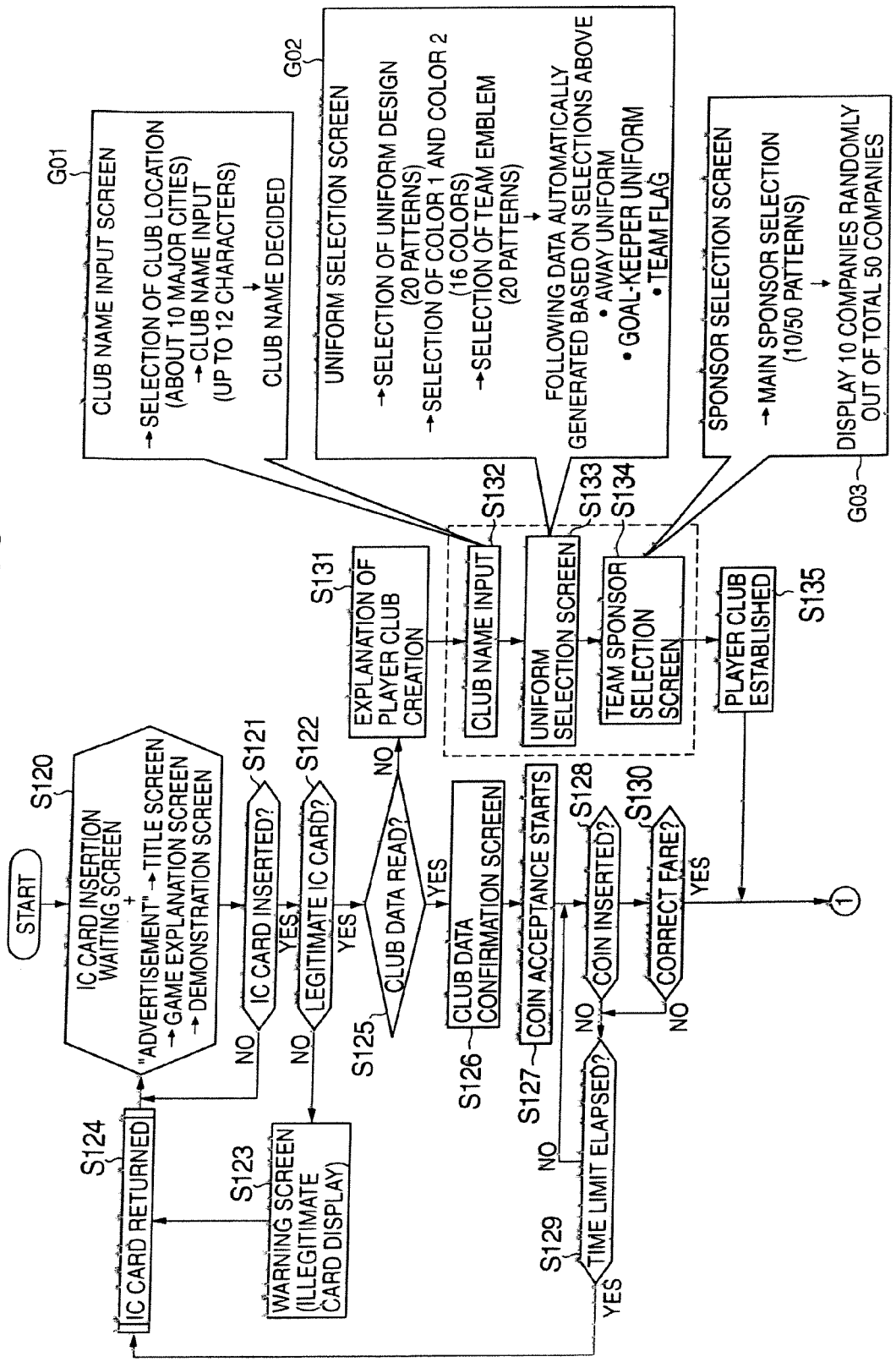
FIG. 38 is a flowchart for explaining a variation of the control process that CPU 62 of the terminal apparatus 16 performs.

As shown in FIG. 38, CPU 62 of the terminal apparatus 16 displays a standby screen that prompts the would-be game player 22 to insert an integrated circuit card 18 at S120, then an advertisement screen, on the monitor 26. The advertisement screen includes a title screen of the card game concerned, and a game explanation screen for explaining the operation method and the rule of the game, and a game demonstration screen, etc.

The would-be game player 22 inserts an already purchased integrated circuit card 18 in the integrated circuit card reader/writer 28, when participating in the card game concerned. If the would-be game player 22 is a beginner, a starter set should be purchased in advance. The starter set includes an integrated circuit card 18 and eleven player cards 20.

At S121, it is determined whether the integrated circuit card 18 is inserted in the integrated circuit card reader/writer 28. At S121, if it is determined that the integrated circuit card 18 is inserted in the integrated circuit card reader/writer 28, the process progresses to S122, where it is determined whether the integrated circuit card 18 inserted in the integrated circuit card reader/writer 28 is a legitimate card. The integrated circuit card 18 stores at least the kind of the card, skill of a player corresponding to card data, and past same results. Therefore, data required for a game is obtained, and legitimacy of the would-be game player 22 is determined by reading the information stored in the integrated circuit card 18.

If it is determined at S122 that the integrated circuit card 18 inserted in the integrated circuit card reader/writer 28 is not a legitimate card, the process progresses to S123 and a warning screen (an illegitimate card display) is displayed on the monitor 26. Then, the integrated circuit card reader/writer 28 by S124 discharges the integrated circuit card 18 that is determined illegitimate. Then, the process returns to S120 again and the standby screen that prompts insertion of an integrated circuit card 18, and the advertisement screen are displayed on the monitor 26.

If it is determined at S122 that the inserted integrated circuit card 18 is legitimate, the process progresses to S125, where it is determined whether club data is stored in the integrated circuit card 18. If the club data is stored in the integrated circuit card 18, the process progresses to S12, and the club data read from the integrated circuit card 18 is displayed on the monitor 26.

At S127, accepting coin insertion starts (payment of a game fee). The process progresses to S128 where it is determined whether a coin is inserted. If it is determined at S128 that there is no coin inserted, the process progresses to S129 where it is determined whether a time limit set up beforehand passed. If it is determined at S129 that the time limit has not passed, the process returns to S128 and coin insertion is checked again.

If it is determined at S129 that the time limit passes, the process returns to S124 and the integrated circuit card 18 is discharged in order to prevent delay of a game start. Then, the process returns to S120 where the standby screen prompting insertion of an integrated circuit card 18, and the advertisement screen are displayed on the monitor 26.

If it is determined at S128 that there is a coin inserted, the process progresses to S130 where it is determined whether paid amount reaches the amount of the game fee. If it is determined that the paid amount does not reach the game fee, the process progresses to S129 where the predetermined time limit is counted, during which whether an additional coin is inserted is determined.

If it is determined at S125 that club data is not stored in the integrated circuit card 18, the process progresses to S131 where a guidance screen explaining steps to create a club to the would be game player 22 is displayed on the monitor 26. Then, at S132, an input screen G01 for inputting a club name is displayed on the monitor 26. At S133, a uniform creation screen G02 is displayed on the monitor 26 such that uniforms that player of the team of the would-be player will wear. Specifically, a uniform for "home", a uniform for "away", a uniform for a goalkeeper, and a team flag are created through this screen.

At S134, a team sponsor selection screen G03 (50 company names are listed) is displayed on the monitor 26, and ten companies are to be selected as main sponsors and sub sponsors. Then, at S135, a screen illustrating the completion of the club establishment of the team concerned is displayed on the monitor 26.

Figure 39:
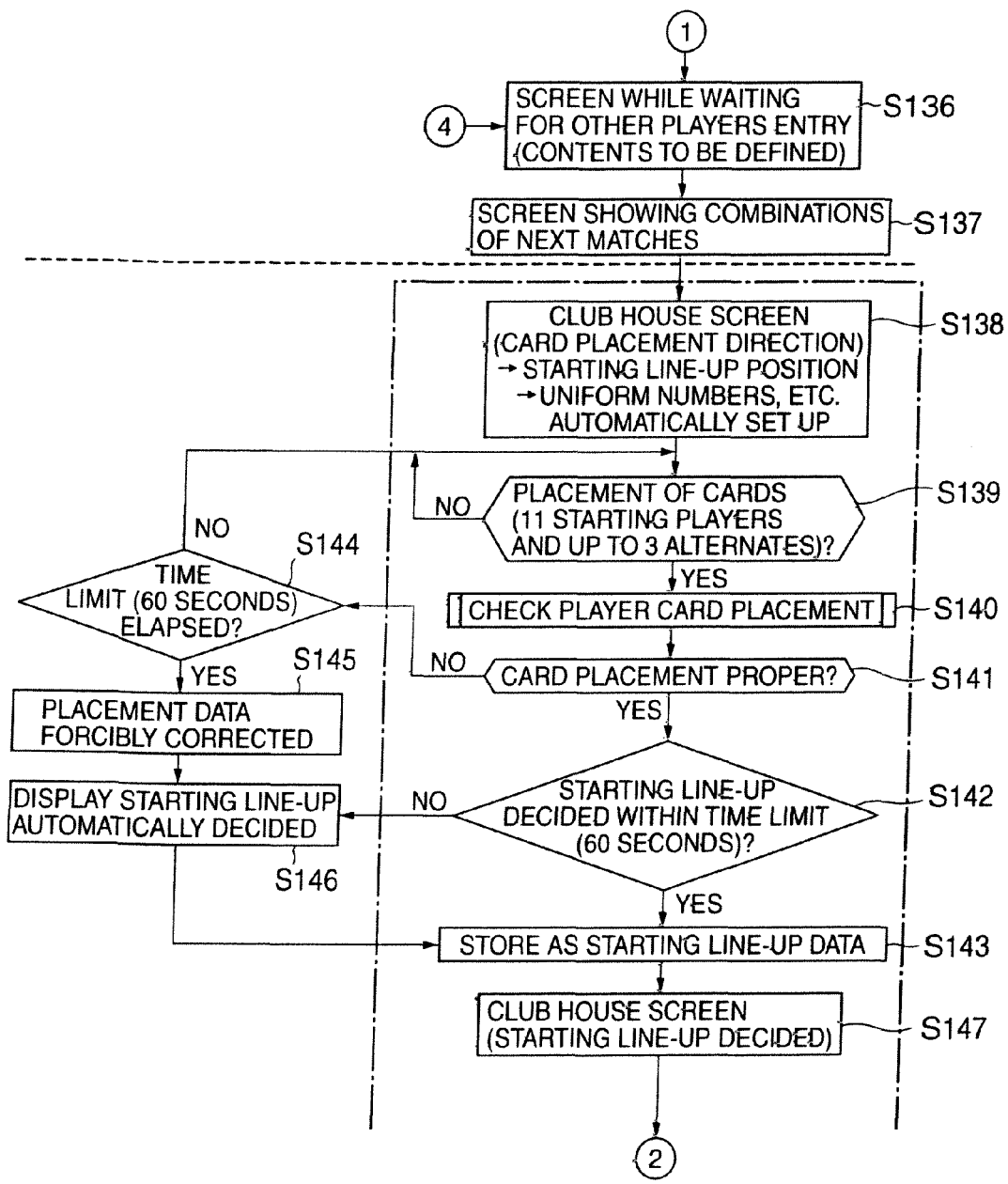
FIG. 39 is a flowchart for explaining the variation of the control process that CPU 62 of the terminal apparatus 16 performs following FIG. 38.

Then, at S136 shown in FIG. 39, a waiting screen for an entry of other game players is displayed on the monitor 26. At S137, a match combination display screen is displayed on the monitor 26 of all the seats simultaneously, showing an opponent team that made an entry.

Next, a display process of a clubhouse is performed commonly to all the seats (the terminal apparatuses 16a-16h).

At S138, a clubhouse screen (a card arrangement direction) is displayed on the monitor 26. In the clubhouse screen, a direction to the game player 22 to arrange player cards 20, and an arrangement of the starting lineup of a game performed last time from the past game data stored in the integrated circuit card 18 are displayed on the monitor 26. Further, a uniform number of each player is set up automatically, and displayed on the monitor 26.

At S139, it is determined whether the player card 20 is placed on the player card arrangement panel 24. On the player card arrangement panel 24, it is possible to place eleven cards as the starting lineup and three {not 5? why 3? because this is a variation?} cards of alternate players. At S140, the card data of each player card 20 placed on the player card arrangement panel 24 is read, and arrangement of each player card 20 is checked.

At S141, it is determined whether the arrangement of each player card 20 placed on the player card arrangement panel 24 is proper. If affirmative, the process progresses to S142, where it is determined whether the starting lineup is decided by reading the card data of each player card 20 placed on the player card arrangement panel 24 within a predetermined time limit.

If it is determined at S142 that a starting lineup is decided within the time limit, with each player card 20 placed on the player card arrangement panel 24, the starting lineup is registered into the memory 64 of the terminal apparatus 16 at S143.

If it is determined at S141 that the arrangement of each player card 20 placed on the player card arrangement panel 24 is unsuitable, the process progresses to S144, where it is determined whether the time limit (for example, 60 seconds) has elapsed. If it is determined at S144 that the time still remains, the process returns to S139 and the process after S139 is performed.

If it is determined at S144 that the time limit (for example, 60 seconds) has elapsed, the process progresses to S145, where the arrangement data of each player card 20 is compulsorily corrected based on the past game result. Then, at S146, a starting lineup is automatically decided according to the corrected arrangement data of each player card 20, and the starting lineup is displayed on the monitor 26. Then, the process progresses to S143, where the starting lineup is registered into the memory 64 of the terminal apparatus 16.

At S147, the clubhouse screen (starting lineup decision) is displayed on the monitor 26, and the starting lineup is displayed on the monitor 26.

Figure 40:
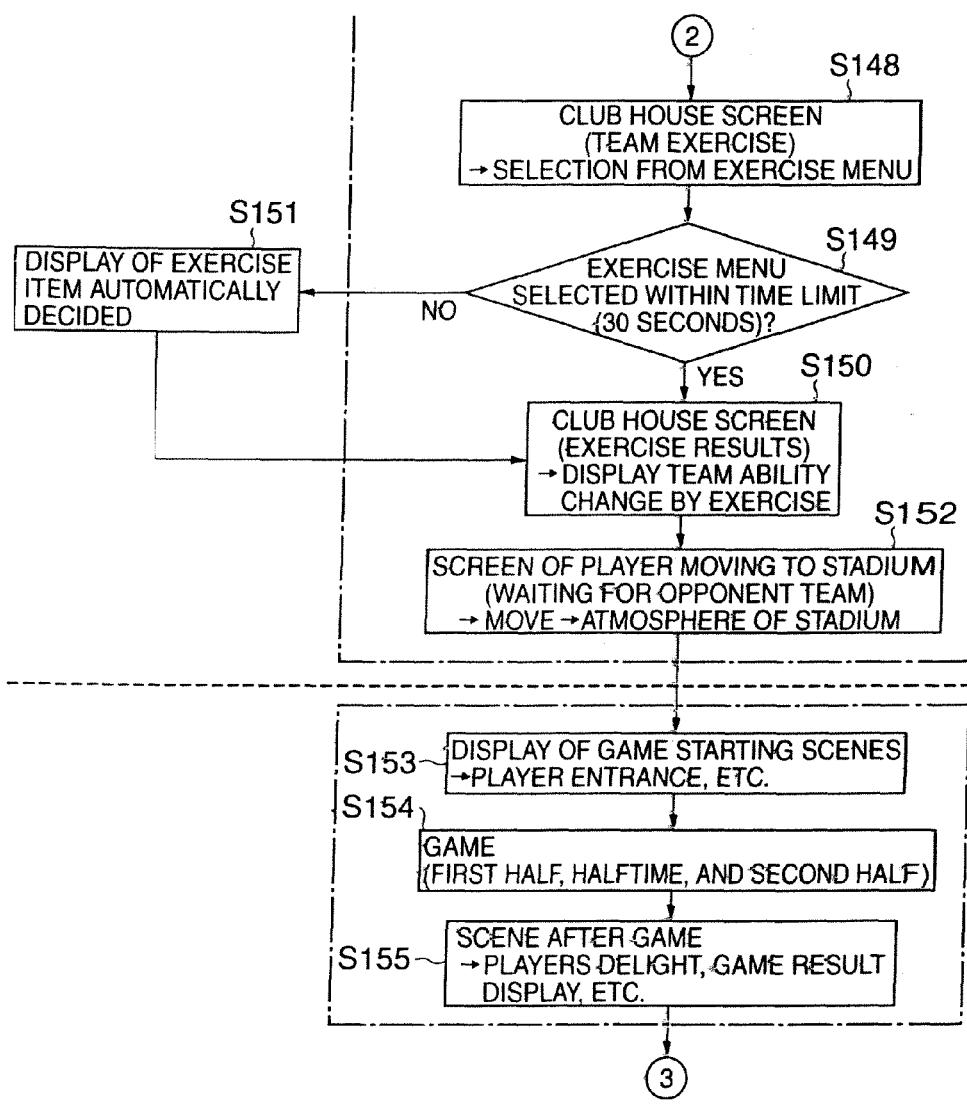
FIG. 40 is a flowchart for explaining the variation of the control process that CPU 62 of the terminal apparatus 16 performs following FIG. 39.

Then, at S148 shown in FIG. 40, a clubhouse screen (team exercise scene) is displayed on the monitor 26, exercise menu selection is displayed on the monitor 26.

At S149, if an item of the exercise is selected from the exercise menu within the time limit, the process progresses to S150, where a clubhouse screen (exercise result) is displayed on the monitor 26, and a team capability change screen updated by the exercise is displayed on the monitor 26.

If no items of the exercise are selected within the time limit at S149, an automatic menu decision screen is displayed at S151, then at S150, the clubhouse screen (exercise result) is displayed on the monitor 26, and the team capability change screen updated by the exercise is displayed on the monitor 26.

Following the above, a stadium screen is displayed simultaneously to the whole seats, and an operation process of a kickoff is performed. At S153, scenes prior to the kickoff (player entrance etc.) are displayed on the monitor 26.

Then, at S154, an operation process of a game with an opponent team is performed. At S155, scenes after the game (joy of the players of a team that wins the game, display of a game result, etc.) are displayed on the monitor 26.

Figure 41:
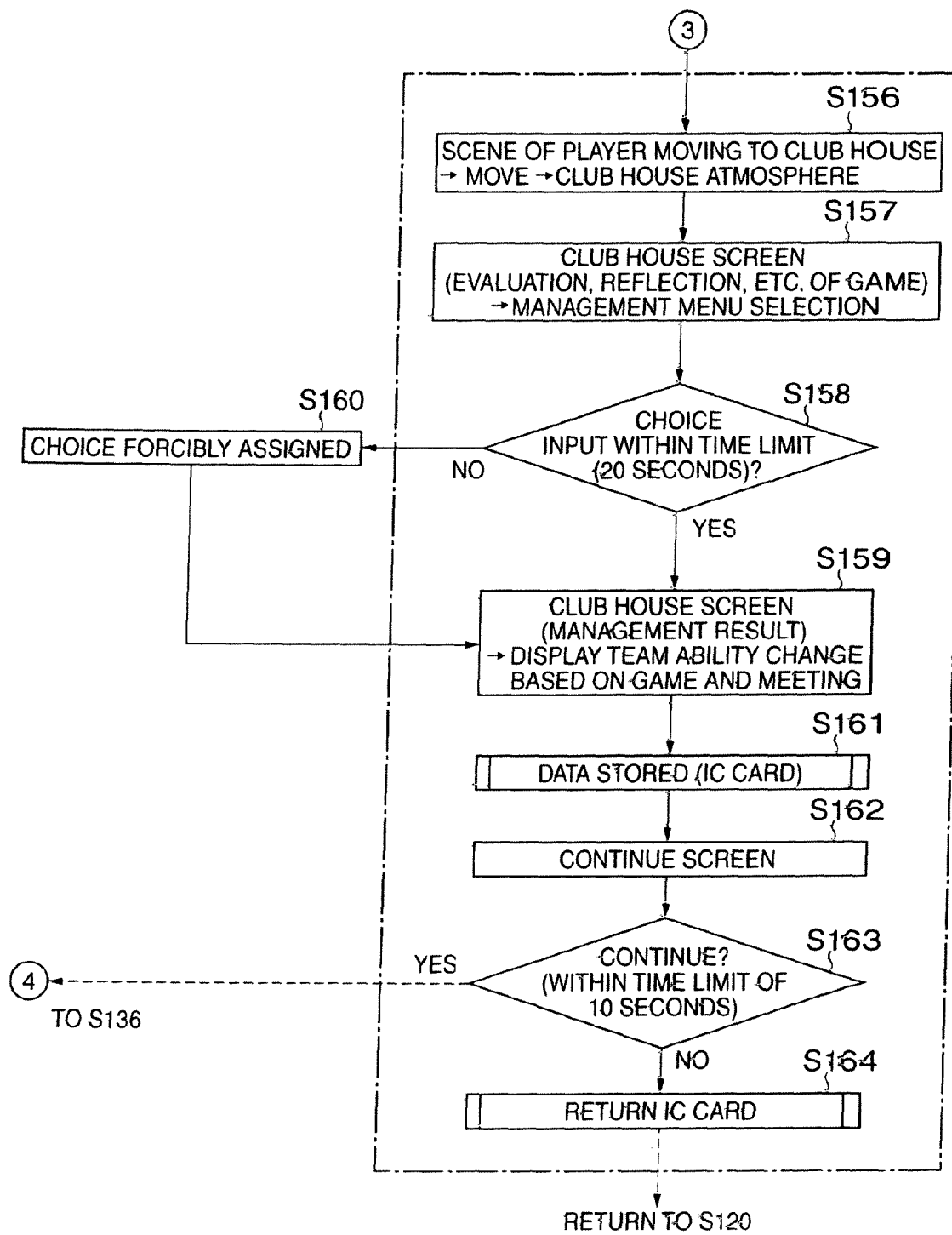
FIG. 41 is a flowchart for explaining the variation of the control process that CPU 62 of the terminal apparatus 16 performs following FIG. 40.

At S156 shown in FIG. 41, a movement scene that shows the players moving to the clubhouse after the game is displayed on the monitor 26. Then, at S157, a clubhouse screen (evaluation/reflection of the game) is displayed on the monitor 26, and a management menu selection screen is displayed on the monitor 26.

At S158, it is determined whether a choice is made of the management menu selection screen within a time limit. If it is determined at S158 that a choice is made of the management menu selection screen within the time limit, the process progresses to S159, where a clubhouse screen (management result) is displayed on the monitor 26, and a team capability change screen updated according to the game result and the meeting is displayed on the monitor 26.

If it is determined at S158 that no choice was made of the management menu selection screen within the time limit, the process progresses to S160, where a choice is made compulsorily of the management menu selection screen, and the process progresses to S159.

At S161, the data of the game result is stored in the integrated circuit card 18. Then, the process progresses to S162 and a continue screen (game continuation check screen) is displayed on the monitor 26. Then, at S163, it is determined whether the card game is to be continued. If it is determined at S163 that the game player 22 does not choose the continue (game continuation) within a time limit (for example, 10 seconds), the process progresses to S164, where the integrated circuit card 18 is discharged, and the card game ends.

If it is determined at S163 that the game player 22 chooses the continue (game continuation) within the time limit (for example, 10 seconds), the process returns to S136 of FIG. 39.

Figure 42:
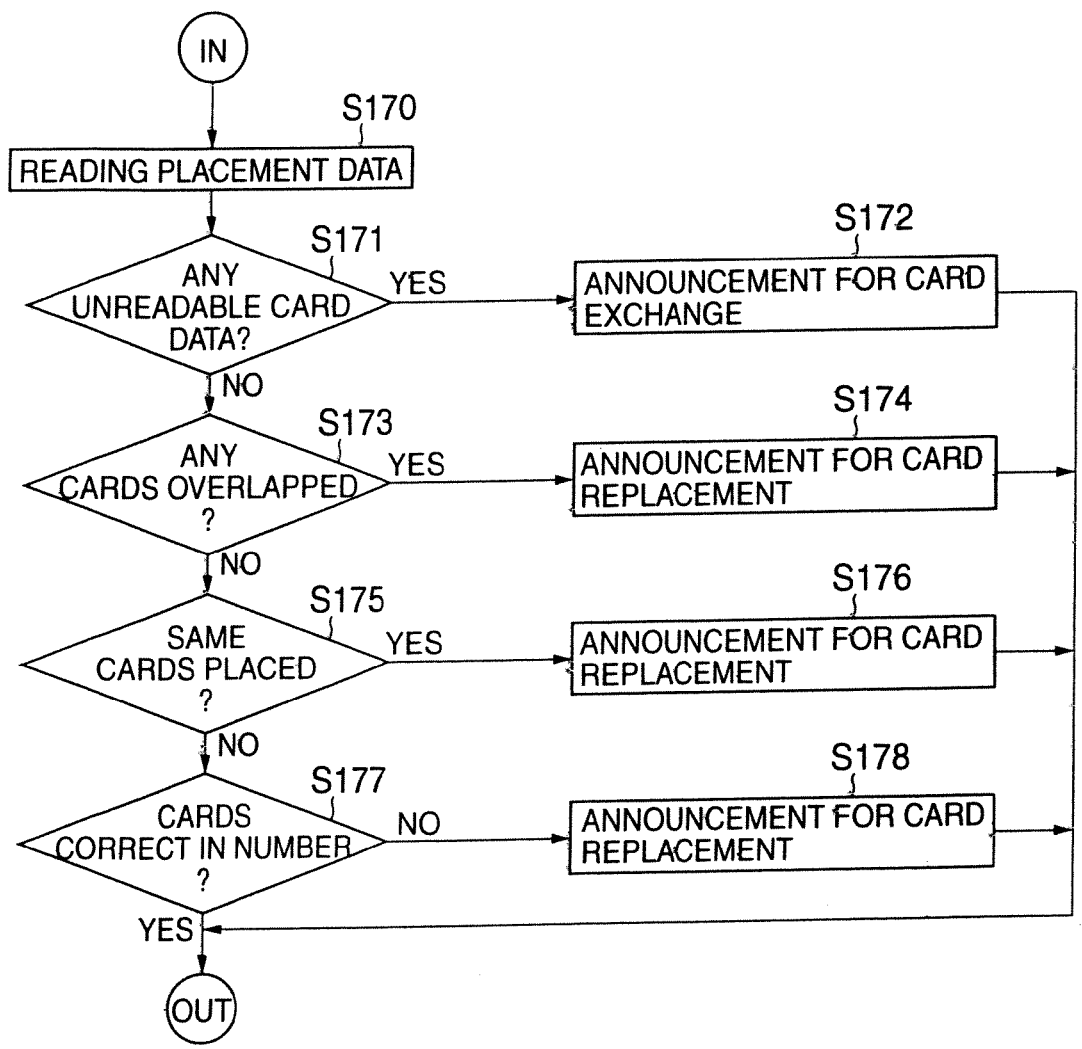
FIG. 42 is a flowchart for explaining the subroutine of the player card arrangement check process performed at S140.

FIG. 42 is a flowchart for explaining the subroutine of the player card arrangement check process performed in S140.

In FIG. 42, the card data of each player card 20 placed on the player card arrangement panel 24 is read at S170. At S171, it is determined whether there is a player card 20 of which card data cannot be read is placed on the player card arrangement panel 24. If it is determined at S171 that there is a player card 20 of which card data cannot be read, the process progresses to S172 and a card exchange direction announcement is issued (card exchange prompting means).

If it is determined at S171 that there is no player card 20 of which card data cannot be read, the process progresses to S173, where it is determined whether there are player cards 20 overlapped each other on the player card arrangement panel 24. If it is determined at S173 that there are overlapping cards, the process progresses to S174 where a rearrangement direction announcement is issued.

If it is determined at S173 that there are no overlapping cards, the process progresses to S175, where it is determined whether there are any identical cards. If it is determined at S175 that there are identical player cards 20 placed on the player card arrangement panel 24, the process progresses to S176, where a rearrangement direction announcement is issued.

If it is determined at S175 that there are no identical cards, the process progresses to S177, where it is determined whether there are a correct number of player cards 20 (11 cards when it is a soccer game) placed on the player card arrangement panel 24. If it is determined at S177 that the number of the player cards 20 placed on the player card arrangement panel 24 is not eleven, being improper for the soccer game, the process progresses to S178, where a rearrangement direction announcement is issued.

Thus, at S170-S178, the card data of each player card 20 placed on the player card arrangement panel 24 is read, and it is determined that each player card 20 is arranged in the proper state, such that it is determined that a game can start, each player card 20 being properly arranged.

Figure 43:
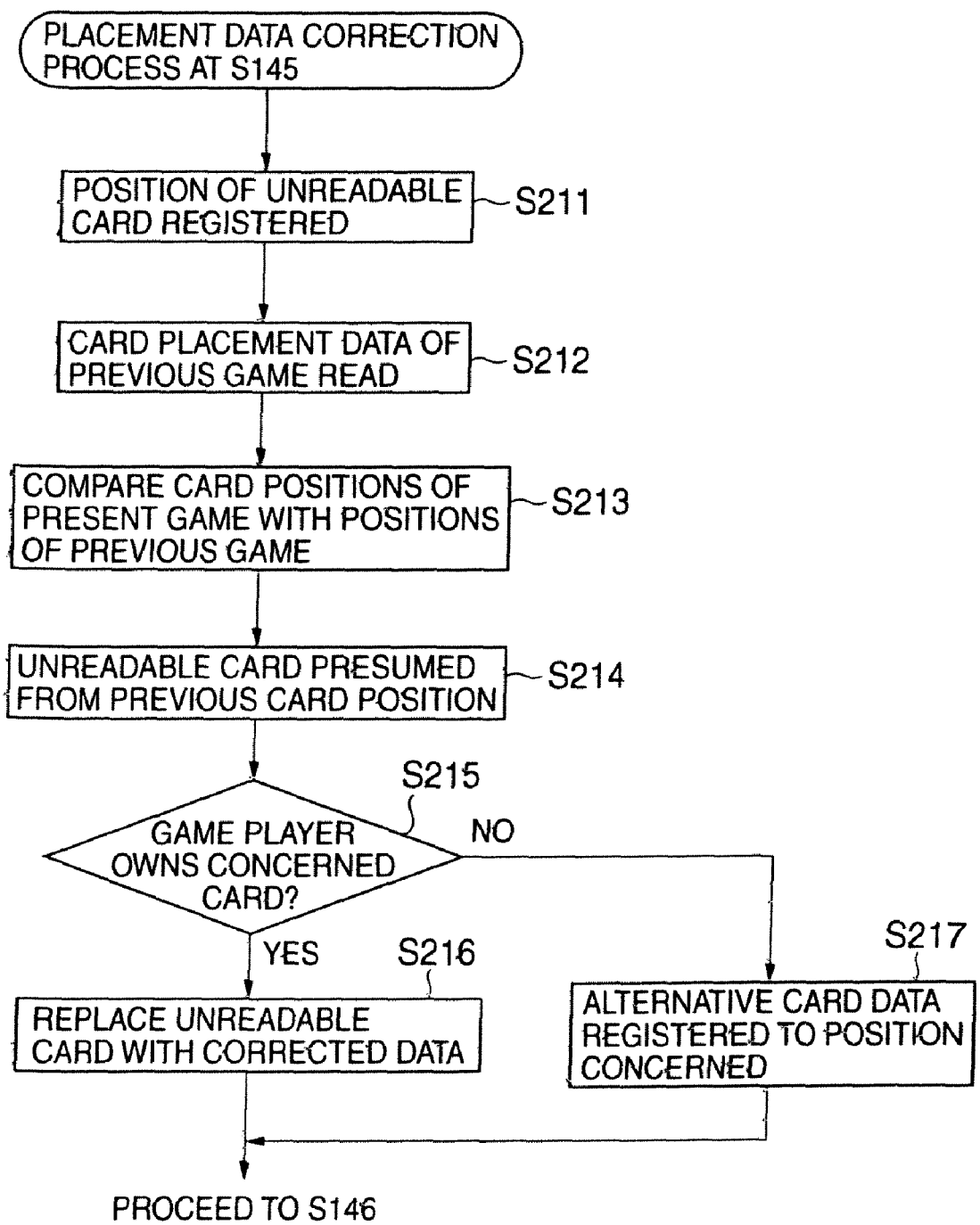
FIG. 43 is a flowchart for explaining the subroutine of the arrangement data correction process performed at S145.

FIG. 43 is a flowchart for explaining the subroutine of the arrangement data correction process performed at S145.

At S211 shown in FIG. 43, when the card data of a player card 20 placed on the player card arrangement panel 24 cannot be read by secular change etc. of the player card 20, the coordinates of the unreadable player card 20 is registered as an unidentified player card (position information reading means).

At S212, card arrangement of the last game is read from the past game data stored in the integrated circuit card 18. Then, at S213, the card arrangement of the last same and the present arrangement of the player cards 20 are compared.

At S214, the card data of the player card 20 that is unreadable is assumed from the last card arrangement is assumed, and the assumed card data is stored into the memory 64.

Then, the process progresses to S215 where it is determined whether the game player 22 owns the player card 20 of the card data assumed at S214. If it is determined at S215 that the game player 22 owns the player card 20 of the presumed card data, the process progress to S216, where the card data of the player card 20 that is unreadable is replaced with the assumed card data (corrected card data generation means). Then, the process progressed to S146 described above.

If it is determined that the game player 22 does not own the player card 20 corresponding to the assumed card data, the process progresses to S217, where a player having capabilities similar to the assumed card data is selected, and the card data of the selected player is registered into the memory 64 as alternative card data for the coordinates position (position where the unreadable player card is placed) alternative card data providing means).

In this manner, even when card data cannot be read by secular change, etc. of the player card 20, it becomes possible to start the card game, using alternative card data instead, and the game delay due to inability to read the card data is prevented. Further, when the card data of the player card 20 cannot be read as mentioned above, the game delay due to inability to read the card data is prevented by reading the card data of the past game corresponding to the arrangement of the unreadable card out of the card data stored in the integrated circuit card 18 that serves as a storage means, and generating alternative card data.

Figure 44:
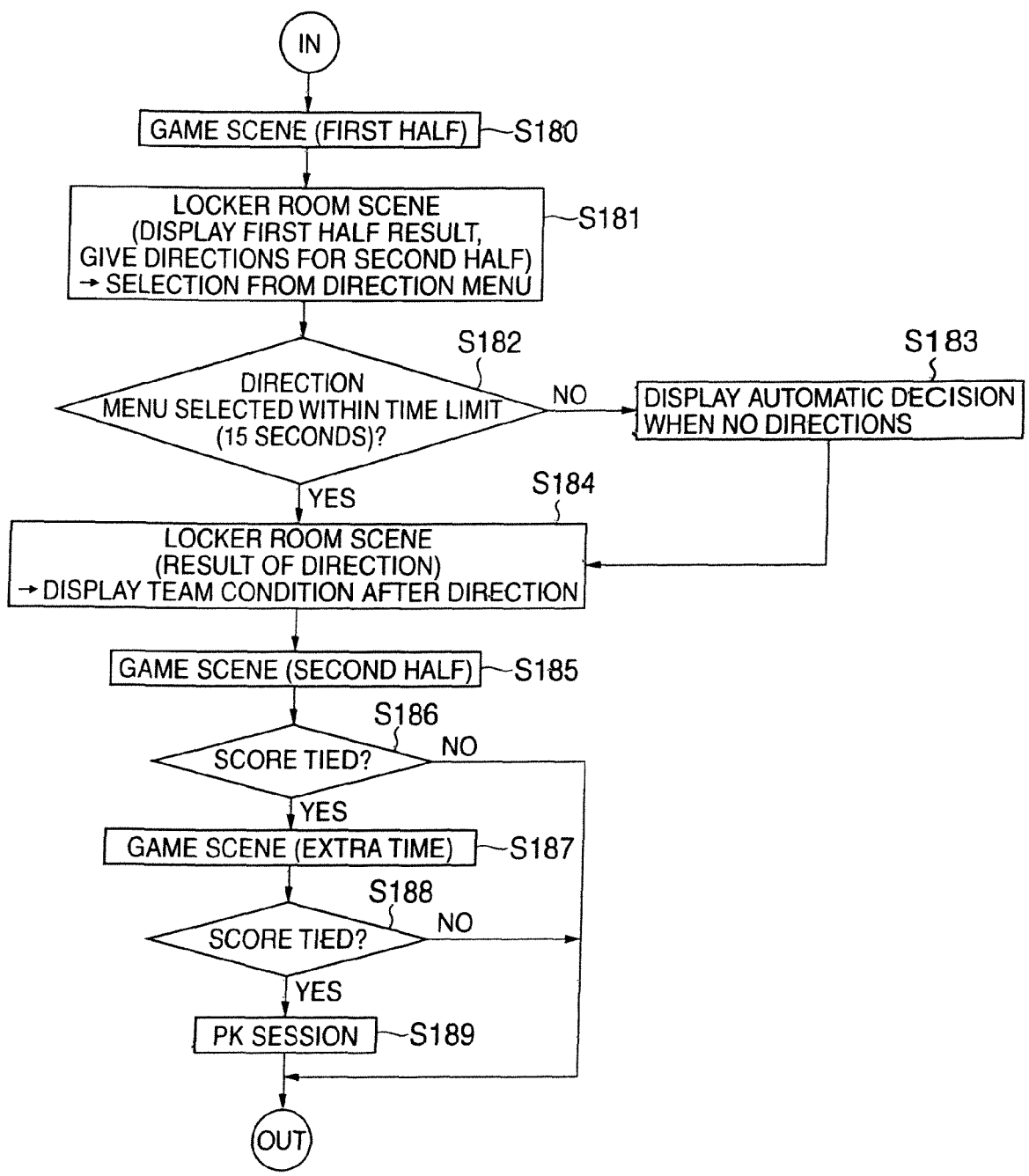
FIG. 44 is a flowchart for explaining the subroutine of the control process that displays the game performed at S154.

FIG. 44 is a flowchart for explaining the subroutine of S154 for the control process that displays the same.

In FIG. 44, progress situation of the game in the first half from the kickoff to an end of the first half is displayed on the monitor 26 at S180. When the first half of the game is finished and it enters the halftime, the process progresses to S181, where a locker room screen is displayed, and data (the number of the goals, goal time, a scoring player name, the number of shoots, the number of yellow cards, the number of red cards, a foul player name, etc.) of the game result of the first half is displayed on the monitor 26. Then, a menu of directions for the second half for each player is displayed, and it is determined whether a selection from the menu is made.

At S182, when no directions for the second half for each player are inputted, the process progresses to S183, where "no directions" is automatically chosen, and displayed on the monitor 26. At S184, the locker room screen of each player and the team state updated by the directions are displayed.

At S185, the progress situation of the second half of the game from the kickoff of the second half to the end is displayed on the monitor 26. After the second half of the game is finished, it is determined at S186 whether the score is in a tie. When it is determined at S186 that the score is in a tie, the process progresses to S187, where the extra-time game screen is displayed on the monitor 26. If it is determined at S186 whether the score is in a tie as the result of the extra-time, the game is over and the process progresses to S155.

After the extra-time is completed, the process progresses to S188, where it is determined whether the score is in a tie. If it is determined at S188 that the score remains in a tie, the process progresses to S189 and the screen of PK (penalty kick) game is displayed on the monitor 26. If it is determined at S188 that the score is not in a tie as the result of the extra-time, the game is over, and the process progresses to S155.

Here, a control process of the main control unit 14 that coordinates with the control process performed by each of the terminal apparatuses 16, and controls the display of the large-size panel display 12 is explained with reference to FIG. 45 and FIG. 46.

Figure 45:
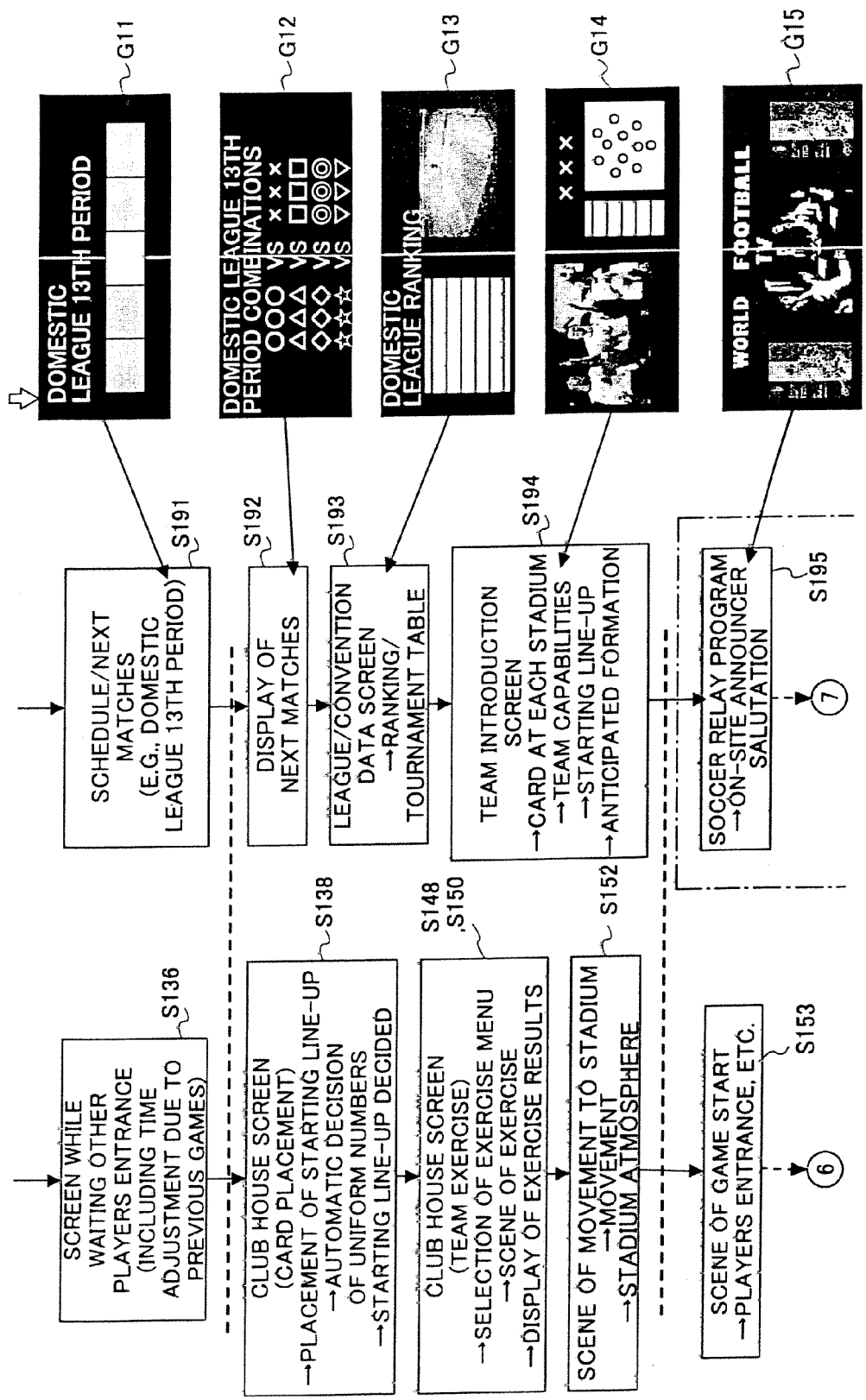
FIG. 45 is a flowchart for explaining the control process of a main control unit 14 that controls the display of a large-size panel display 12.

As shown in FIG. 45, (1) when the process progresses to the process of S136 (displaying the waiting screen for another player entry) from the club creation screen or the continue screen of each terminal apparatus 16, the process of the main control unit 14 progresses from displaying a soccer relay broadcast program screen of a previous game, or a game result of previous games display screen to S191, where the schedule (the next game display screen G11) of games will be displayed on the large-size panel display 12.

(2) While each terminal apparatus 16 processes S138 (a clubhouse screen, card arrangement, a starting lineup decision), the main control unit 14 displays the next came combination display screen G12 on the large-size panel display 12 at S192, and then, at S193, displays a convention data screen of a league, and a ranking and tournament table screen G13 on the large-size panel display 12.

(3) While each terminal apparatus 16 processes S148 and S150 (a clubhouse screen, team exercise, exercise menu selection, exercise scene, and exercise result display) and S152 (scene of movement to the stadium, player movement, and stadium atmosphere), the main control unit 14 at 5194 displays introduction screens 14 that contain introduction of each team (matching team names of a stadium, teams' capability, a starting lineup, anticipated formation, etc.) on the large-size panel display 12.

(4) While the terminal apparatuses 16 of all seats simultaneously process S153 (a kickoff scene, and player entrance scene), the main control unit 14, at S195, displays a soccer relay broadcast program screens G15 (greeting of a site announcer, etc.) on the large-size panel display 12. Then, a kickoff (kickoff) scene is displayed on each terminal apparatus 16 and the large-size panel display 12.

Figure 46:
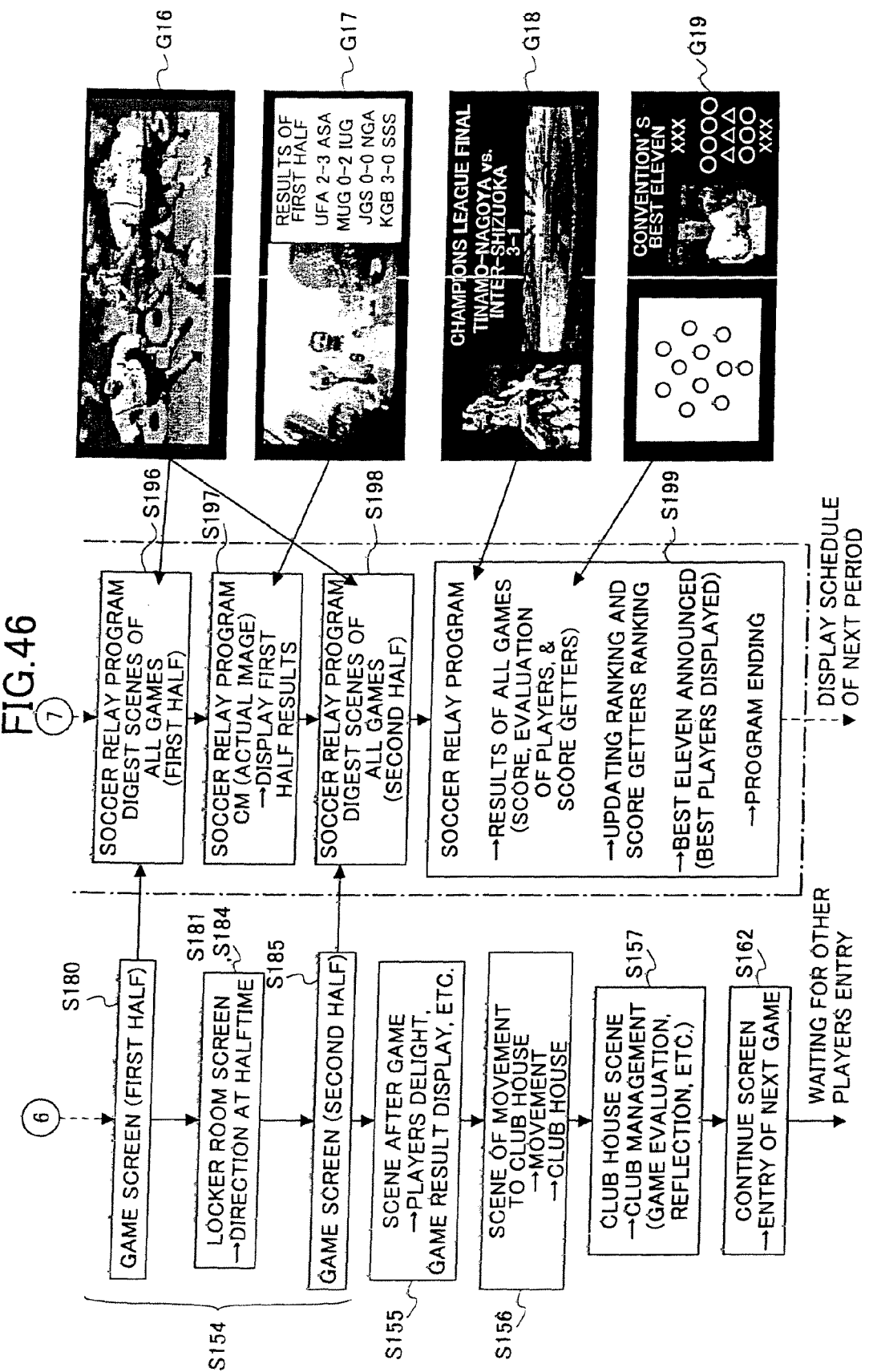
FIG. 46 is a flowchart for explaining the control process of the main control unit 14 that controls the display of the large-size panel display 12 following the process of FIG. 45.

(5) While each terminal apparatus 16 processes S180 (a game screen, the first half), the main control unit 14, at S196, displays a soccer relay broadcast program screen G16 (all game digest screen) on the large-size panel display 12, as shown in FIG. 46.

(6) While each terminal apparatus 16 processes S181 and S184 (a locker room screen, and directions during the halftime), the main control unit 14, at S197, displays a soccer relay broadcast program screen G17 (the result of the first half of the game, CM image, etc.) on the large-size panel display 12.

(7) While each terminal apparatus 16 processes S185 (a game screen, second half), the main control unit 14, at S198, displays a soccer relay broadcast program screen G16 (all game digest screens) on the large-size panel display 12.

(8) While each terminal apparatus 16 processes S155-157 and S162 (a game end scene, a movement scene to the clubhouse, club management, continue screen), the main control unit 14, at S199, displays soccer relay broadcast program screens G18 (situation of a winning team and all game results, ranking table), and G19 (announcement of best eleven, program ending) on the large-size panel display 12.

In this manner, the large-size panel display 12 displays the game display screen G11, the game combination display screen G12, the convention data screen and the ranking and tournament table screen G13, the introduction screen G14, the soccer relay broadcast program screen G15, the soccer relay broadcast program screen G16, and the soccer relay broadcast program screens G17, G18, and G19, one by one according to the flow of the game played between terminal apparatuses 16. Therefore, while being able to prevent waiting customers from boring by the display through the large-size panel display 12, the fun of the game can be advertised to new customers who have not participated in a game, and an efficient marketing can be performed.

Here, a digest scene process is explained, in which digest scenes are extracted from the games, sequential order of the scenes is decided, and the digest scenes are arranged according to the sequence.

Figure 47A:
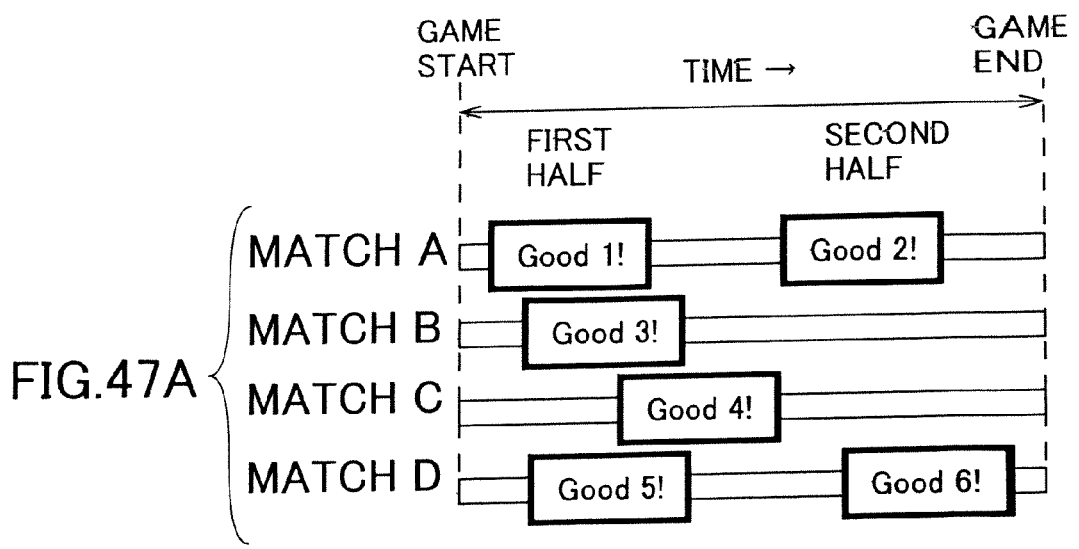
FIG. 47A is a figure for explaining a process that extracts a digest scene of each game.

As shown in FIG. 47A, each terminal apparatus 16 extracts digest scenes Good1 through Good6 from each game A through game D, and the extracted scenes are stored in the memory 64.

Figure 47B:
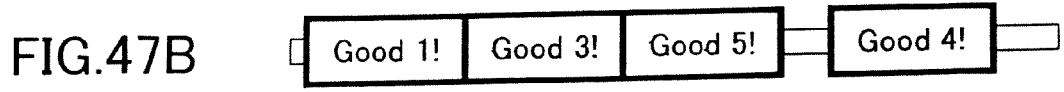
FIG. 47B is a figure for explaining a process by which a display sequence of extracted digest scenes is decided, arranging the digest scenes in time sequence and storing to a memory.

The memory 44 of the large-size panel control unit 36 of the main control unit 14 stores the image data of the digest scenes stored in the memory 64 of each terminal apparatus 16 with the ranking (Good1, Good3, Good5, and so on) in that sequence, as shown in FIG. 47B.

Figure 47C:
FIG. 47C is a figure showing an example of a display provided to the large-size panel display 12, showing the digest scenes of each game in the time sequence.

As shown in FIG. 47C, the large-size panel control unit 36 displays the digest scenes in the sequence (Good1, Good3, Good5, and so on) on the large-size panel display 12, which are stored in the memory 44.

Here, typical dicest scenes will include (1) an assist scene before shooting, (2) a shooting scene, (3) a goal scene (or a goalkeeper's shoot cutting scene), (4) a goal shooter's performance scene, and (5) an excitement scene of the spectator immediately after the goal, etc., for example. As for putting the sequential order, a higher priority may be given to a goal scene, and a set of the five scenes as described above is stored as a digest scene in the memory 64.

The typical digest scenes may include a corner kick scene, a penalty kick scene by a foul act in the penalty area, a free kick scene outside of the penalty area, a throw-in scene near the goal, etc. that are stored in the memory 44, where there are no goal scenes.

Image data of each digest scene contains recognition data such that the digest scene of each game can be easily distinguished by the main control unit 14 and each terminal apparatus 16, and it is possible to extract a digest scene automatically.

Here, a display data generation process of the large-size panel display 12, which the main control unit 14 performs is explained with reference to FIG. 48.

Figure 48:
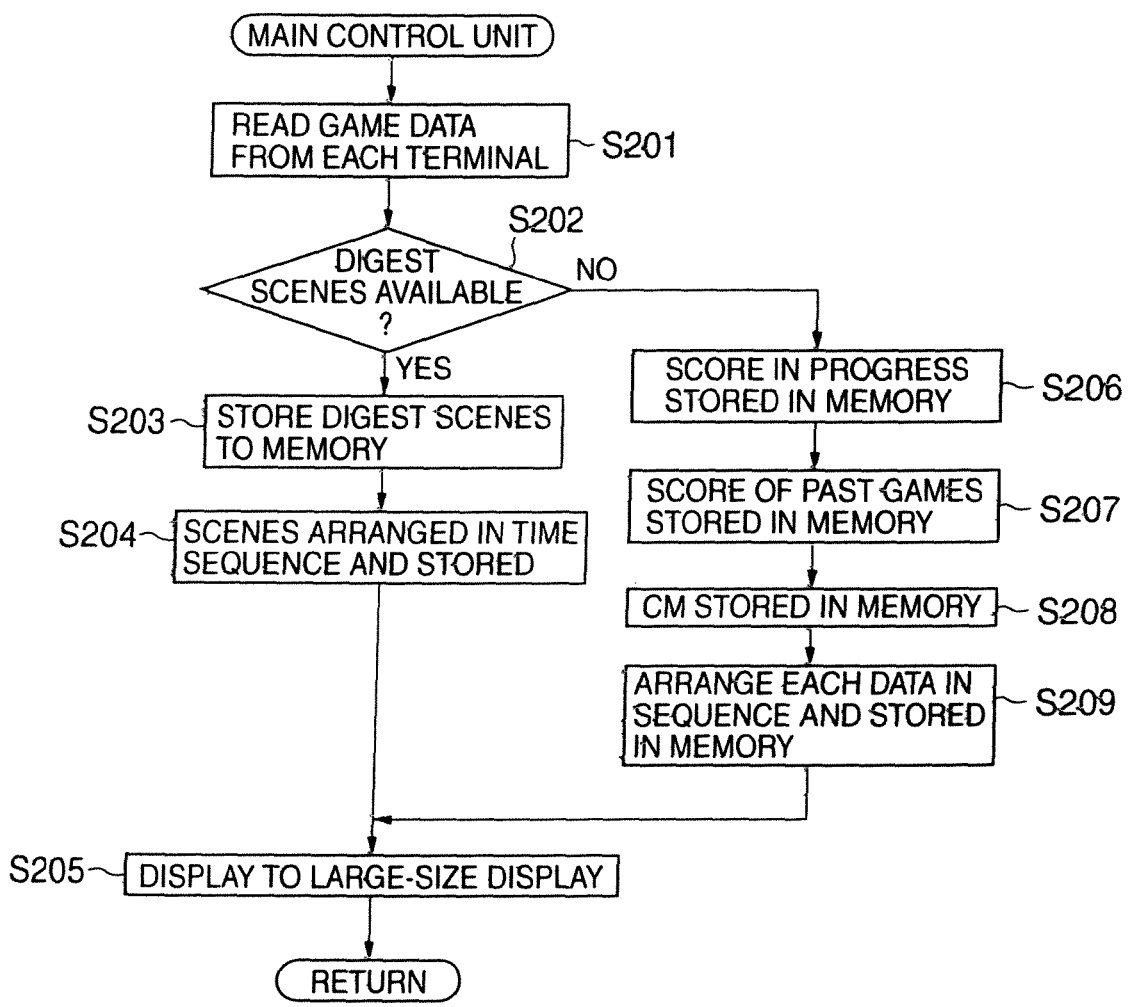
FIG. 48 is a flowchart for explaining a generation process of display data for the large-size panel display 12, which the main control unit 14 performs.

As shown in FIG. 48, the main control unit 14 reads the game data stored in the memory 64 of each terminal apparatus 16 at S201. At S202, it is determined whether a digest scene is contained in the game data read from the memory 64 of each terminal apparatus 16. At S202, if it is determined that there is data of a digest scene, the process progresses to S203, where the data of the digest scene read from the memory 64 of each terminal apparatus 16 is stored in the memory 44 of the large-size panel control unit 36.

At S204, digest scenes are sequentially arranged, stored in the memory 44 of the large-size panel control unit 36 (refer to FIG. 47B). Then, at S205, each digest scene is displayed on the large-size panel display 12 in the arranged sequence.

Thus, the digest scene of a game is displayed on the large-size panel display 12, or a past game scene is selected and displayed on the large-size panel display 12 if a digest scene of a game is not available, thereby waiting customers are prevented from getting bored while waiting for a turn, and the fun of the game can be advertised to new customers who have not participated in a game, and an efficient marketing can be provided.

If no digest scenes are available in the memory 64 of each terminal apparatus 16 at S202, the process progresses to S206, where a score in progress of a game (a score, etc.) is stored in the memory 64 during the game. At S207, game data of a final match is read from a database (not shown) in which the past game data is accumulated, the game data of the final match is stored in the memory 64. Then, at S208, CM data of the sponsoring company is read from the database, stored in the memory 64.

At S209, the score in progress, the past game data, and the CM data are arranged in a desired sequence, and stored in the memory 64. At S205, the score in progress, the past game data, and the CM data are displayed on the large-size panel display 12 as arranged at S209.

Thus, when the digest scene of each game is not available among two or more games, the progress information on the game under present execution, the past game data, CM data, etc. is displayed such that the waiting customers will not get bored, the fun of the game can be advertised to the new customers who have not participated in the game, and the efficient marketing is provided.

Here, the second variation of the player card 20 is explained.

As a flat coded pattern to be arranged on the back of the player card 20, a 2-dimensional bar code is available. However, the card game apparatus 10 of the present invention requires that not only the ID code for discriminating a card but the position and direction (angle) of the coded pattern printed on the back of the player card 20 are detected. If the ID code, the position and the direction of the image data photographed by the image sensor 56 are to be analyzed simultaneously, the number of parameters in an operation process performed in an operation circuit will increase, and detecting all coded patterns will take considerable length of time.

There is a method to process the operation at a high-speed, wherein the data is processed one by one, and only necessary data is screened and unnecessary data is eliminated. However, a conventional 2-dimensional bar code having a square shape has to be read from one direction that is diagonal to the bar code. For this reason, and since the position and the direction of the player card 20 have to be read, increasing the number of the parameters, any additional parameters cause the processing time to become extensive.

Then, in this variation, a circular coded pattern is used for position detection of the card data 112 printed on the back of the player card 20. Then, the position detection process and the direction (angle) detection process can be divided, realizing a fast operation of the position detection process. Then, if the angle detection is performed to the position (coordinate) of the player card 20, which has been obtained, processing time required for the direction detection will be decreased. If a decoding process of the ID code of the card is carried out to the position data and the direction data, the operation process of the ID code can be performed at a high speed.

Accordingly, in this variation, detections of the card position (coordinates), the card direction (angle) and the ID code, which are obtained by reading data patterns recorded on the back of the player card 20, are performed in three separate stages. First, the position coordinates of the player card 20 is detected by covering almost the whole area of the player card arrangement panel 24 (step 1), then the angle detection is performed to the position coordinates that are detected (step 2), and then, the ID code decoding process (step 3) is carried out using the position coordinates and the angle that are determined.

Figure 49:
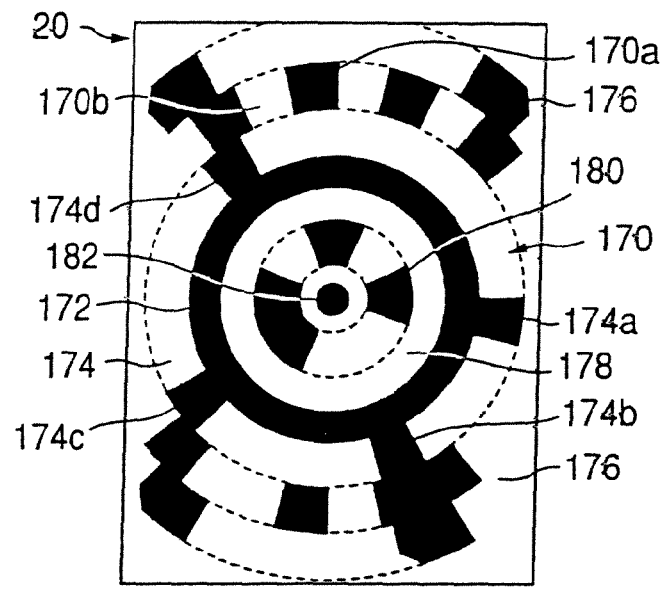
FIG. 49 is a figure showing an example of a second variation of the coded pattern.

FIG. 49 is a figure showing an example of the coded pattern of the second variation.

As shown in FIG. 49, a coded pattern 170 including two or more patterns that have different radii is printed on the back of the player card 20 of the present variation. The coded pattern 170 includes a card position detection circle 172, a position and angle detection pattern domain 174 formed in the outer circumference of the card position detection circle 172, an ID data domain 176 formed outside of the position and angle detection pattern domain 174, an annular white domain 178 formed inside the card position detection circle 172, a data domain 180 formed inside the annular white domain 178, and a center point 182 formed inside the data domain 180. The coded pattern 170 is recognized according to the density difference of black part 170a and white part 170b.

Further, the coded pattern 170 is printed in ink that transmits infrared rays, and such that a game player cannot recognize visually. Therefore, forgery and modification of the coded pattern 170 are prevented.

The card position detection circle 172, the position and angle detection pattern domain 174, the ID data domain 176, the annular white domain 178, and the data domain 180 of the coded pattern 170 are formed in the shape of a concentric circle, the center being on the central point 182. The ID data domain 176 having a larger radius than others is formed in an arc shape, because its radius is larger than the shorter side of the card 20. Namely, the ID data domain 176 is recorded in the arc shape, i.e., parts of the perimeter, providing a high efficiency in using the whole surface of the card.

Figure 50:
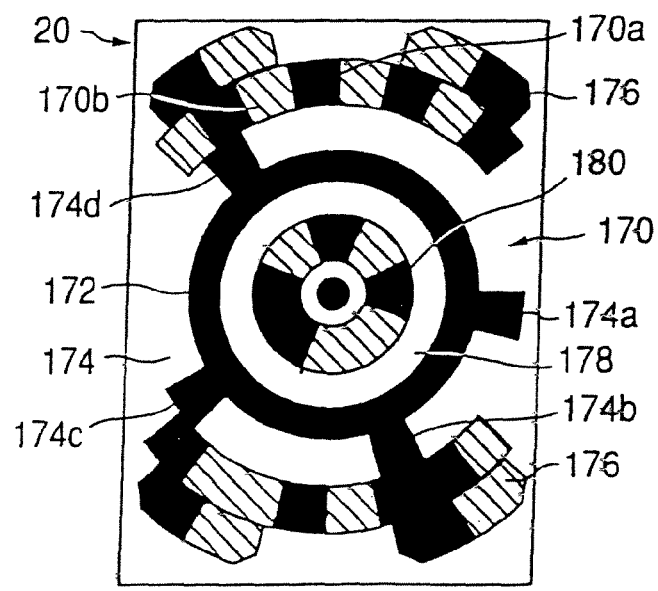
FIG. 50 is a figure showing the image taken from the back of the player card 20 by an image sensor 56.

FIG. 50 is a figure showing an image on the back of the player card 20 photographed by the image sensor 56.

When the coded pattern 170 is photographed by the image sensor 56 as shown in FIG. 50, a black-white part is recognized as "1", and a white-black portion is recognized as "0". The white parts in the ID data domain 176 and the data domain 180, which are shown by hatching, are not simply blank, but contribute to bear predetermined information by combination with a black part.

That is, a bit signal is configured by the black part and the white part. According to predetermined contents, arrangement of the patterns configured by the black part and the white part vary, and the arrangement pattern of the black part and the white part functions as a coded pattern. In addition, in the present embodiment, a half bit (one black part or one white part) is represented by six dots on the screen of the image data photographed by the image sensor 56.

With the card game apparatus 10 mentioned above, the positions where the player cards 20 are placed on the sheet 80 for the play field are variable, and the directions of the player card 20 are not uniform and variable. Therefore, before detecting the coded pattern 170 printed on the back of the player card 20, detection of the position and the direction (angle) is necessary.

In view of this, the present embodiment detects the code position (center position) from the coded pattern 170 of the player card 20 by detecting luminosity difference between the inner side and the exterior side of the card position detection circle 172. For this purpose, white domains 171 {178?} and 173 {170?} are annularly formed inside and outside, respectively, of the card position detection circle 172. In this manner, the luminosity of the card position detection circle 172 is clearly distinguishable from the luminosity of the inside and the outside of the card position detection circle 172. The card position detection circle 172, being a circle, enables to detect the card position regardless of the direction (angle) of the card 20.

Further, in order to determine the position and angle (direction of the card 20) of the coded pattern 170, projecting parts 174a through 174d are provided in varied intervals that are detected and distinguished, the projecting parts being in the position and angle detection pattern domain 174, and projecting outward from the outer circumference of the card position detection circle 172 in the shape of radiation. The intervals of the projecting parts 174a through 174d in the direction of the circumference are arranged in varied intervals such that the position and angle of the card 20 are distinguished by detecting the intervals.

Further, a value of each bit is determined from the luminosity difference of two adjacent half-bit domains. In order to minimize an adverse affect of a blur and an error when detecting the position and the angle, the boundary of the half-bit domains is not used, but the luminosity of a central area of each domain is extracted.

Figure 51:
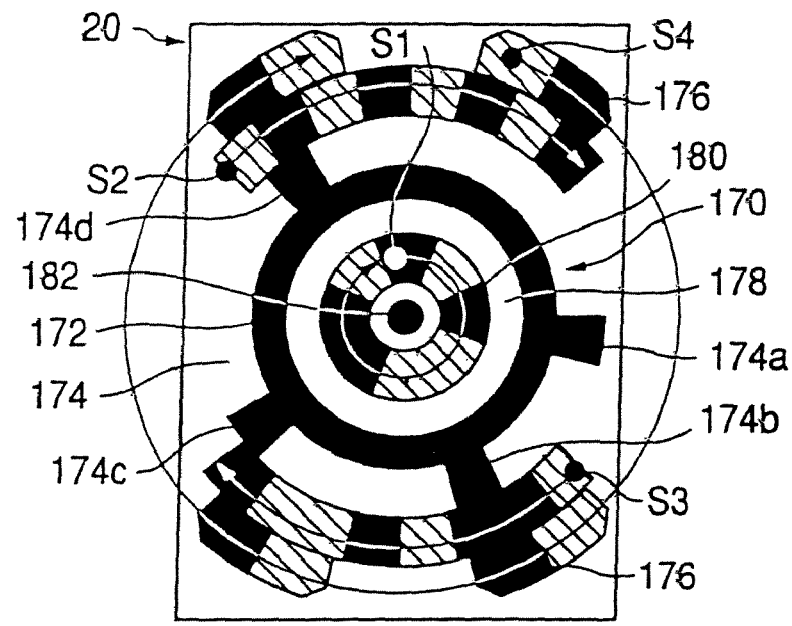
FIG. 51 is a figure showing bit start positions S1-S4 of an ID data domain 176 and a data domain 180.

As shown in FIG. 51, start positions S1 through S4 of the bit of the ID data domain 176 and the data domain 180 are unique to each player card 20.

Figure 52:
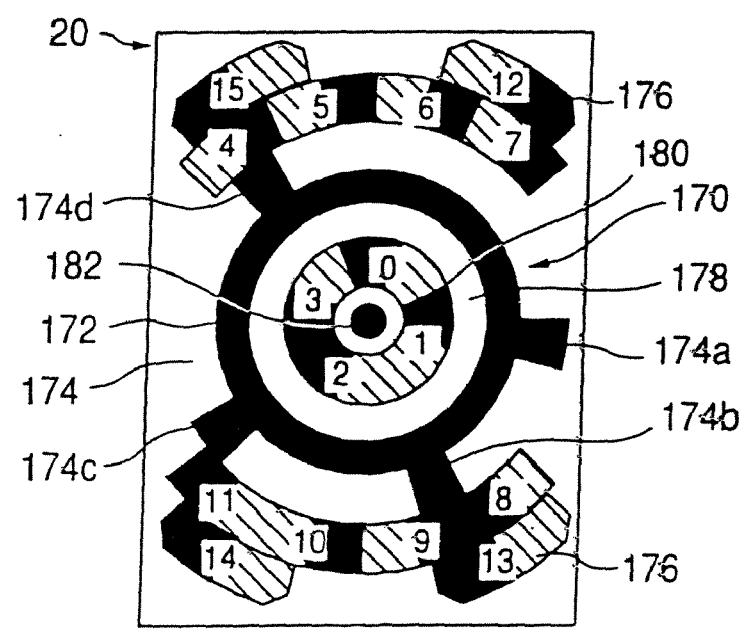
FIG. 52 is a figure showing arrangement of pattern data 0-15.

As shown in FIG. 52, in the ID data domain 176 and the data domain 180, 16-bit information that consists of pattern data 0-15 is available. Further, each pattern data 0-15 consists of a black part and a white part, each occupying an area that is sufficient to enable easy discrimination out of the image data photographed by the image sensor 56, avoiding incorrect recognition of data.

Here, the card position coordinates detection process that CPU 62 of the terminal apparatus 16 performs is explained.

First, if the player card 20 is placed on the play field sheet 80, the position coordinates of the player card 20 are detected. By detecting the card position detection circle 172 that provides the circular coded pattern, the position coordinates is detected at a high speed, and without being influenced by the position and angle of the card 20.

Here, in the card position coordinates detection process, the position of the card 20 is detected by measuring the luminosity difference between the black part of the card position detection circle 172, and the white domains formed in the inner side and the outer side of the card position detection circle 172 of the coded pattern 170 shown in FIG. 50 or 52, and by using pattern matching.

FIG. 53A through FIG. 53D illustrate the card position coordinates detection method, where the position of the card 20 is defined as the position of the card position detection circle 172. That is, the position of the card 20 is recognized by detecting the position of the card position detection circle 172 out of the image data photographed by the image sensor 56.

Figure 53A:
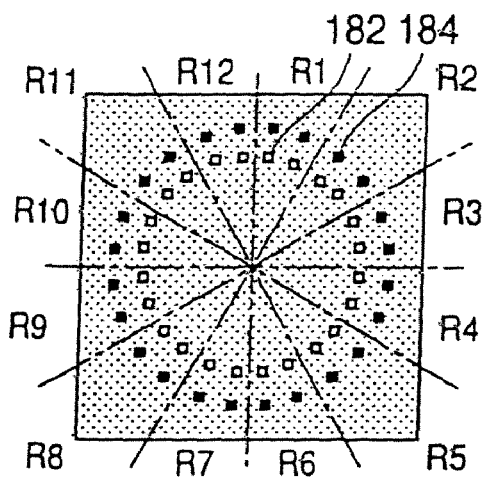
FIG. 53A is a figure for explaining an evaluation method by dividing the inside of a card position detection circle 172 to 12 domains R1-R12.

As shown in FIG. 53A, an evaluation of the inner side of the card position detection circle 172 is performed by dividing into twelve domains R1 through R12. Two pairs of points, each pair consisting of a white point 182 and a black point 184, are provided in each of the domains R1 through R12. In the two pairs of the points, the white point 182 represents a positive luminosity value, and the black point 184 represents a negative luminosity value. The luminosity values are added for each domain, and the sum is made an evaluation value of each of the domains R1 through R12.

Figure 53B:
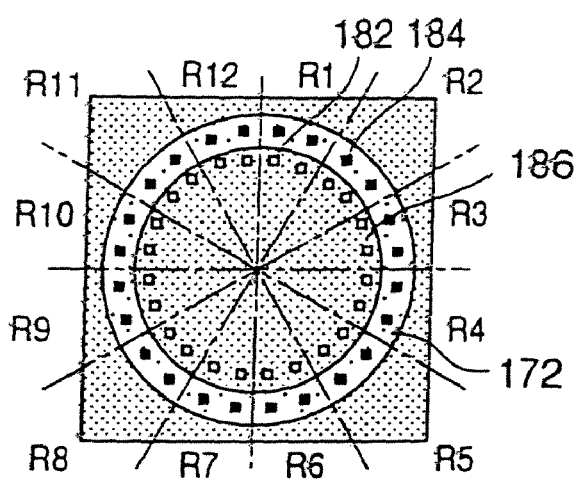
FIG. 53B is a figure showing an arrangement pattern where white points 182 and black points 184 are arranged, with the inner circumference of the card position detection circle 172 serving as a border.

The arrangement pattern of the white point 182 and the black point 184 is shown in FIG. 53B, boundary being the inner circumference of the card position detection circle 172. Based on the arrangement pattern of the white point 182 and the black point 184, inner circumference outline data of the inner side circumference of the card position detection circle 172 is evaluated using the card position detection circle 172 and its inner side domain 186. In this manner, an approximate coordinates of the position of the player card 20 is recognized.

Here, the evaluation value of the hatching part showing the card position detection circle 172 is set at zero. Then, coordinates at which all of the evaluation values of the 12 domains exceed a threshold value A, and ter. (variable by setup) values exceed a threshold value B are made candidate coordinates of the card, and the values are stored. At this time, the sum of the evaluation values of all the domains is stored as an evaluation value N of the coordinates.

Figure 53C:
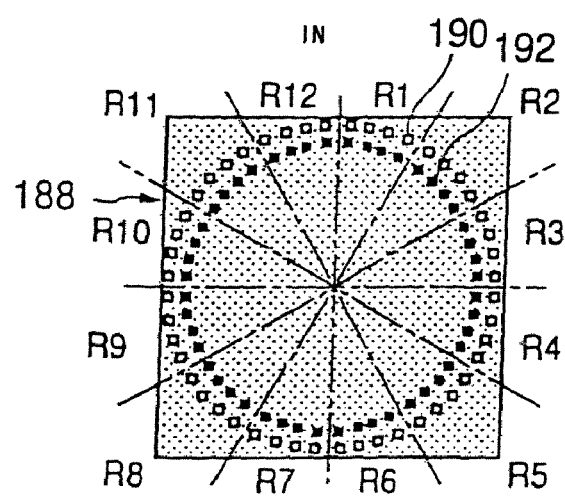
FIG. 53C is a figure for explaining an evaluation method using the outer circumference and the outside domain of the card position detection circle 172.

Next, the card coordinates stored as the candidate are evaluated by using a 12-division pattern 188 shown in FIG. 53C. The 12-division pattern 188 is evaluated using the outer circumference and its outside domain of the card position detection circle 172.

Figure 53D:
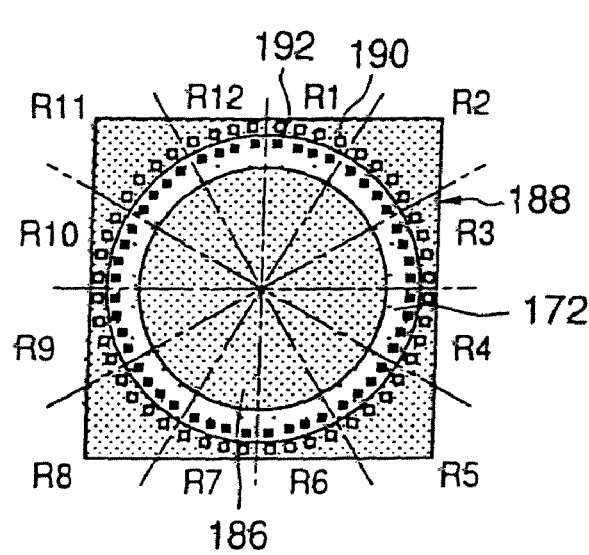
FIG. 53D is a figure showing the arrangement pattern where white points 190 and black points 192 are arranged, with the outer circumference of the card position detection circle 172 serving as the border.

The arrangement pattern of a white point 190 and a black point 192 is shown in FIG. 53D, boundary being the outer circumference of the card position detection circle 172. Based on the arrangement pattern of the white point 190 and the black point 192, outer circumference outline data of the card position detection circle 172 is evaluated by using the card position detection circle 172, and a white domain of a position and angle detection pattern domain 174 formed outside of the card position detection circle 172. In this manner, accurate coordinates of the player card 20 are obtained.

Four pairs of points, a pair consisting of the white point 190 and the black point 192, are provided in each of the 12-division domains R1 through R12. Here, the white point 190 represents a positive luminosity value, and the black point 192 represents a negative luminosity value. The luminosity values are added for each domain, and the sum is made an evaluation value of each of the domains R1 through R12. The evaluation value of a hatching part is set to 0. Coordinates at which all of the evaluation values of the domains R2-R12 exceed a threshold value C, and nine (variable by setup) values exceed a threshold value D, are stored as a candidate of the card coordinates. At this time, the sum of the evaluation values of all the domains R1-R12 is stored as an evaluation value M of the coordinates. The evaluation value N and the evaluation value M are added to make an evaluation value Σ of the coordinates.

When either finishing evaluating all coordinates or the number of candidate coordinates exceeding a predetermined number, the candidate coordinates are culled out by deleting coordinates with a small evaluation value, where two or more candidate coordinates are located closer than a predetermined culling distance. Coordinates with a large evaluation value, which remains after the culling, are made the coordinates of the player card 20.

Next, the card angle detection process performed after card position detection is explained with reference to FIG. 54, FIG. 55A, FIG. 55B and FIG. 55C.

Figure 54:
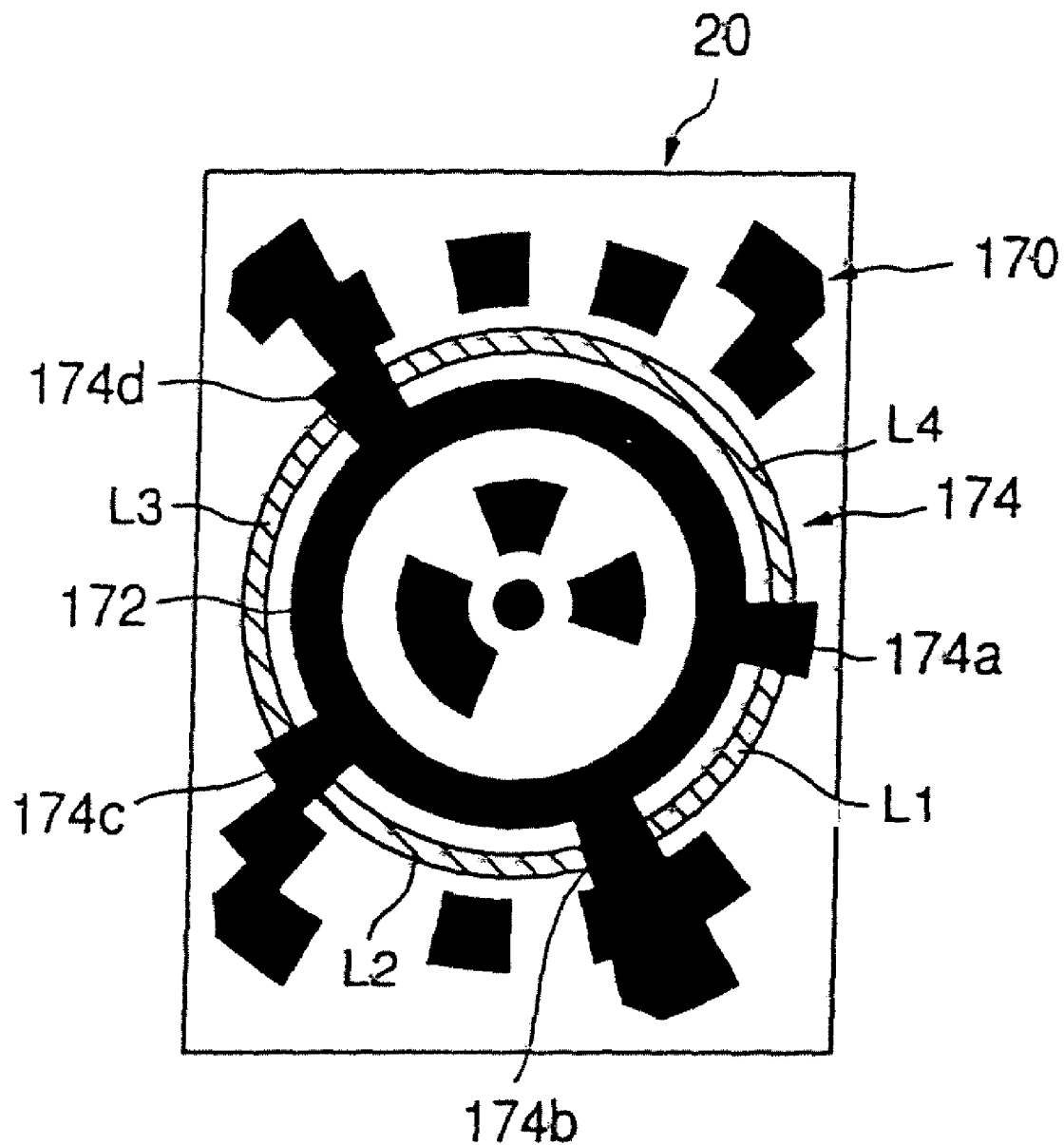
FIG. 54 is a figure for explaining a position and angle detection pattern domain 174.

As shown in FIG. 54, in the card angle detection process, angle detection is performed to the co-ordinates of the card position, which are detected. In the angle detection method here, intervals of projected parts 174a through 174d are detected and distinguished in the circumference direction of the position and angle detection pattern domain 174 (shown by hatching in FIG. 54), the projected parts projecting outward from the outer circumference of the card position detection circle 172 in the shape of radiation. Thus, since the coordinates, to which the angle detection process is to be performed, are narrowed down by the position detection, process time is shortened compared with when processing all coordinates.

The position and angle (direction) of the player card 20 placed on the play field sheet 80 is determined as follows. Each of intervals L1 through L4 in the direction of the circumference, and relative to the projected parts 174a through 174d that project outward from the outer circumference of the position and angle detection pattern domain 174 take predetermined values, each of the intervals L1 through L4 satisfying L1<L2<L3<L4. Therefore, by scanning detection positions of the projected parts 174a through 174d, the position and angle of the player card 20 are obtained by the time interval of detected pulses.

In the present embodiment, the pattern of the detected pulses concerning the projected parts 174a through 174d is compared with a pattern beforehand remembered, such that the angle detection is performed by pattern matching technique.

For example, width (dimension in the direction of the circumference) of each of the projecting parts for angle detection 174a through 174d is set to 1, a ratio of intervals L1:L2:L3:L4 defined by 174a through 174d is set to 3:4:5:8. Thus, incorrect recognition of angle detection is prevented from occurring by providing the different value to the intervals L1 through L4.

Here, instead of changing the intervals L1-L4 between the projects parts 174a through 174d, width (dimension in the direction of the circumference) of each of the projected parts 174a through 174d may be arranged such that each has a different dimension. Further, the position and angle detection pattern domain 174 is made as large as possible, with least margins at the sides of the player card 20, such that a detection error is suppressed.

Figure 55A:
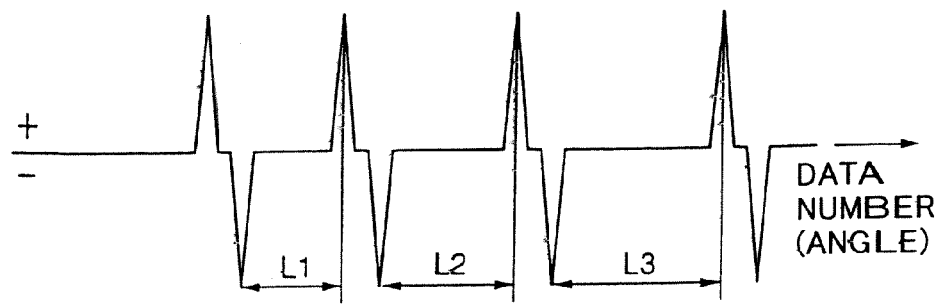
FIG. 55A is a wave form chart showing a filter signal that detects an edge from a density difference of black color of each projected part 174a-174d in comparison with white color of the position and angle detection pattern domain 174.
Figure 55B:
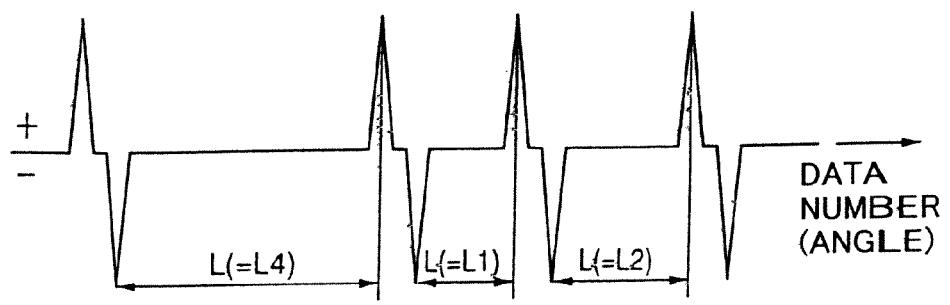
FIG. 55B is a wave form chart showing a detected signal of the edge of the each projected part 174a-174d in the direction of the circumference.
Figure 55C:
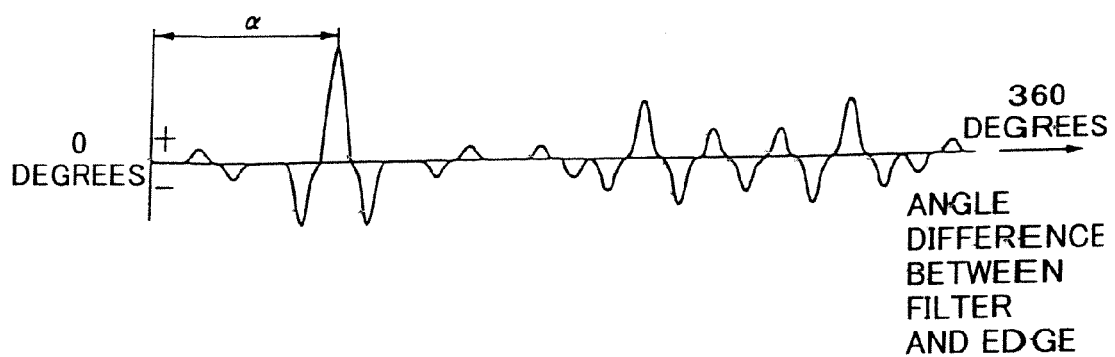
FIG. 55C is a wave form chart showing a multiplied product value of the filter signal and the detected signal of the edge of the each projected part 174a-174d in the direction of the circumference.

As shown in FIG. 55A through FIG. 55C, in the detection method of each of the projected parts 174a through 174d, an edge (side edge) is detected from the density difference (luminosity difference) of the black projected parts 174a through 174d from the white domain of the position and angle detection pattern domain 174, and intervals in the time-axis of the detected signals represent the intervals L1 through L4. Further, when an edge of each of the projected parts 174a through 174d is detected, the detected signal of the edge rises to + side, changing from white to black, and the detected signal of the edge falls to − side, changing from black to white. Therefore, an interval between the − side signal and the next + side signal represents one of the intervals L1 through L4 relative to the projected parts 174a through 174d.

In the present embodiment, luminosity data Y[n] (at an angle n) of the position and angle detection pattern domain 174 is obtained for every angle in a 1-degree unit, namely, from the angle of 0 degree to 359 degrees, and an edge value is extracted by Edge[n]=V[n−1]−V[n+1]. Here, the forward direction on the play field sheet 80 in view of a game player is defined as the standard angle of 0 degree.

Then, a filter signal (registered beforehand) shown in FIG. 55A, and the edge detection signal of the projected parts 174a through 174d in the direction of the circumference, as shown in FIG. 55B, are multiplied, giving a 1-degree shift. The multiplied product becomes the greatest at an angle where the filter signal and the edge detection signal coincide. In this manner, the angle α at which the product value, shown in FIG. 55C, is the greatest is determined to be the angle (direction) of the card 20. That is, the player card 20 placed on the play field sheet 80 is determined to have an angle α measured clockwise from, the standard angle (0 degree).

When lighting to the player card 20 is not uniform, a detection level of the white part sometimes becomes smaller than the black part, causing distinction from noises difficult. In view of this, the present embodiment evaluates the edge detection value in the direction of the circumference of the projected parts 174a through 174d, where non-uniform lighting to the player card 20 still provides practically uniform brightness in a limited area, enabling to perform a relative process. Accordingly, correct detection of the projected parts 174a through 174d is realized.

Here, an ID decoding process in which an ID data domain 176 and a data domain 180 are read is explained.

When the position coordinates and the angle of the player card 20 are known as mentioned above, bit position of the ID data domain 176 and the data domain 180 is decided uniquely, enabling to perform a distinction process correctly. Further, in the present embodiment, since what is necessary is to carry out a decoding process only to the position coordinates of the detected player card 20, card information can be read in a short time.

As shown in FIG. 49 through FIG. 52, the coded pattern in the ID data domain 176 and the data domain 180 is formed by half-bits (black part 170a and white part 170b), each half-bit occupying approximately 6 dots×6 dots. Within the domain of each half-bit, the color is either totally white or totally black. Adjacent half-bits always make a combination of black and white, representing a bit. In this manner, even when a decision is impossible by detecting an absolute luminosity value due to n-on-uniformity in lighting, each bit can be detected by a relative value, i.e., a difference of luminosity values.

As shown in FIG. 52, coded patterns 0 through 3, representing four bits, are arranged in the data domain 180 that is provided inside the card position detection circle 172. Positions where the four bits are located are calculated from the card position coordinates and the angle that are detected as mentioned above, such that an evaluation value of each half-bit domain is obtained. The evaluation value in this case is a total of two or more dots in the data domain 180 displayed in the card position in the image photographed by the image sensor 56.

Thus, by making the total of two or more dots as the evaluation value, an adverse influence due to a dot fault or noises can be suppressed. Here, if an accurate evaluation of one dot is available, a value of the dot may be used as the evaluation value.

At this time, the boundary part of the data domain 180 is not used, because the boundary part tends to give an error in detecting the position coordinates and the angle due to a blur at photographing and the like, causing an inaccuracy in calculating the evaluation value.

Similarly, coded patterns 4 through 15, representing 12 bits, are arranged in the ID data domain 176 arranged on the outside of the card position detection circle 172. An evaluation value of the coded patterns 4 through 15 is obtained, and each bit of the card data stored in the player card 20 is obtained. At this time, if the number of difference values between the evaluation values of the white part and the black part of each bit exceeding a threshold value E is larger than a predetermined number, the code is registered as a proper code, and otherwise, the code is deleted as an inaccurate code.

Further, a parity (error detection code) bit is set up and a code that does not agree with the parity bit is also deleted as an inaccurate code. A string of bits that are recognized as correct is decoded according to the ID decoding table (not shown), and the ID data of the player card 20 is obtained. In the present embodiment, two MSBs of the 16 bits are used as parity bits.

Here, an aspect ratio compensation of the image photographed by the image sensor 56 is explained.

Depending on make or model of the image sensor 5, the aspect ratio of a pixel may not be 1:1. In this case, if an image is rotated, the image will be distorted and it will be hard to treat as it is. Therefore, an aspect ratio compensation process is performed. For example, if the aspect ratio of horizontal vs. vertical is 1.29:1, a pixel is expanded 1.29 times vertically so that the aspect ratio of the pixel becomes 1:1.

Next, a lens distortion compensation process of the image sensor 56 is explained.

When there is lens of the image sensor 56 has a distortion (refer to FIG. 12A), it is necessary to remove the distortion by compensating as follows. The focal length of an image sensor 56 is adjusted to, for example, 4.8 mm in that case. Then, a manual adjustment is performed such that a length of 500 mm at 100% takes 440 dots (0.88 dot/mm) in the image from the image sensor 56. In the present embodiment, however, an automated adjustment is available by obtaining a multiplication ratio from a standard marker 200 that is photographed by the image sensor 56.

Figure 56A:
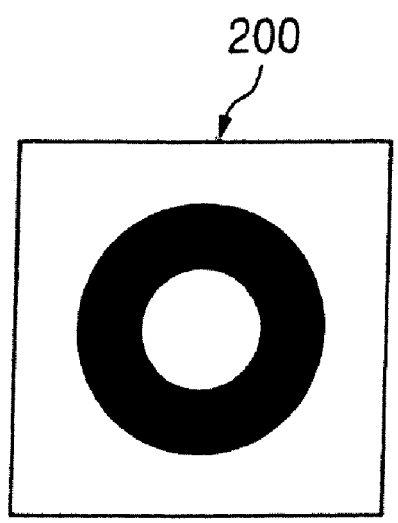
FIG. 56A is a figure showing a standard marker 200 photographed by a lens distortion compensation process of an image sensor 56.

The standard marker 200 consisting of a black ring as shown in FIG. 56A is formed in the four corners of the play field sheet 80. Then, a position of the marker is detected for setting up standard coordinates, out of the image of the play field sheet 80 photographed by the image sensor 5. Then, the coordinates of the standard marker 200 prepared in the four corners of the play field sheet 80 are recognized.

Figure 56B:
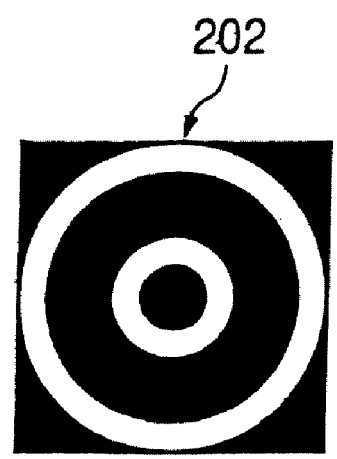
FIG. 56B is a figure for explaining how a Sobel filter detects a marker pattern 202 from density difference of the outline of the standard marker 200.

A Sobel filter is used as the recognition method of the standard marker 200. As shown in FIG. 56B, the Sobel filter detects the marker pattern 202 from the density difference of the outline of the standard marker 200, and the outline of the standard marker 200 is recognized. Thus, a displacement can be removed by extracting the outline of the standard marker 200.

In addition, in the outline extraction process of the standard marker 200, the outline of the standard marker 200 is extracted using the Sobel filter. A position where a total numerical value of the outline values of the standard marker 200 becomes the maximum becomes the coordinates of the standard marker 200. Then, the position coordinates of the play field sheet 80 are compensated by performing pattern matching with the position of the standard marker 200.

Figure 57:
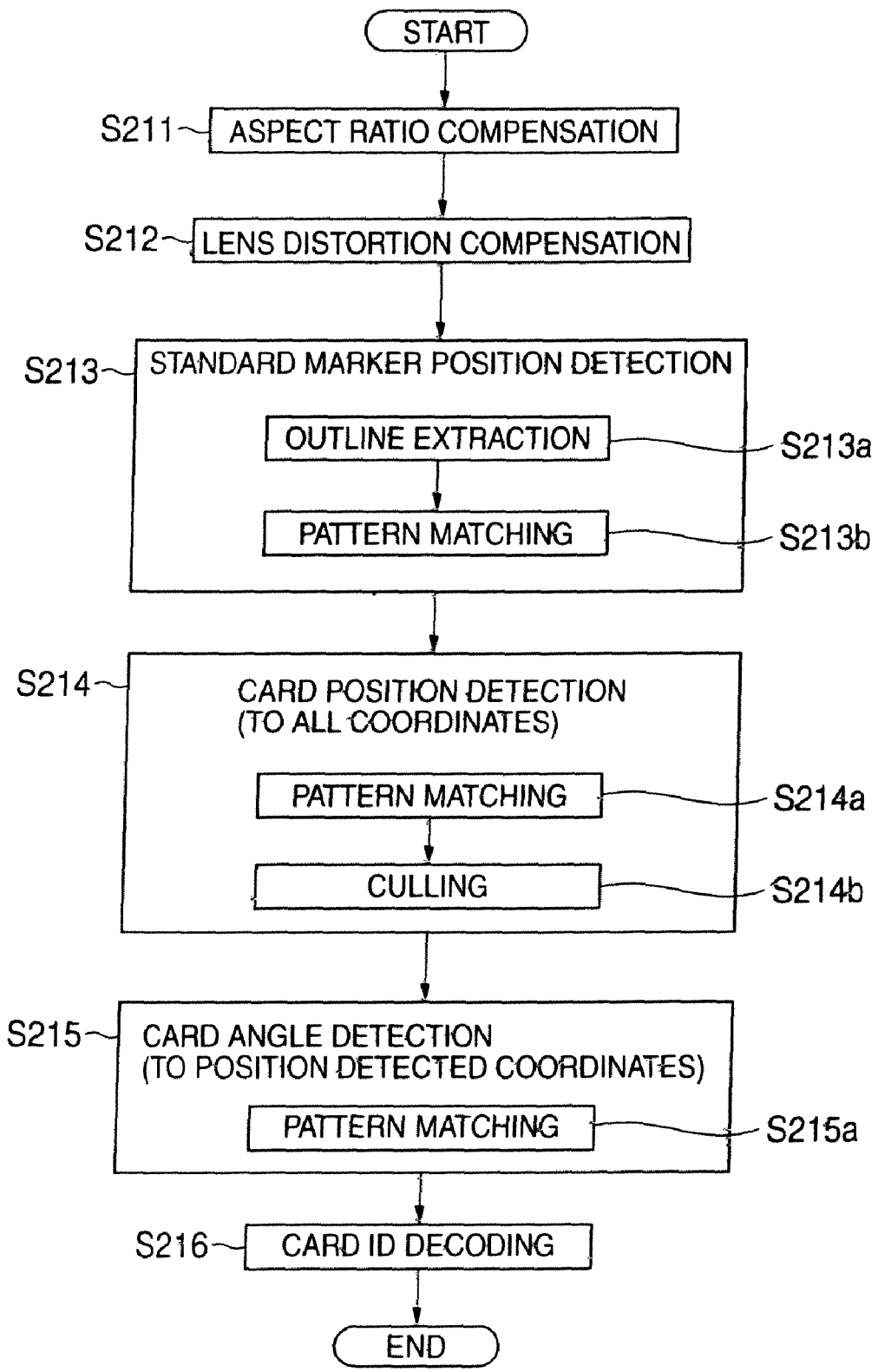
FIG. 57 is a flowchart showing a process step for recognizing card data stored on the back of the player card 20 of the second variation.

FIG. 57 is a flowchart showing a process step of the second variation for recognizing the card data stored on the back of the player card 20.

As shown in FIG. 57, by CPU 62 of the terminal apparatus 16a, when a coin is inserted, the aspect ratio compensation process is performed at S211. Since the aspect ratio of a pixel may not be 1:1, depending on make and model of the image sensor 56, the aspect ratio compensation process is performed such that the aspect ratio of the pixel becomes 1:1.

At S212, a spherical surface compensation filter process for compensating the distortion of the lens of the image sensor 56 is performed. Through the spherical surface compensation filter process, an image from which the distortion, as shown in FIG. 12A, resulting from the distortion of the lens system of the image sensor is removed, is obtained as shown in FIG. 12B.

Then, at S213, a standard marker position detection process is performed. The standard marker position detection process extracts and recognizes the outline of the standard marker 200 (refer to FIG. 55A and FIG. 55B) prepared in the four corners of the play field sheet 80 as mentioned above (S213a).

At S213b, a pattern matching process is performed for the detection position of the standard marker 200 prepared in the four corners of the play field sheet 80. That is, predetermined standard marker pattern data stored in the database is compared with the detected position of the standard marker 200, such that a difference is obtained. Then, according to the difference, the image photographed by the image sensor 56 is compensated.

At S214, as shown in FIG. 53A through FIG. 53D, the card position detection process is performed to all the coordinates on the play field sheet 80. At S214a, the pattern matching process is performed. That is, a comparison is made with pattern data of each rotation position registered beforehand, and marks are given, while all images are searched, shifting one dot at a time, and the coordinates and the angle of a value greater than a predetermined level are stored. At S214b, since the stored values are simply greater than the predetermined value, containing unnecessary coordinates, culling process to delete the unnecessary coordinated.

At S215, a card angle detection process is performed. As shown in FIG. 54, and FIG. 55A through FIG. 55C, the card angle detection process detects the edge from the density difference between the black of each projection part 174a through 174d, and the white of the position and angle detection pattern domain 174, and obtains the card position and angle by pattern matching the intervals in the time axis of the detected signal (S215a).

At S216, an image of luminosity is cut out from the card position coordinates and angle. Then, as shown in FIGS. 51 and 52, luminosity differences are read from the ID data domain 176 and the data domain 180, where the luminosity difference from left-to-right of white-black representing 0, and black-white representing 1. In this manner, the ID code of the coded patterns 0-15 of the ID data domain 176 and the data domain 180 stored on the back of the player card 20 is detected.

Figure 58:
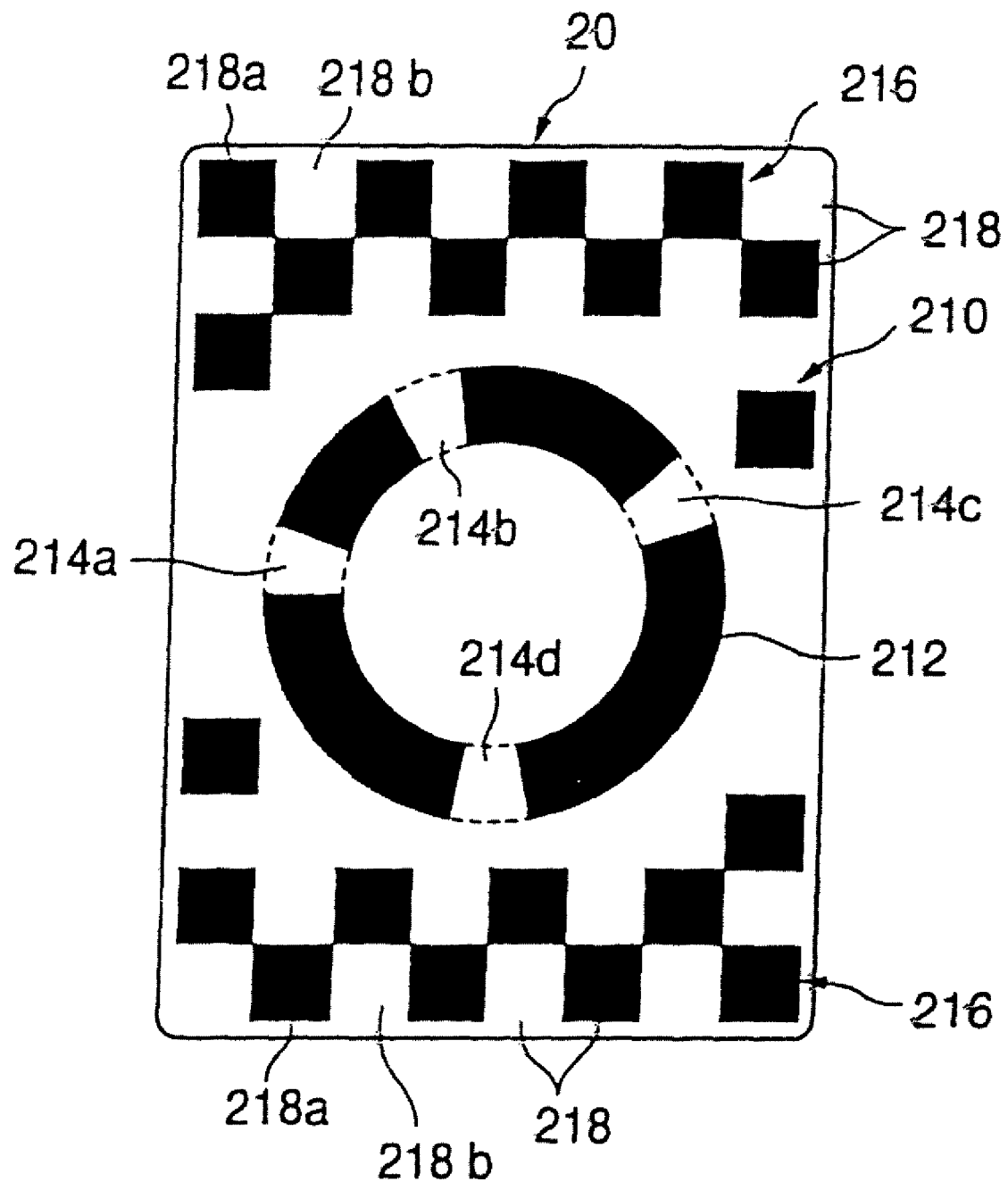
FIG. 58 is a plan view showing a third variation of the player card 20.

FIG. 58 is a plan view showing the third variation 3 of the player card 20.

As shown in FIG. 58, the coded pattern 210 is formed on the back of the player card 20, and the coded pattern 210 includes a card position detection circle (black part) 212 formed circularly, position and angle detection patterns (white part) 214a through 214d formed overlapping the card position detection circle 212, and an ID data domain 216 formed outside the card position detection circle 212.

In order to detect the card angle, the position and angle detection patterns (white part) 214a through 214d are placed with varied intervals in the direction of the circumference such that edge detection as shown in FIG. 55A through FIG. 55C is performed.

Checkered coded patterns 218 formed vertically and horizontally are formed in the ID data domain 216. Each code of the coded patterns 218, that is each of a black part 218a and a white part 228b, occupies about 6 bit×6 bits in the square shape, representing a half-bit (one of the black partial 218a and the white partial 218b). Inside the domain of the half-bit, the color is either all white or all black. In a domain where two coded patterns meet, a bit is always expressed by the combination of the black part 218a and the white part 218b. In this manner, each bit of the coded patterns can be determined from a relative value, i.e., the luminosity difference, even if the determination is impossible from an absolute luminosity value due to uneven lighting and the like.

Further, the coded patterns 170 and 210 may be formed on both sides of the card. In this case, the coded patterns 170 and 210 can be read, regardless of the player card 20 being placed with either side facing up.

As a further variation, each of surfaces of the player card 20 may contain different coded patterns. For example, it is possible Lo form the coded pattern 170 on the surface of the player card 20, and the coded pattern 210 on the back. In this case, since the coded patterns 170 and 210 are recorded on the different sides of the player card 20, a coded pattern to be read can be switched by placing the card with either side facing up.

Although the embodiments are explained with a soccer game applied to the card game apparatus 10, any other sport games between teams with a plurality of players can be applied.

Further, of course, the card game apparatus 10 is also applicable to an organization game in which two or more individuals participate and perform a joint work for the same objective, other than a sport game.

The invention claimed is:

1. A card game apparatus comprising:
a game execution means that initiates a game upon receiving an input;
a casing;
a card arrangement panel disposed at an upper part of said casing, said panel being formed of materials transparent to an invisible light with a flat surface, which constitutes a play field having an expanse enough to arrange a plurality of thinly formed cards thereon;
luminous source means that is disposed inside of said casing to illuminate said panel with said invisible light from inside of said casing;
an image sensor disposed such that it receives the invisible light from said panel and generates image data after receiving the light from said panel; and
data recognition means configured to separate data of each card, as well as to detect positions of the cards on said panel, from the image data obtained by the image sensor and to supply the thus obtained information to said game execution means,
wherein each of said plurality of thinly formed cards is printed with a game character on one of its major surfaces and formed on the other of the major surfaces with a code pattern including data relating said game character,
wherein, when a set of the cards is arranged on said flat surface of the panel such that the other major surfaces face the flat surface, the other major surfaces of the cards are illuminated by the invisible light and said image sensor generates data of the overall image including the code patterns of all of the cards arranged on the panel,
wherein said data recognition means separates data of each card from said data of the overall image, and detects information relating said game character printed on the one major surface of each card as well as information of a position of each card on a play field of the cards arranged on said panel, from the data of each card separated from the overall image and supplies the information thus obtained to said game execution means,
wherein said game execution means executes the game initiated upon receipt of the input by the game execution means, based on the information supplied and controls progress of the game in response to manipulation of the cards by an operator.

2. The card game apparatus as claimed in claim 1, further comprising:
a set of markers disposed at the four corners of the play field;
displacement amount detection means configured to adjust an amount of displacement of the image data photographed by the image sensor in reference to the markers disposed at the four corners of the play field; and
compensation means configured to compensate the amount of the displacement based on the amount of the displacement acquired by the displacement amount detection means.

3. The card game apparatus as claimed in claim 1, further comprising a reflective board that is installed within said casing such that the invisible light reflected from said panel including images of the code patterns of the cards arranged on said play field is guided to the image sensor.

4. The card game apparatus as claimed in claim 3, wherein said case comprises an inclined part at a lower part of said case such that said inclined part is formed inclined against the upper part of the casing to provide leg room for a game player who takes a seat in front of the game apparatus, wherein said reflective board is disposed on said inclined part inside of the casing.

5. A card game apparatus as claimed in claim 1, further comprising:
card data generation means configured to generate alternative data that serves as a card data when data of a certain card cannot be identified by the data recognition means.

6. The card game apparatus as claimed in claim 5, wherein said card data generation means is configured to generate the alternative data corresponding to the detected a position of the card placed on the play field when data of the card cannot be identified by the data recognition means.

7. The card game apparatus as claimed in claim 5, further comprising card exchange notice means configured to notify that a card should be replaced when data of a certain card placed on the play field cannot be identified by the data recognition means, while notifying position of said card.

8. The card game apparatus as claimed in claim 5, further comprising:
storage means configured to store data used in a previously played game; and
card data generation means configured to generate data by retrieving data of the card corresponding to the unidentified card from the storage means when data of the card cannot be identified.

9. A card game apparatus as claimed in claim 1, further comprising:
storage means configured to store data of cards used in the past; and card data offering means configured to provide alternative card data when data of a certain card cannot be identified by the data recognition means after a game starts, the alternative card data being retrieved from the storage means and serving as the data as an alternative for the card the data of which is not properly identified by the data recognition means.

10. The card game apparatus as claimed in claim 9, wherein said card data generation means is configured to generate the alternative data corresponding to the detected position of the card placed on the play field when data of a certain card cannot be identified by the data recognition means.

11. The card game apparatus as claimed in claim 9, further comprising card exchange notice means configured to notify that a card should be replaced when data of a certain card placed on the play field cannot be identified by the data recognition means, while notifying position of said card.

12. A card game apparatus as claimed in claim 1, wherein said invisible light is an infrared ray.

13. A game apparatus comprising:
a game execution means that initiates a game upon receiving an input;
a casing;
a panel disposed at an upper part of said casing, said panel formed of materials transparent to an invisible light with a flat surface and providing a play field having an expanse enough to arrange a plurality of game pieces thereon and formed with a flat surface, wherein each of said game pieces is formed with an upper face, on which information indicative of an attribute assigned to the game piece is visually indicated, and a plane lower face, on which a coded pattern including information relating to the attribute assigned to the game piece is printed, wherein said play field having the flat surface is arranged such that each of the game pieces is placed with the plane lower face facing said flat surface and slidably movable by a game player while keeping the game piece placed on the game field;
luminous source means that is disposed inside of said casing to illuminate the lower surfaces of the game pieces through said panel with said invisible light from inside of said casing;
an image sensor means disposed inside said casing such that it receives the invisible light reflected from the lower faces of the game pieces through said panel and generates data of an overall image of the lower faces of the game pieces placed on the flat panel; and
data recognition means configured to separate data of respective cards from the data of the overall image, to detect information assigned to the respective game pieces from the separated data, to determine positions of the respective cards placed on said panel, and to supply the thus obtained information to said game execution means,
wherein, when a set of game pieces is arranged on said play field, the data relating to the game information as well as the location on the play field is detected with respect of each of the game pieces placed on the play field, and such that, when one or more of the game pieces is slidably moved while the game pieces are played on the play field, such movement of the game piece is detected,
wherein the data detected by said data recognition means is supplied to said game execution means as operation information made by the game player, and said game execution means organizes a team in a game space generated by the game execution means executing a game program in response to such data supplied from said data recognition means as the operation information made by the game player, and wherein said game execution means controls a progress of the game initiated upon receipt of the input by the game execution means, in the game space in response to the movement of the game piece made by the game player.

14. A card game apparatus according to claim 13, wherein each of the game pieces is printed on the upper surface with a game character and said team is organized with the game characters of the game pieces placed on the play field.

* * * * *